(12) United States Patent
Yap et al.

(10) Patent No.: US 7,156,302 B2
(45) Date of Patent: Jan. 2, 2007

(54) CARD READING DEVICE FOR SERVICE ACCESS

(75) Inventors: Sue-Ken Yap, Lane Cove (AU); Robert Smeallie, Normanhurst (AU); William Simpson-Young, Eastwood (AU); Andrew Timothy Robert Newman, Glebe (AU)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 10/165,726

(22) Filed: Jun. 7, 2002

(65) Prior Publication Data

US 2003/0023554 A1   Jan. 30, 2003

(30) Foreign Application Priority Data

Jun. 8, 2001  (AU) ..................... PR5592

(51) Int. Cl.
G06K 5/00  (2006.01)
(52) U.S. Cl. .................. 235/382; 235/451; 235/487
(58) Field of Classification Search .............. 235/382, 235/380, 441, 486, 451, 487; 340/825.74; 455/556, 574
See application file for complete search history.

(56) References Cited

U.S. PATENT DOCUMENTS

| | | | | |
|---|---|---|---|---|
| 5,002,062 A | | 3/1991 | Suzuki ................... 128/696 |
| 5,015,830 A | * | 5/1991 | Masuzawa et al. ......... 235/441 |
| 5,235,328 A | * | 8/1993 | Kurita .................. 340/825.72 |
| 5,353,016 A | | 10/1994 | Kurita et al. .......... 340/825.22 |
| 5,461,222 A | | 10/1995 | Haneda ................... 235/492 |
| 5,583,539 A | | 12/1996 | Hiketa et al. ............ 715/823 |
| 5,601,489 A | | 2/1997 | Komaki .................. 463/44 |
| 5,880,769 A | | 3/1999 | Nemirofsky et al. ........ 348/12 |
| 5,949,492 A | | 9/1999 | Mankovitz ............... 348/473 |
| 5,973,475 A | | 10/1999 | Combaluzier ............. 320/107 |
| 6,014,593 A | | 1/2000 | Grufman ................. 700/136 |
| 6,068,183 A | | 5/2000 | Freeman et al. .......... 235/375 |
| 6,125,452 A | * | 9/2000 | Kuriyama ................ 713/600 |
| 6,145,740 A | | 11/2000 | Molano et al. ........... 235/380 |
| 6,229,694 B1 | | 5/2001 | Kono .................... 361/683 |
| 6,249,290 B1 | | 6/2001 | Herndon et al. .......... 345/439 |
| 6,466,804 B1 | | 10/2002 | Pecen et al. ............. 455/558 |
| 6,557,753 B1 | | 5/2003 | Beaujard et al. .......... 235/375 |
| 6,557,768 B1 | | 5/2003 | Yap et al. .............. 235/492 |
| 6,591,229 B1 | | 7/2003 | Pattinson et al. ......... 235/376 |
| 6,686,908 B1 | * | 2/2004 | Kobayashi ............... 345/173 |
| 6,735,456 B1 | * | 5/2004 | Cathey et al. ............ 455/574 |

(Continued)

FOREIGN PATENT DOCUMENTS

AU             95/28896         1/1996

(Continued)

*Primary Examiner*—Steven S. Paik
(74) *Attorney, Agent, or Firm*—Fitzpatrick, Cella, Harper & Scinto

(57) ABSTRACT

A read device (1) for reading an interface card (16). The card (16) is configured for insertion into the read device (1). The card (16) comprises indicia formed thereon and a memory having data stored therein for communicating with an external device (601, 700). The read device (1) comprises a substantially transparent touch sensitive membrane (8) arranged to overlay the interface card (16) upon receipt of the card (16) in the read device (1). The read device (1) also comprises a central processing unit (45) for sending a service identifier, a distinguishing identifier and a specific portion of the data to the external device (601, 700). The specific data is related to a user selected indicia (14). A service identified by the service identifier upon receipt of the data is provided via the external device (601, 700).

26 Claims, 40 Drawing Sheets

U.S. PATENT DOCUMENTS

| | | | |
|---|---|---|---|
| 6,764,001 B1 * | 7/2004 | Kawai et al. | 235/380 |
| 6,804,786 B1 * | 10/2004 | Chamley et al. | 713/201 |
| 2001/0017616 A1 | 8/2001 | Kobayashi | 345/173 |
| 2001/0025278 A1 | 9/2001 | Yourlo et al. | 707/2 |
| 2001/0054647 A1 | 12/2001 | Keronen et al. | 235/492 |
| 2002/0020745 A1 | 2/2002 | Yap et al. | 235/451 |
| 2002/0023953 A1 | 2/2002 | Robertson | 235/380 |

FOREIGN PATENT DOCUMENTS

| | | |
|---|---|---|
| AU | 742974 | 4/2000 |
| DE | 3637684 | 5/1987 |
| EP | 0 469 581 | 2/1992 |
| EP | 0 816 989 | 1/1998 |
| EP | 0 965 938 | 12/1999 |
| FR | 2 721 730 | 12/1995 |
| GB | 2 255 934 | 11/1992 |
| JP | 59-123986 | 7/1984 |
| JP | 04-88547 | 3/1992 |
| JP | U03-071329 | 6/2000 |
| WO | 95/35534 | 12/1995 |
| WO | WO 96/32702 | 10/1996 |

* cited by examiner

| Field Number | Description (Card Header) |
|---|---|
| Magic Number | Two byte magic number. A constant that specifies this as being a valid card. Currently defined as the ASCII value for 'i' followed by the ASCII value for 'C'. |
| Version | One byte version number. Each version increment specifies a change in the card layout that can not be read by a reader that is compatible with lower versions of the layout. This document describes version 1(0x01) of the card format. |
| Reserved | This data is reserved for future use. Its value must be set to zero. |
| Flags | Four bytes of flags for this card. (See Fig. 13.) All non-assigned bits must be zero. |
| Distinguishing ID | Eight byte distinguishing identifier. Distinguishing identifiers include two fields - service identifier and service-specific identifier. The service identifier is five bytes and identifies the service associated with the card. The service-specific identifier is three bytes of service-specific value. |
| Number of Objects | One byte. The number of objects following this header. Can be zero. |
| Checksum | Card checksum, 2 bytes. The card checksum is sixteen bit, unsigned integer sum of all data bytes on the card excluding the checksum. |

| Name | Description (Pre-Card Flag Values) | Value (hex) |
|---|---|---|
| Don't Beep | Stops the reader unit providing audio feedback by default. If this bit is set the reader will not issue any audio feedback when a UI element is pressed unless that element has the "INVERT BEEP" flag set in the UI Element object | 0x0000 0001 |
| No MOVE Events | Stops the reader unit from acting as a mouse when the user moves their finger around on the reader surface | 0x0000 0002 |
| No Event Co-ordinates | Stops the reader unit from sending co-ordinates for PRESS, RELEASE and MOVE events. X and Y values are sent with value zero. | 0x0000 0004 |

Fig. 14

| Name | Description (Object Structure) | Length |
|---|---|---|
| Type | The type of object (see Fig. 16). | 1 byte |
| Object Flags | The general object flags that are associated with this object (see Fig. 15). Note: Additional flags specific to an object type are specified within the data field of the object. | 1 byte |
| Length | The length of the data following this object. This value can be zero. | 2 bytes |
| Data | The data associated with this object. The structure of this data is dependent on the type of object. | Variable |

| Name | Description (Pre-Object Flag Values) | Value (hex) |
|---|---|---|
| Inactive | Indicates to the reader that the object is valid but is to be ignored regardless of it's type. | 0x01 |

Fig. 15

| Name | Description (Object Types) | Value (hex) |
|---|---|---|
| UI Object | A UICard button. | 0x10 |
| Card Data | Contains data that relates specifically to this card. | 0x20 |
| Fixed Length Data | An object that can be used to store fixed length blocks of data on the card. | 0x30 |
| Reader Insert | An object that can be used to give instructions to the reader when the card is inserted. | 0x40 |
| No Operation | An object that is used to fill blocks of empty space on the card. | 0x01 |
| No Operation (Single byte) | A single byte object that doesn't have a standard object header. Used to fill spaces on the card that are too small for a normal object header. | 0x00 |

Fig. 16

| Field | Description (User Interface Object Structure) | Size |
|---|---|---|
| Flags | Flags specific to this UI element on the card. | 1 byte |
| X1 | X value of the bottom-left hand corner co-ordinate of this object's rectangle. | 1 byte |
| Y1 | Y value of the bottom-left hand corner co-ordinate of this object's rectangle. | 1 byte |
| X2 | X value of the top-right hand corner co-ordinate of this object's rectangle. | 1 byte |
| Y2 | Y value of the top-right hand corner co-ordinate of this object's rectangle. | 1 byte |
| Data | Zero or more bytes of data associated with this object. The size of this field is determined by the object data size minus the combined size of the above fields. | Variable |

Fig. 17

| Name | Description (Flags for UI Object) | Value |
|---|---|---|
| Invert Beep Enable | This flag causes this button to have the inverse of the don't beep flag in the card header. If the Don't Beep flag isn't set in the header, this flag causes this button not to beep and vice versa. | 0x01 |
| Auto-repeats | Messages associated with this button automatically repeat when the press is held on the button. | 0x02 |
| Don't Send Data on Press | This causes this button not to send the data associated with this button in the press event. The default is to send the data associated with the button in the press event. | 0x04 |
| Don't Send Data on Release | This causes this button not to send the data associated with this button in the release event. The default is to send the data associated with the button in the release event. | 0x0a |

Fig. 18

| Field | Description (Message Header Format) | Bytes |
|---|---|---|
| Preamble | Preamble to the message. Value is always 0xAA 0x55 (bit sequence 10101010 01010101). This is to make it easier for the EM to find the beginning of a message. | 2 |
| Version | The version of the UICard IR message protocol this messages uses. This version of the protocol is version 1(0x01 in the version field.) | 1 |
| Type | Type of message. This is one of the values given in Fig. 20 | 1 |
| Reader ID | The 16 bit id of the reader that sent the message. This number is a pseudorandom generated number that is changed when the battery is replaced in the reader. This is needed to distinguish readers when multiple readers are being used with applications. | 2 |
| Service | Service identifier as stored on the card. | 5 |
| Service-specific | Service-specific identifier as stored on the card. | 3 |

Fig. 19

| Name | Description (Message Type Codes) | Code |
|---|---|---|
| INSERT | A card has been inserted into the reader. | 'I' |
| REMOVE | The card has been removed from the reader. | 'E' |
| PRESS | The touch panel has been pressed. | 'P' |
| RELEASE | The press on the touch panel has been released. | 'R' |
| MOVE | The press position has moved but the press has not been released. | 'M' |
| BADCARD | A card had been inserted however it has not passed validation | 'B' |
| LOW_BATT | The battery in the reader is getting flat. | 'L' |

Fig. 20

| Field | Description (Simple Message Format) | Bytes |
|---|---|---|
| Header | Message header as defined by Fig. 19. | 14 |
| Checksum | Message checksum. This is the sum of all the bytes in the message. | 1 |
| Checksum' | The 1's complement of the checksum. | 1 |

Fig. 21

| Field | Description (Move Message Format) | Bytes |
|---|---|---|
| Header | Message header as defined by Fig. 19. | 14 |
| X | The X co-ordinate of the touch position. | 1 |
| Y | The Y co-ordinate of the touch position. | 1 |
| Checksum | Message checksum. This is the sum of all the bytes in the message. | 1 |
| Checksum' | The 1's complement of the checksum. | 1 |

Fig. 22

| Field | Description (Press and Release Message Format) | Bytes |
|---|---|---|
| Header | Message header as defined by Fig. 19. | 14 |
| X | The X co-ordinate of the touch position. | 1 |
| Y | The Y co-ordinate of the touch position. | 1 |
| Length | The number of bytes of data. Can be zero. | 2 |
| Data | The data associated with the user interface element. | Length |
| Checksum | Message checksum. This is the sum of all the bytes in the message. | 1 |
| Checksum' | The 1's complement of the checksum. | 1 |

Fig. 23

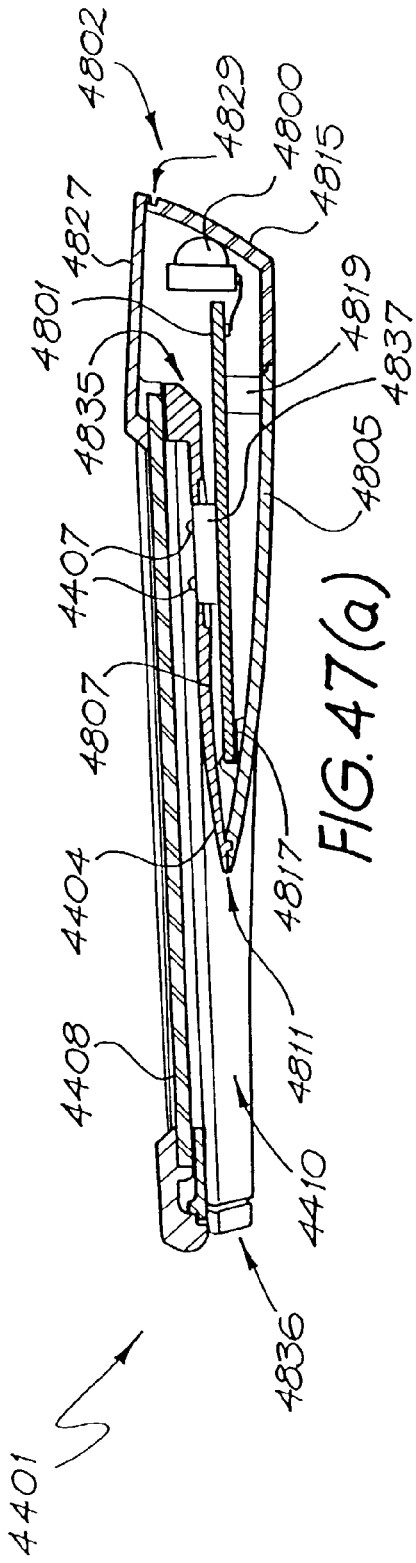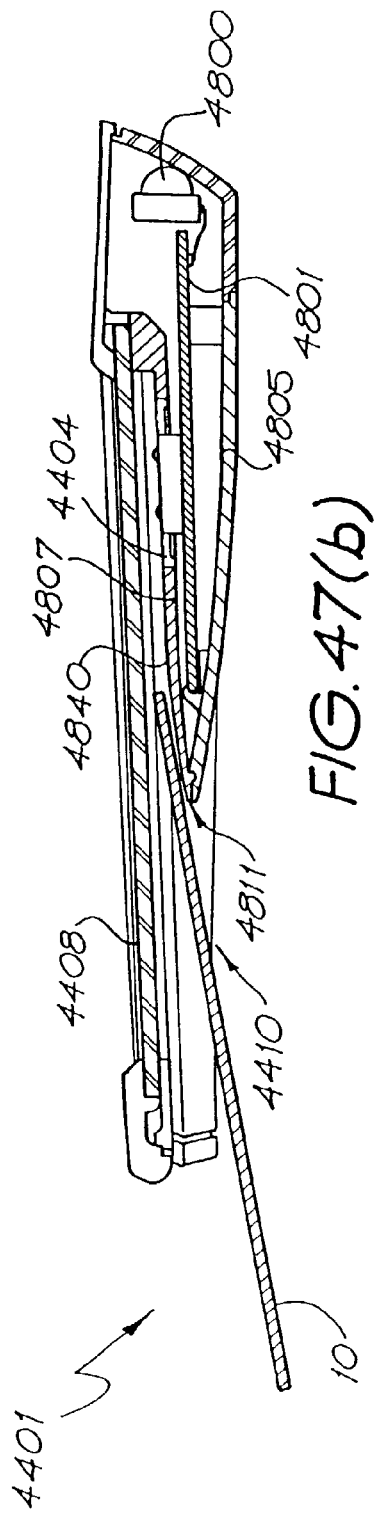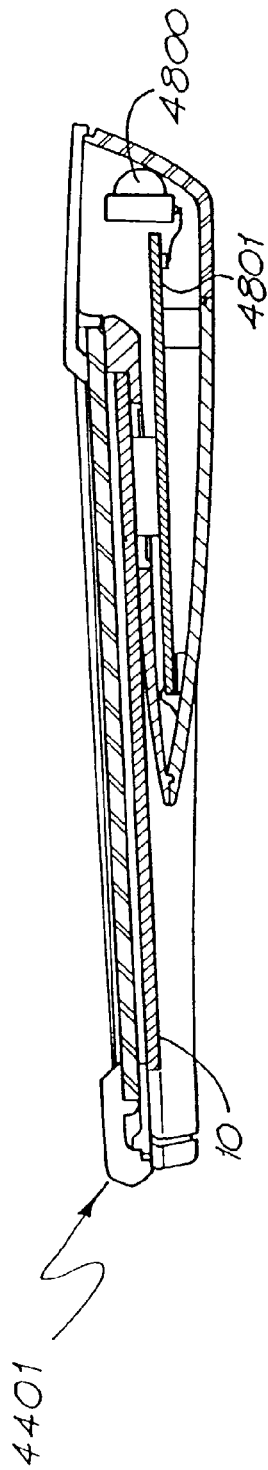

CARD READING DEVICE FOR SERVICE ACCESS

TECHNICAL FIELD OF THE INVENTION

The present invention relates to a control template or smart card for use with a remote reader device and, in particular, to a card interface system for providing a service. The invention also relates to a computer program product including a computer readable medium having recorded thereon a computer program for a card interface system.

BACKGROUND ART

Control pads of various types are known and used across a relatively wide variety of fields. Typically, such pads include one or more keys, buttons or pressure responsive areas which, upon application of suitable pressure by a user, generate a signal which is supplied to associated control circuitry.

Unfortunately, prior art control pads are somewhat limited, in that they only allow for a single arrangement of keys, buttons or pressure sensitive areas. Standard layouts rarely exist in a given field, and so a user is frequently compelled to learn a new layout with each control pad they use. For example, many automatic teller machines ("ATMs") and electronic funds transfer at point of sale ("EFTPOS") devices use different layouts, notwithstanding their relatively similar data entry requirements. This can be potentially confusing for a user who must determine, for each control pad, the location of buttons required to be depressed. The problem is exacerbated by the fact that such control pads frequently offer more options than the user is interested in, or even able to use.

Overlay templates for computer keyboards and the like are known. However, these are relatively inflexible in terms of design and require a user to correctly configure a system, with which the keyboard is associated, each time the overlay is to be used.

One known arrangement involves a smart card reading device intended for the remote control of equipment. Such, for example, allows a television manufacturer, to manufacture a card and supply same together with a remote control housing and a television receiver. A customer is then able to utilize the housing in conjunction with the card as a remote control device for the television receiver. In this manner, the television manufacturer or the radio manufacturer need not manufacture a specific remote control device for their product, but can utilize the remote control housing in conjunction with their specific card.

However, the above-described concept suffers from the disadvantage that control data stored upon the card and being associated with the apparatus to be controlled, comes from the manufacturer of the application and is thus limited in its application.

SUMMARY OF THE INVENTION

It is an object of the present invention to substantially overcome, or at least ameliorate, one or more disadvantages of existing arrangements.

According to a first aspect of the present invention there is provided a read device for reading an interface card, said card being configured for insertion into said read device, wherein said card comprises indicia formed thereon and a memory having data stored therein for communicating with an external device, said read device comprising:

a substantially transparent touch sensitive membrane arranged to overlay said interface card upon receipt of said card in said read device, a central processing unit for sending a service identifier, a distinguishing identifier and a specific portion of said data to said external device, said specific data being related to a user selected indicia, wherein a service identified by the service identifier upon receipt of said data is provided via said external device.

According to another aspect of the present invention there is provided a program configured for execution in a read device, said read device comprising a substantially transparent touch sensitive membrane arranged to overlay a removable interface card received therein, said card comprising a substrate and indicia formed on said substrate, said program comprising:

code for reading a service identifier, distinguishing identifier and a specific portion of data stored within a memory of said card, said specific data being related to a user selected indicia; and code for a sending said identifiers and said specific data to an external device, whereby a service is provided by said external device, said service being identified by the service identifier.

According to still another aspect of the present invention there is provided a method of processing data on a read device, said read device comprising a substantially transparent touch sensitive membrane arranged to overlay a removable interface card, said card comprising a substrate with indicia formed thereon, said method comprising the steps of:

reading a service identifier, distinguishing identifier and a specific portion of data stored within a memory of said card, said specific data being related to a user selected indicia; and sending said identifiers and said specific data to an external device, whereby a service is provided via said external device, said service being identified by the service identifier.

According to still another aspect of the present invention there is provided a read device for reading an interface card, said card comprising indicia formed thereon and a memory having data stored therein and being configured for insertion into said read device, said read device comprising:

substantially transparent touch sensitive means arranged to overlay said interface card upon receipt of said card in said read device, read means for reading a service identifier, distinguishing identifier and a specific portion of data stored in the card, said specific data being related to user selected indicia; and send means for sending said identifiers and said data to an external device, wherein a service is provided via said external device, said service being identified by the service identifier.

According to still another aspect of the present invention there is provided a card interface system comprising an interface card and a read device, said card being configured for insertion into said read device, and said card comprising at least a substrate with indicia formed thereon, said read device comprising a substantially transparent touch sensitive membrane arranged to overlay said card, said system comprising:

a memory being associated with said card and for storing a service identifier, distinguishing identifier and data related to a user selected indicia; and a central processing unit integrally formed within said read device for sending said identifiers and said data to an external device in order that a user of said card receives a service via said external device, said service being identified by the service identifier.

According to still another aspect of the present invention there is provided an electronic card reader for reading an electronic card, said electronic card having at least one indicia formed thereon and an electronic memory having data stored therein for controlling data controlled equipment, said electronic reader comprising:

a touch sensitive substantially transparent membrane having an upper surface configured to be depressible by a user of said reader;

a receptacle shaped to receive said electronic card, wherein said electronic card received therein and said indicia can be viewed through said touch sensitive membrane; and an electronic circuit coupled to said membrane to read a specific portion of said data from said memory according to depression of said membrane associated with a specific one of said indicia, and for sending said specific data together with a service identifier and a distinguishing identifier to said data controlled equipment, wherein a function is provided via said data controlled equipment depending upon said specific data, said function being associated with said service identifier.

According to still another aspect of the present invention there is provided a read device for an interface card, said card comprising a substrate having at least one indicia formed thereon, said read device comprising:

a receptacle shaped to receive said interface card;

a substantially transparent touch sensitive membrane arranged to overlay said interface card upon receipt of said interface card in said receptacle such that said indicia can be viewed through said touch sensitive membrane; and an electronic circuit for coupling to a memory component of said interface card and for reading data related to one of said indicia selected by a user of said read device via said membrane, wherein said electronic circuit is configured to send said data together with a service identifier and a distinguishing identifier to an external device, wherein a service associated with said service identifier is provided via said external device upon receipt of said read data.

According to still another aspect of the present invention there is provided a program executable in an electronic card reader for reading an electronic card having data configured for controlling data controlled equipment, said electronic card having at least one indicia formed thereon and an electronic memory having said data stored therein, said reader having a touch sensitive substantially transparent membrane configured to be depressible by a user of said reader, wherein said electronic card and said indicia can be viewed through said touch sensitive membrane upon insertion of said card into said reader, said program comprising:

code for detecting a selection of one of said indicia upon depression of said touch sensitive membrane;

code for reading selected data from said memory according to said depression of said membrane associated with one indicia, said selected data comprising at least a service identifier, a distinguishing identifier and specific data associated with said one indicia;

code for sending said selected data to said data controlled equipment, wherein a function being provided via said data controlled equipment upon receipt of said selected data, said function being associated with said service identifier.

According to still another aspect of the present invention there is provided a read device having a substantially transparent touch sensitive membrane arranged to overlay a detachable interface card which comprises a substrate and indicia formed on said substrate, said device comprising:

a central processing unit for determining a validity of said card upon insertion of said card into said read device, and for sending a service identifier and data stored in the card to an external device, said data being related to a user pressed indicia, in order that a card user receives a service identified via said external device according to said pressed indicia.

According to still another aspect of the present invention there is provided a read device having a substantially transparent touch sensitive membrane arranged to overlay a detachable interface card which comprises a substrate and indicia formed on said substrate, said device comprising:

a central processing unit for determining a validity of said card upon insertion of said card into said read device, and for sending a service identifier and user press coordinates to an external device upon selection of at least one of said indicia utilizing said touch sensitive membrane, in order that a card user receives a service identified according to the service identifier.

According to still another aspect of the present invention there is provided a read device having a substantially transparent touch sensitive membrane arranged to overlay a detachable interface card, said card comprising a substrate and indicia formed thereon, said device comprising:

a central processing unit configured for distinguishing an identifier stored in said card and for sending a service identifier and user press coordinates to an external device, said coordinates representing a press position on said touch sensitive membrane to select at least one of said indicia, wherein said service identifier is based on a result of said distinction, and wherein a card user receives a service identified by said service identifier via said external device.

According to still another aspect of the present invention there is provided a read device having a substantially transparent touch sensitive membrane arranged to overlay a detachable interface card, said card comprising a substrate and indicia formed on said substrate, said device comprising:

a central processing unit configured for detecting a user press on said touch sensitive membrane and for sending touch coordinates corresponding to said user press to an external device, wherein said touch coordinates are used as cursor information.

According to still another aspect of the present invention there is provided a read device having a substantially transparent touch sensitive membrane arranged to overlay a detachable interface card inserted into said read device, said device comprising:

a central processing unit for reading information that affects functions that said card performs in said read device, and for performing the functions based on said information.

According to still another aspect of the present invention there is provided a read device having a substantially transparent touch sensitive membrane arranged to overlay a detachable interface card inserted into said device, said device comprising:

a central processing unit configured for generating a session identifier identifying a current session of a card insertion, said session identifier being a number incremented each time a card is inserted into said read device, said central processing unit being further configured for sending said session identifier to an external device in order to determine the validity of said inserted card.

According to still another aspect of the present invention there is provided a service providing apparatus for providing a service to a card user utilizing a card read device having a substantially transparent touch sensitive membrane arranged to overlay a detachable interface card inserted into said apparatus, said card comprising a substrate having indicia formed thereon, said apparatus comprising:

a central processing unit adapted for receiving, from said read device, a service identifier and user press coordinates corresponding to a press position on said membrane, and for matching said coordinates with data associated with at least one of said indicia in order to read at least a portion of said data corresponding to said coordinates from said service providing apparatus, said central processing unit being further adapted to provide said user with a service identified by said service identifier, said service being associated with said at least one indicia.

According to still another aspect of the present invention there is provided a service providing apparatus for providing a service to a card user utilizing a card read device having a substantially transparent touch sensitive membrane arranged to overlay a detachable interface card inserted into said apparatus, said card comprising a substrate with indicia formed thereon, said apparatus comprising:

a central processing unit adapted for matching user press coordinates corresponding to a press position on said membrane with data associated with at least one of said indicia in order to read at least a portion of said data corresponding to said coordinates from said service providing apparatus upon said apparatus receiving a service identifier and said coordinates from said read device, said central processing unit being further adapted to provide said user with a service identified by said service identifier, said service being associated with said at least one indicia.

According to still another aspect of the present invention there is provided a service providing apparatus for providing a service to a card user utilizing a card read device having a substantially transparent touch sensitive membrane arranged to overlay a detachable interface card inserted into said apparatus, said card comprising a substrate having indicia formed thereon, said apparatus comprising:

a central processing unit adapted for receiving, from said read device, user press coordinates corresponding to a press position on said membrane, and for matching said coordinates with data associated with at least one of said indicia in order to read at least a portion of said data corresponding to said coordinates from said service providing apparatus, said central processing unit being further adapted to provide said user with a service associated with said at least one indicia.

According to still another aspect of the present invention there is provided a service providing apparatus for providing a service to a card user utilizing a card read device having a substantially transparent touch sensitive membrane arranged to overlay a detachable interface card inserted into said apparatus, said card comprising a substrate having indicia formed thereon, said apparatus comprising:

a central processing unit adapted for matching user press coordinates with data corresponding to a press position on said membrane with data associated with at least one of said indicia in order to read at least a portion of said data corresponding to said coordinates from said service providing apparatus upon said apparatus receiving said coordinates from said read device, said central processing unit being further adapted to provide said user with a service associated with said at least one indicia.

Other aspects of the invention are also disclosed.

BRIEF DESCRIPTION OF THE DRAWINGS

One or more embodiments of the present invention will now be described with reference to the drawings, in which:

FIG. 12 shows a description of each of the fields of the header of FIG. 11;

FIG. 13 shows a description of each of the flags contained in the header of FIG. 11;

FIG. 14 shows a description for each of the fields of the object header for the card of FIG. 1;

FIG. 15 shows a description of the flag for the object header of FIG. 14;

FIG. 16 shows a description of each of the object types for the object header of FIG. 14;

FIG. 17 shows a description of each of the fields for a User Interface (UI) object structure according to the object header of FIG. 14;

FIG. 18 shows a description for each of the user interface (UI) object flags according to the object header of FIG. 14;

FIG. 19 shows the format of a message header that is sent from the reader of FIG. 1;

FIG. 20 shows a table listing message event types for the header of FIG. 19;

FIG. 21 shows the format of a simple message;

FIG. 22 shows the format of a MOVE message;

FIG. 23 shows the format of PRESS and RELEASE messages;

FIG. 47(a) is a longitudinal cross-sectional view along the line V—V of FIG. 44;

FIG. 47(b) is a view similar to FIG. 47(a), with a card partially inserted into the receptacle of the reader; and FIG. 47(c) is a view similar to FIG. 47(a), with a card fully inserted into the template receptacle of the reader.

DETAILED DESCRIPTION INCLUDING BEST MODE

Figure 1:
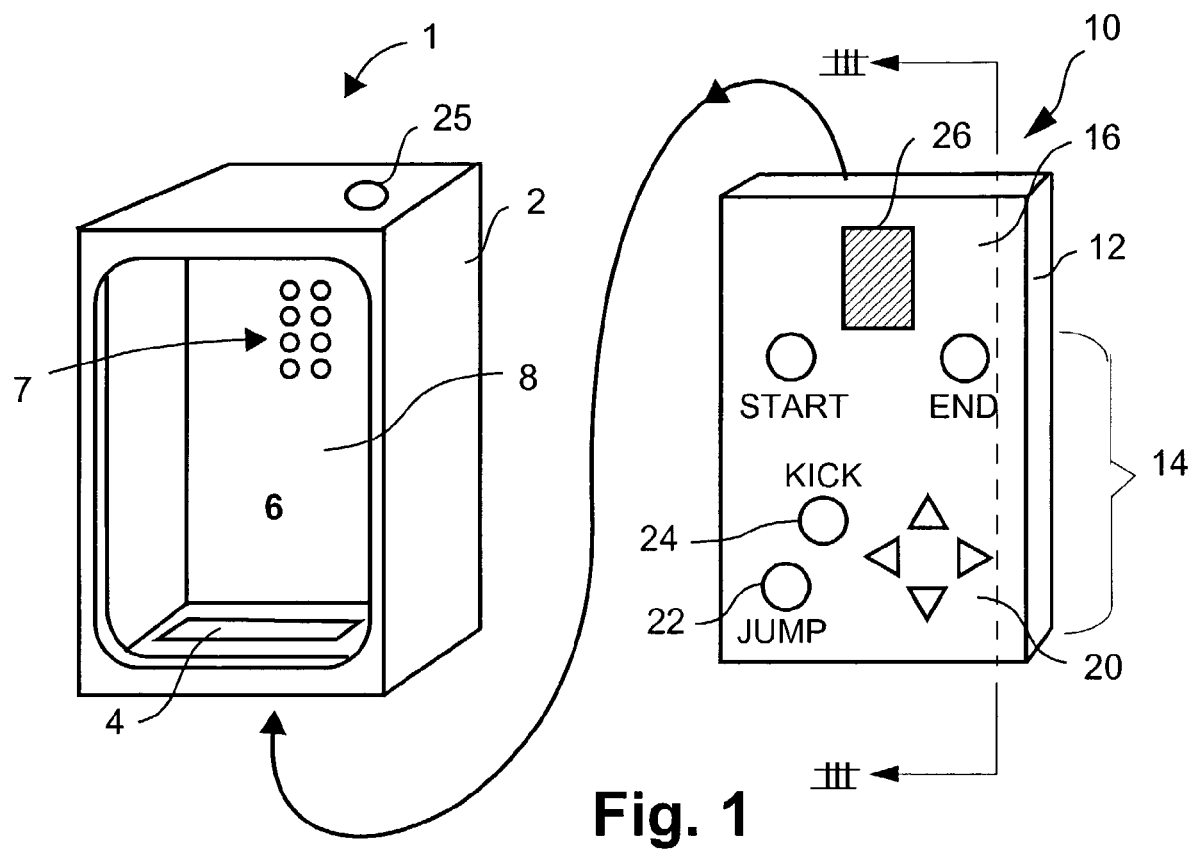
FIG. 1 is a perspective view of a read device and an associated card.

Where reference is made in any one or more of the accompanying drawings to steps and/or features, which have the same reference numerals, those steps and/or features have for the purposes of this description the same function(s) or operation(s), unless the contrary intention appears.

The arrangement disclosed herein has been developed primarily for use with remote control systems, automatic tellers, video game controllers, and network access and will be described hereinafter with reference to these and other applications. However, it will be appreciated that the invention is not limited to these fields of use.

For ease of explanation the following description has been divided into Sections 1.0 to 12.0, each section having associated subsections.

1.0 Card Interface System Overview

Figure 2:
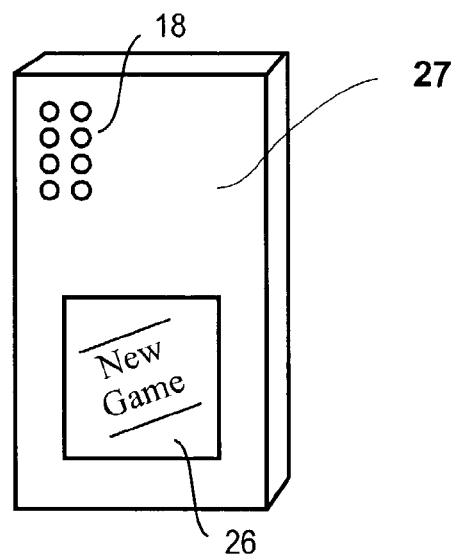
FIG. 2 is a perspective view of an opposite side of the card shown in FIG. 1.

Referring to FIG. 1, there is provided a remote reader 1, having a housing 2 which defines a card receptacle 4 and a viewing area 6. Data reading means are provided in the form of exposed electrical contacts 7 and associated control circuitry (not shown). The remote reader 1 also includes sensor means in the form of a substantially transparent pressure sensitive membrane forming a touch panel 8 covering the viewing area 6. The remote reader 1 disclosed herein has been described as having a substantially transparent pressure sensitive membrane forming the touch panel. However, it will be appreciated by one skilled in the art that alternative technology can be used as a substantially transparent touch panel. For example, the touch panel can be resistive or temperature sensitive. The remote reader 1 is configured for use with a user interface (UI) card, which, in the arrangement shown in FIGS. 1 to 3, takes the form of an electronic smart card 10. The smart card 10 includes a laminar substrate 12 with various control indicia 14 in the form of a four way directional controller 20, a "jump button" 22, a "kick button" 24, a "start button" and an "end button" printed on an upper face 16 thereof. Other non-control indicia, such as promotional or instructional material, can be printed alongside the control indicia. For example, advertising material 26 can be printed on the front face of the smart card 10 or on a reverse face 27 of the card 10, as seen in FIG. 2.

Figure 3:
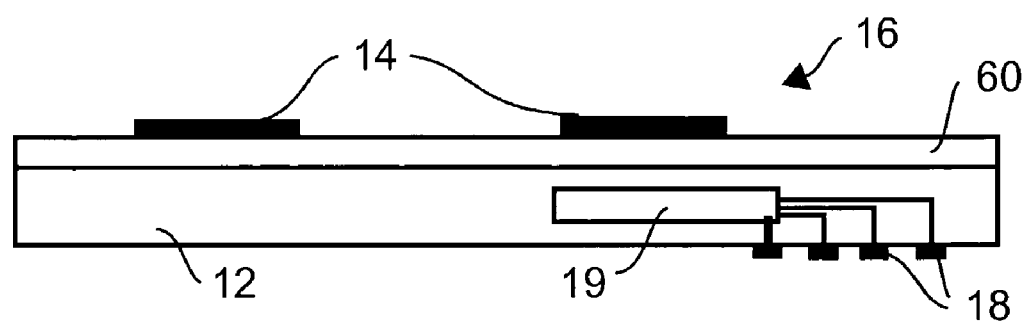
FIG. 3 is a longitudinal cross-sectional view of the card shown in FIG. 1 taken along the line III—III.

As seen in FIG. 3, the smart card 10 includes storage means in the form of an on-board memory chip 19 for data associated with the control indicia. The smart card 10 also includes electrical data contacts 18 connected to the on-board memory chip 19 corresponding with the exposed contacts 7 on the remote reader 1.

As again seen in FIG. 3, the upper face 16 may be formed by an adhesive label 60 upon which are printed control indicia 64, in this case corresponding to the "End Button" and the "Right-arrow button" of the directional controller 20. The label 60 is affixed to the laminar substrate 12. In accordance with this arrangement, a home user can print a suitable label for use with a particular smart card 10 by using a printer, such as a color BUBBLE JET™ printer manufactured by Canon, Inc. Alternatively, the control indicia 14 can be printed directly onto the laminar substrate or separate adhesive labels can be used for each of the control indicia.

In use, the smart card 10 is inserted into the card receptacle 4, such that the pressure sensitive touch panel 8 covers the upper face 16 of the smart card 10. In this position, the control indicia are visible within the viewing area 6 through the transparent pressure sensitive touch panel 8.

The exposed contacts 7 and associated circuitry of the reader 1 are configured to read the stored data associated with the control indicia 14 from the memory chip 19, either automatically upon insertion of the smart card 10 into the control template receptacle 4, or selectively in response to a signal from the remote reader 1. This signal can, for example, be transmitted to the smart card 10 via the exposed contacts 7 and data contacts 18.

Once the data associated with the control indicia 24 has been read, a user can press areas of the pressure sensitive touch panel 8 on or over the underlying control indicia 14. By sensing the pressure on the pressure sensitive touch panel 8 and referring to the stored data, the remote reader 1 can deduce which of the control indicia 14 the user has selected. For example, if the user places pressure on the pressure sensitive touch panel 8 adjacent the "kick button" 24, the remote reader 1 is configured to assess the position at which the pressure was applied, refer to the stored data, and determine that the "kick" button 24 was selected. This information can then be used to control an external device, for example, an associated video game console (of conventional construction and not shown).

It will be appreciated from above that the control indicia 14 are not, in fact buttons. Rather, the control indicia 14 are user selectable features which by virtue of their corresponding association with the mapping data and the function of the touch panel 8, operate to emulate buttons traditionally associated with remote control devices.

In one arrangement, the remote reader 1 includes a transmitter (of conventional type and not shown), such as an infra-red (IR) transmitter or radio frequency (RF) transmitter, for transmitting information in relation to indicia selected by the user. In the arrangement shown in FIG. 1, the remote reader 1 incorporates an IR transmitter having the remote reader 1 has an IR transmitter having an IR light emitting diode (LED) 25. Upon selection of one of the control indicia 20, 22, 24, 64, the remote reader 1 causes information related to the selection to be transmitted to a remote console (not shown in FIG. 1) where a corresponding IR receiver can detect and decode the information for use in controlling some function, such as a game being played by a user of the reader 1.

Any suitable transmission method can be used to communicate information from the remote reader 1 to the remote console, including direct hard-wiring. Moreover, the remote console itself can incorporate a transmitter, and the remote reader 1, a receiver, for communication in an opposite direction to that already described. The communication from the remote console to the remote reader 1 can include, for example, handshaking data, setup information, or any other form of information desired to be transferred from the remote console to the remote reader 1.

Figure 4:
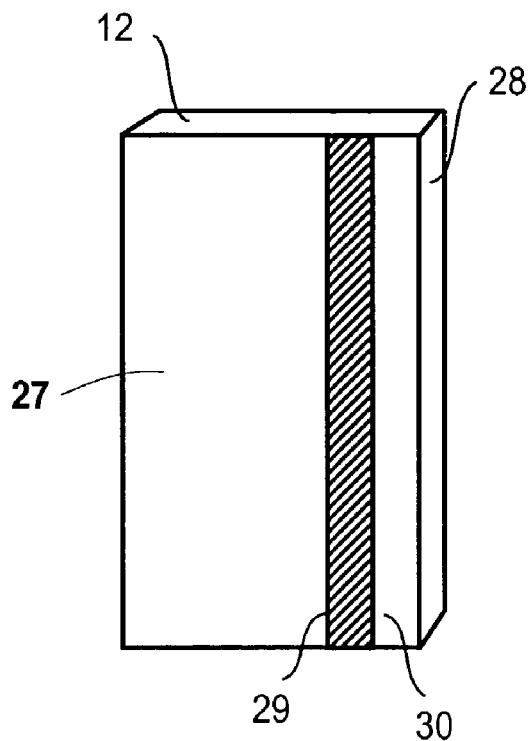
FIGS. 4 and 5 are perspective views of the rear face of alternative arrangements of the card shown in FIG. 1.

Turning to FIG. 4, there is shown an alternative arrangement of the card shown in FIGS. 1 and 2, taking the form of a control card 30. The control card 30 still includes a laminar substrate 12 bearing control indicia. However, in this arrangement the storage means takes the form of a magnetic strip 29 formed along an edge 28 of the reverse face 27 of the control card 30. The stored data associated with the control indicia may be stored on the magnetic strip 29 in a conventional manner. A corresponding reader (not shown) for this arrangement includes a magnetic read head positioned at or adjacent an entrance to the corresponding control template receptacle. As the control card 30 is slid into the card receptacle, the stored data is automatically read from the magnetic strip 29 by the magnetic read head. The reader may then be operated in a manner corresponding to the arrangement of FIG. 1.

Figure 5:
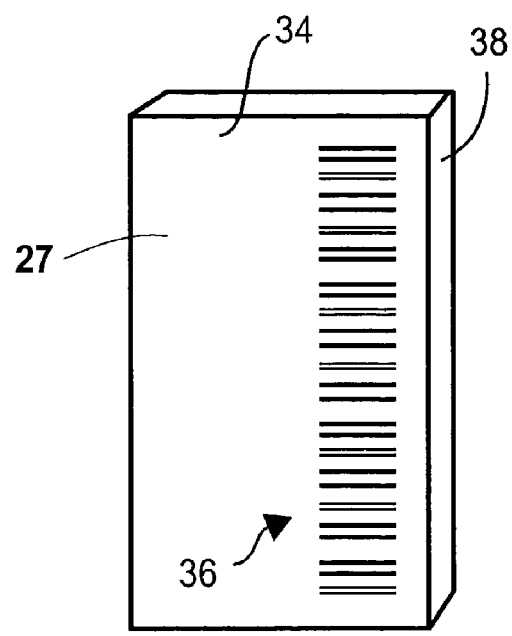

FIG. 5 shows another arrangement of a card in the form of a control card 34, in which the storage means takes the form of machine readable indicia. In the arrangement shown in FIG. 5, the machine readable indicia takes the form of a barcode 36 formed along an edge 38 of the reverse face 27 of the card 34. The stored data is suitably encoded, and then printed in the position shown. A corresponding controller (not shown) for the arrangement shown in FIG. 5 includes an optical read head positioned at or adjacent an entrance to the associated control template receptacle. As the card 34 is slid into the control receptacle, the stored data is automatically read from the barcode 36 by the optical read head. Alternatively, the barcode can be scanned using a barcode reader associated with the reader immediately prior to inserting the card 34, or scanned by an internal barcode reader scanner once the card 34 has completely been inserted. The card 34 may then be operated in a manner again corresponding to the arrangement of FIG. 1. It will be appreciated that the position, orientation and encoding of the barcode can be altered to suit a particular application. Moreover, any other form of machine readable indicia can be used, including embossed machine-readable figures, printed alpha-numeric characters, punched or otherwise formed cut outs, optical or magneto optical indicia, two dimensional bar codes. Further, the storage means can be situated on the same side of the card 10 as the control indicia.

Figure 6A:
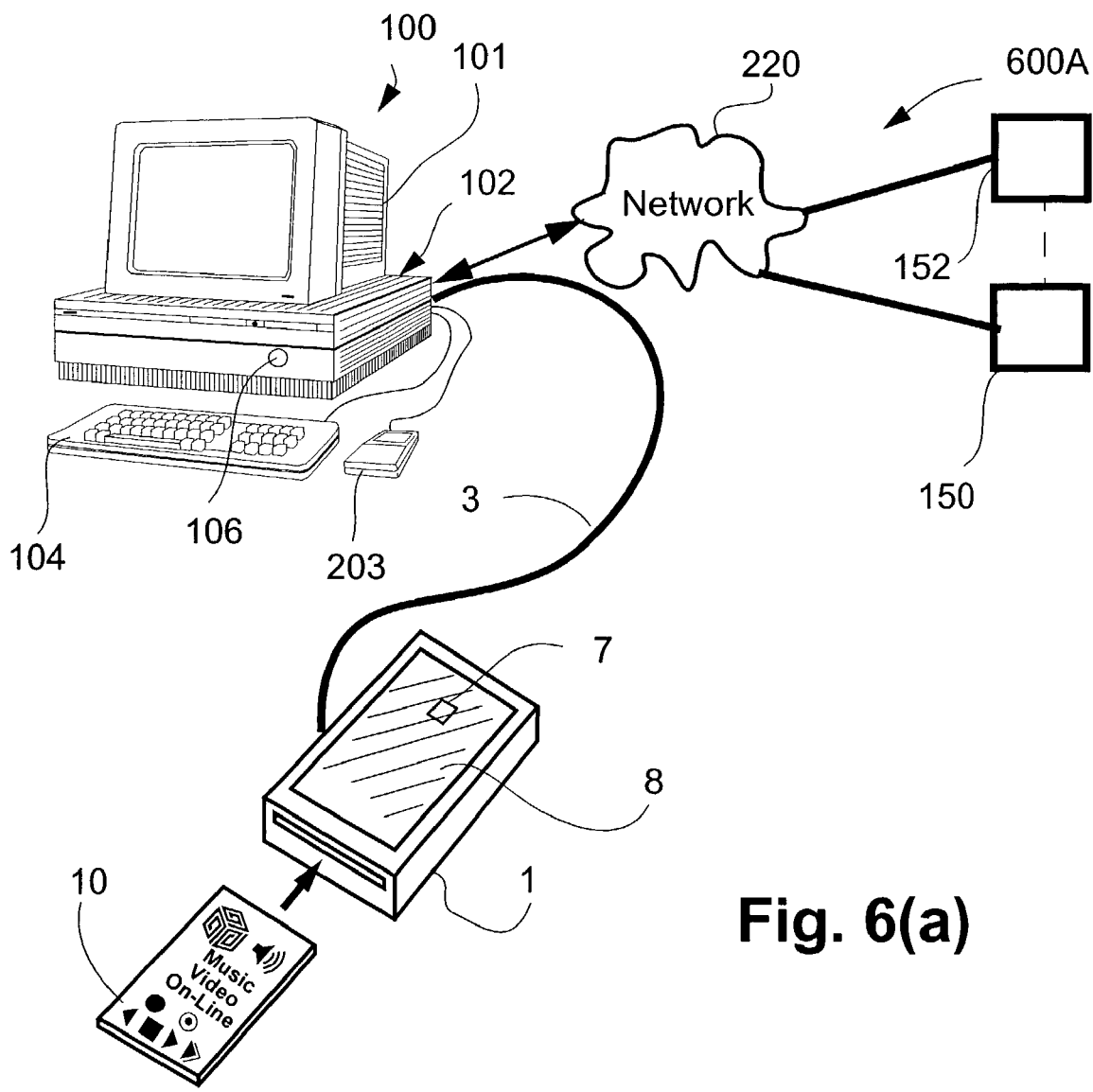
FIG. 6(a) shows a hardware architecture for a card interface system according to a first arrangement.
Figure 6B:
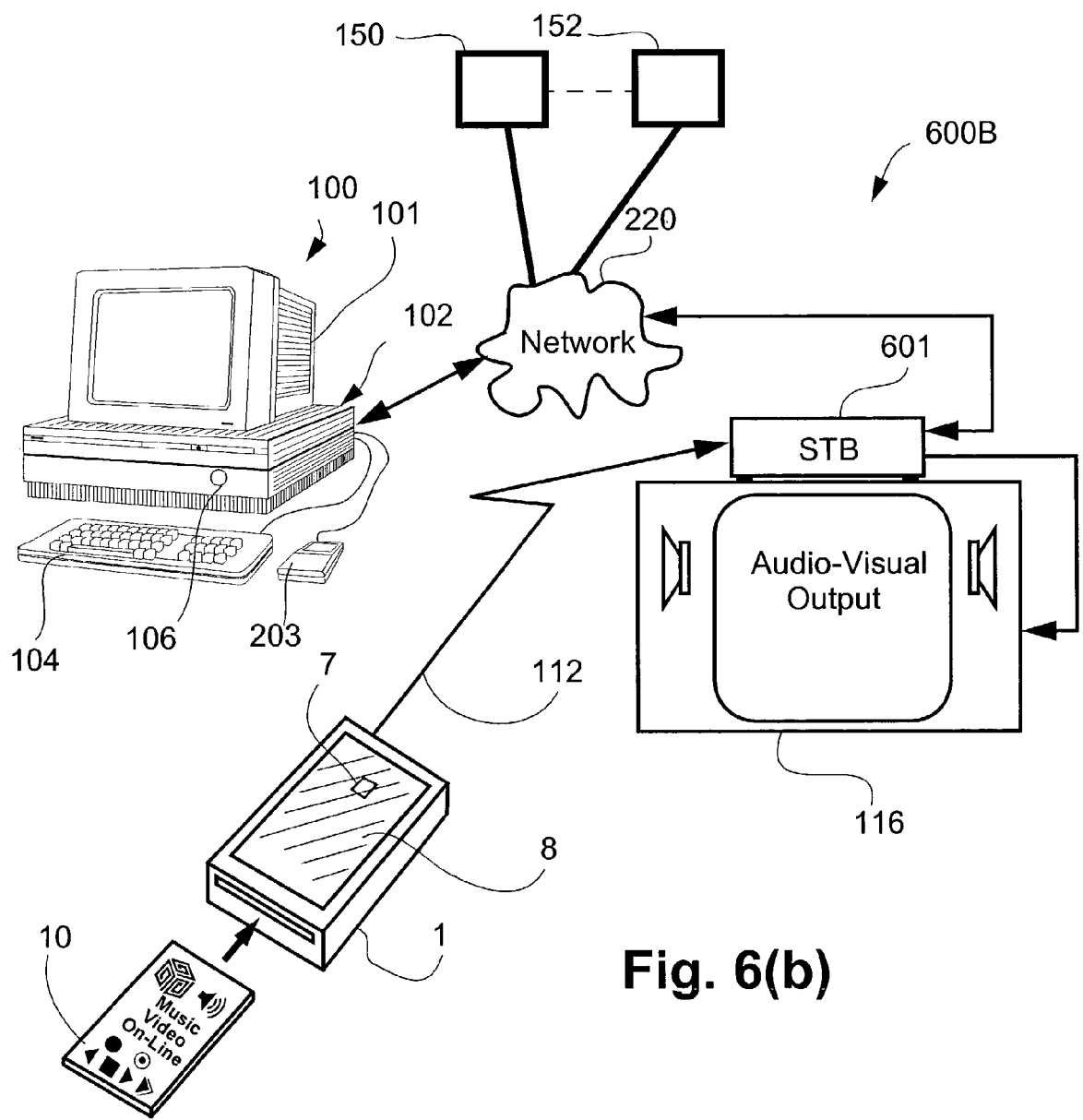
FIG. 6(b) shows a hardware architecture for a card interface system according to a second arrangement.

FIG. 6(*a*) shows a hardware architecture of a card interface system 600A according to a first arrangement. In accordance with the system 600A, the remote reader 1 is hard wired to a personal computer system 100 via a communications cable 3. Alternatively, instead of being hard-wired, a radio frequency or IR transceiver 106 can be used to communicate with the remote reader 1. The personal computer system 100 includes a screen 101 and a computer module 102. The computer system 100 will be explained in more detail below with reference to FIG. 7. A keyboard 104 and mouse 203 are also provided.

The preferred smart card 10 is programmable and can be created or customized by a third party, which in this case can be a party other than the manufacturer of the card and/or card reader. Alternatively, a barcode can be printed onto the card 10 at the same time as the control indicia. The third party can be the ultimate user of the smart card 10 itself, or may be an intermediary between the manufacturer and user. In accordance with the arrangement of FIG. 6(*a*), the smart card 10 can be programmed and customized for one touch operation to communicate with the computer 100 and obtain a service over a network 220, such as the Internet. The computer 100 operates to interpret signals sent via the communications cable 3 from the remote reader 1, according to a specific protocol, which will be described in detail below. The computer 100 performs the selected function according to touched control indicia (e.g. jump button 22), and can be configured to communicate data over the network 220. In this manner the computer 100 can permit access to applications and/or data stored on remote servers 150, 152 and appropriate reproduction on the display device 101.

FIG. 6(*b*) shows a hardware architecture of a card interface system 600B according to a second arrangement. In accordance with the system 600B, the remote reader 1 can be programmed for obtaining a service locally at a set top box 601, that couples to an output interface, in this example an audio-visual output device 116 such as a digital television set. The set-top box 601 operates to interpret signals 112 received from the remote reader 1, which may be electrical, radio frequency, or infra-red (IR), and according to a specific protocol which will be described in detail below. The set top box 601 can be configured to perform the selected function according to touched control indicia and permit appropriate reproduction on the output device 116. Alternatively, the set top box 601 can be configured to convert the signals 112 to a form suitable for communication and cause appropriate transmission to the computer 100. The computer 100 can then perform the selected function according to the control indicia, and provide data to the set-top box 601 to permit appropriate reproduction on the output device 116. The set top box 601 will be explained in more detail below with reference to FIG. 43.

In a still further application of the system 600B, the smart card 10 can be programmed for obtaining a service both remotely and locally. For instance, the smart card 10 can be programmed to retrieve an application and/or data stored on remote servers 150, 152, via the network 220, and to load the application or data on to the set top box 601. The latter card can be alternatively programmed to obtain a service from the loaded application on the set top box 601.

Unless referred to specifically, the systems 600A and 600B will be hereinafter referred to as the system 600.

Figure 7:
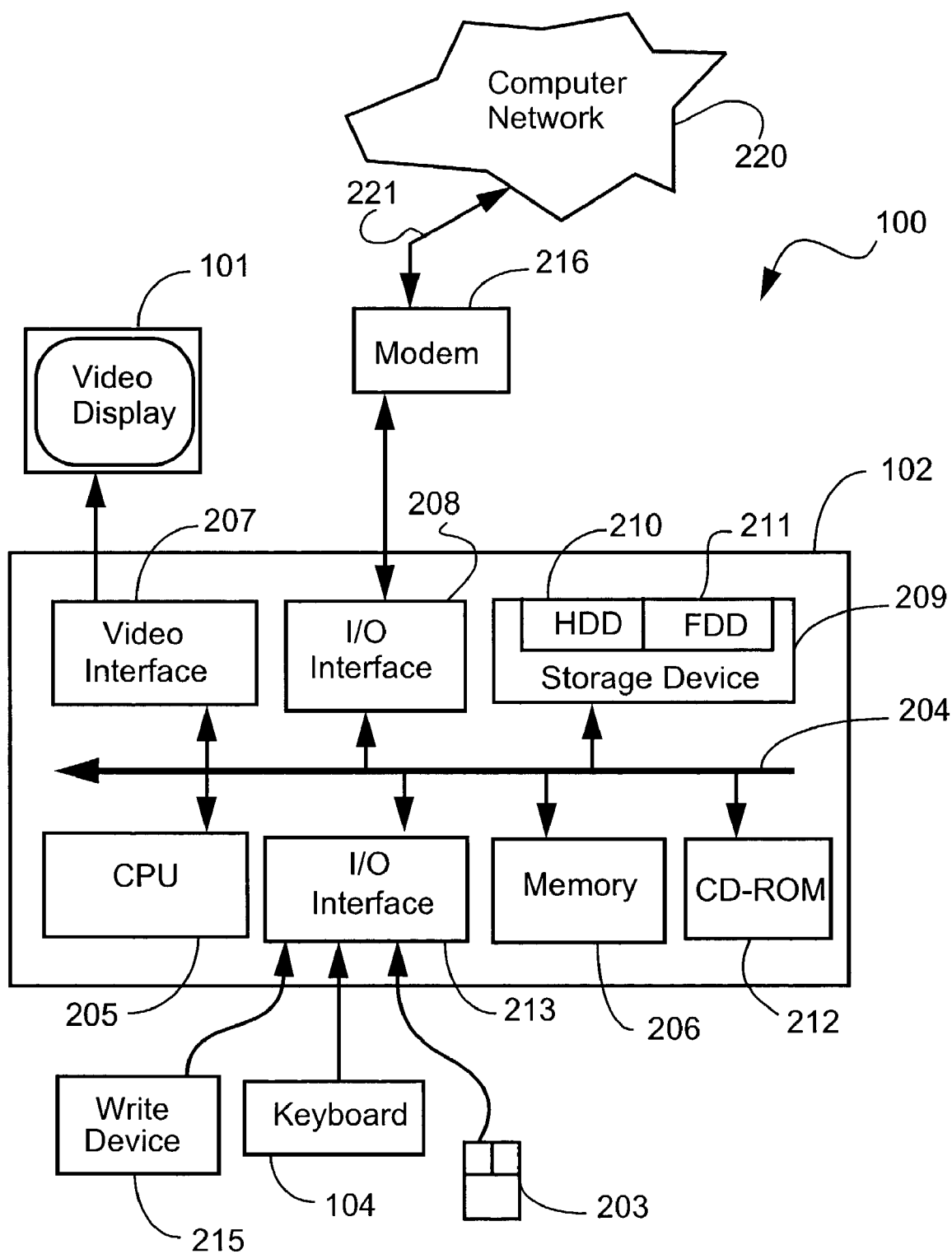
FIG. 7 is a schematic block diagram of a general purpose computer upon which arrangements described herein can be practiced.

FIG. 7 shows the general-purpose computer system 100 of the system 600, which can be used to run the card interface system and to run software applications for programming the smart card 10. The computer system 102 includes a computer module 102, input devices such as a keyboard 104 and mouse 203, output devices including the printer (not shown) and the display device 101. A Modulator-Demodulator (Modem) transceiver device 216 is used by the computer module 102 for communicating to and from the communications network 220, for example connectable via a telephone line 221 or other functional medium. The modem 216 can be used to obtain access to the Internet, and other network systems, such as a Local Area Network (LAN) or a Wide Area Network (WAN).

The computer module 102 typically includes at least one central processing unit (CPU) 205, a memory unit 206, for example formed from semiconductor random access memory (RAM) and read only memory (ROM), input/output (I/O) interfaces including a video interface 207, and an I/O interface 213 for the keyboard 104 and mouse 203, a write device 215, and an interface 208 for the modem 216. A storage device 209 is provided and typically includes a hard disk drive 210 and a floppy disk drive 211. A magnetic tape drive (not illustrated) is also able to be used. A CD-ROM drive 212 is typically provided as a non-volatile source of data. The components 205 to 213 of the computer module 201, typically communicate via an interconnected bus 204 and in a manner which results in a conventional mode of operation of the computer system 102 known to those in the relevant art. Examples of computers on which the arrangement described herein can be practiced include IBM-computers and compatibles, Sun Sparcstations or alike computer system evolved therefrom.

Typically, the software programs of the system 600 are resident on the hard disk drive 210 and are read and controlled in their execution by the CPU 205. Intermediate storage of the software application programs and any data fetched from the network 220 may be accomplished using the semiconductor memory 206, possibly in concert with the hard disk drive 210. In some instances, the application programs can be supplied to the user encoded on a CD-ROM or floppy disk and read via the corresponding drive 212 or 211, or alternatively may be read by the user from the network 220 via the modem device 216. Still further, the software can also be loaded into the computer system 102 from other computer readable medium including magnetic tape, ROM or integrated circuits, a magneto-optical disk, a radio or infra-red transmission channel between the computer module 210 and another device, a computer readable card such as a smart card, a computer PCMCIA card, and the Internet and Intranets including email transmissions and information recorded on websites and the like. The foregoing is merely exemplary of relevant computer readable media. Other computer readable media are able to be practiced without departing from the scope and spirit of the invention.

The smart card 10 can be programmed by means of a write device 215 coupled to the I/O interface 213 of the computer module 102. The write device 215 can have the capability of writing data to the memory on the smart card 10. Preferably, the write device 215 also has the capability of printing graphics on the top surface of the smart card 10. The write device 215 can also have a function reading data from the memory on the smart card 10. Initially, the user inserts the smart card 10 into the write device 215. The user then enters the required data via the keyboard 104 of the general purpose computer 102 and a software application writes this data to the smart card memory via the write device 215. If the stored data is encoded for optical decoding such as using a barcode, the write device can print the encoded data onto the smart card 10.

Figure 43:
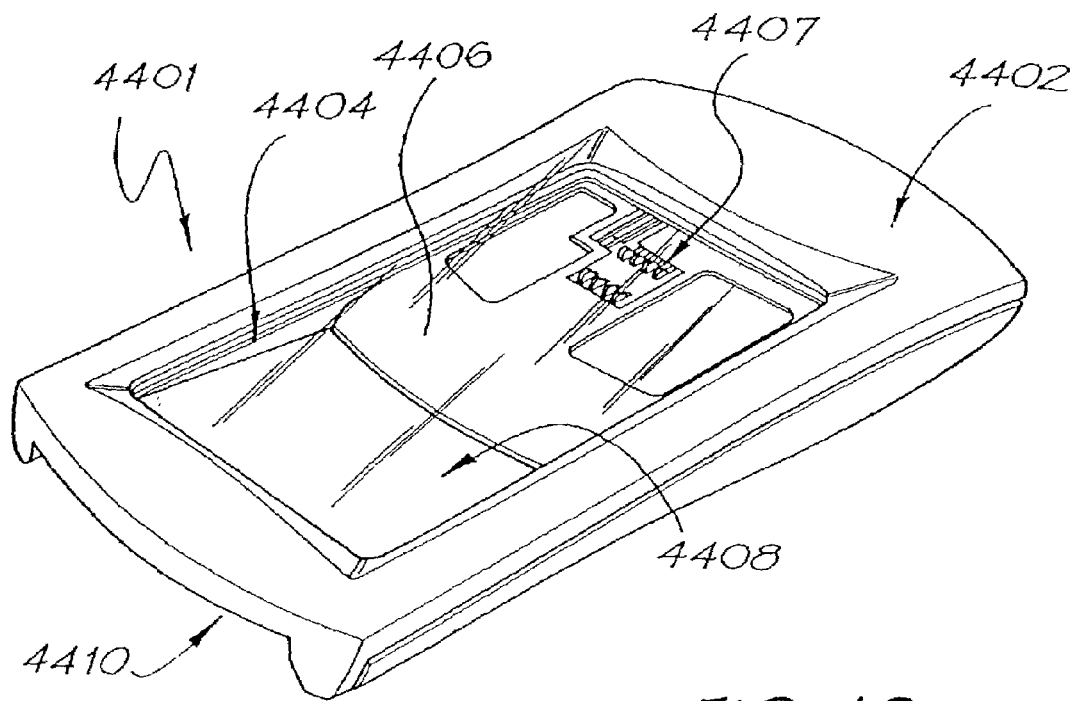
FIG. 43 is a perspective view of a "bottom-entry" reader according to one arrangement.

FIG. 43 shows the set top box 601 of the system 600, which can be used to interpret signals 112 received from the remote reader 1. The set top box 601 in some implementations essentially is a scaled version of the computer module 102. The set top box 601 typically includes at least one CPU unit 4305, a memory unit 4306, for example formed from semiconductor random access memory (RAM) and read only memory (ROM), and input/output (I/O) interfaces including at least an I/O interface 4313 for the digital television 116, an I/O interface 4315 having an IR transceiver 4308 for receiving and transmitting the signals 112, and an interface 4317 for coupling to the network 220. The components 4305, 4306, 4313, 4315 and 4317 of the set top box 601, typically communicate via an interconnected bus 4304 and in a manner which results in a conventional mode of operation. Intermediate storage of any data received from the remote reader 1 or network 220 may be accomplished using the semiconductor memory 4306. In accordance with a further arrangement, the set top box can include a storage device (not shown) similar to the storage device 209.

The card interface system 600 will now be explained in more detail in the following paragraphs.

Figure 8:
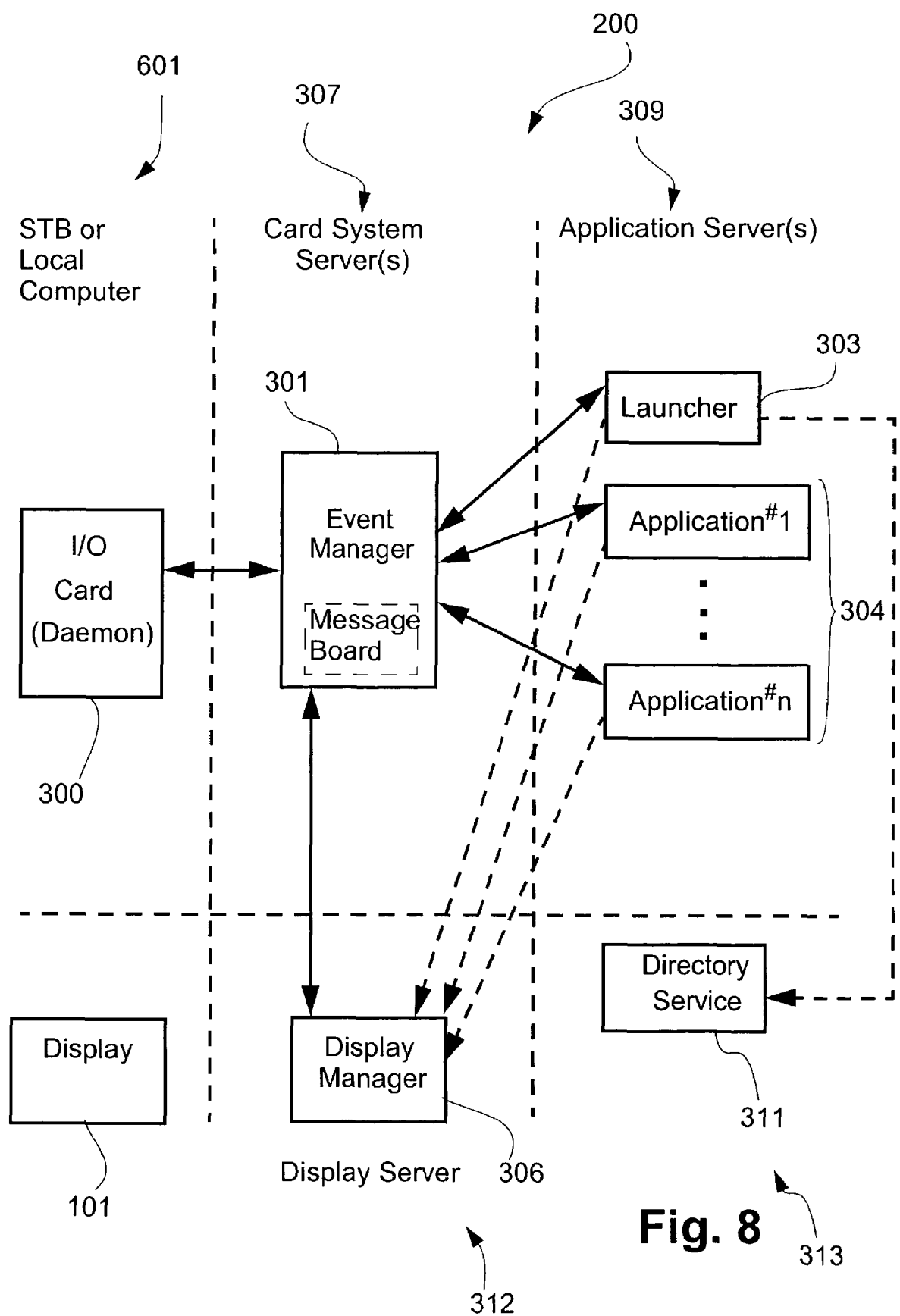
FIG. 8 is a schematic block diagram representation of a card interface system architecture according to the present disclosure.

2.0 Card Interface System Software Architecture 2.1 Software Architecture Layout A software architecture 200 for the hardware architectures depicted by the system 600, is generally illustrated in FIG. 8. The architecture 200 can be divided into several distinct process components and one class of process. The distinct processes include an I/O interface 300, which may be colloquially called an "I/O daemon" 300, an event manager 301, a display manager 306, an (application) launcher 303 and a directory service 311. The class of process is formed by one or more applications 304. In one arrangement, there exists one I/O daemon 300, one event manager 301, one display manager 306 and one launcher 303 for every smart card remote connection, usually formed by the set-top box 601, and one master launcher (not shown) for each computer 100 (e.g. the servers 150, 152) that is running the launchers 303, and at least one directory service 311 for all systems. The directory service 311, is queried by the launcher 303 to translate service data into a Resource Locator (e.g. a URL) that indicates a name or location of a service or the location or name of an application 304 to be used for the service.

In this form, the architecture 200 can be physically separated into six distinct parts 101, 307, 309, 312, 313 and 601 as shown by the dashed lines in FIG. 8, each of which can be run on physically separate computing devices. Communication between each of the parts of the system 600 is performed using Transport Control Protocol/Internet Protocol (TCP/IP) streams. Alternatively, each of the parts 101, 307, 309, 312, 313 and 601 can be run on the same machine.

In the arrangement of the system 600A of FIG. 6(a), all of the process components 300, 301, 303, 304 and 306 can run on the computer 100. The event manager 301, the launcher 303 and the display manager 306 are preferably all integrated into one executable program which is stored in the hard disk 209 of the computer 100 and can be read and controlled in its execution by the CPU 205. The directory service 311 runs on the same computer 100 or on a different computer (e.g. server 150) connected to the computer 100 via the network 220.

In the arrangement of the system 600B of FIG. 6(*b*), all of components 300 to 304 and 306 can run from the set-top-box 601. In this instance, the components 300 to 304 and 306 can be stored in the memory 4306 of the set top box 601 and can be read and controlled in their execution by the CPU 4305. The directory service 311 can run on the computer 100 and can be stored in the memory 206 of the computer 100 and be read and controlled in its execution by the CPU 205. Alternatively, the directory service 311 can be run on the set top box 601 or its function performed by the launcher 303.

In a still further arrangement, if the set-top-box 601 is not powerful enough to run the system 600 locally, the I/O daemon 300 can run on the set-top-box 601 and the remainder of the architecture 200 (i.e. process components 301, 303, 304, 306 and 311) can run remotely on the other servers (150, 152) which can be accessed via the network 220. In this instance, the I/O daemon 300 can be stored in the memory 4306 of the set top box 601 and can be read and controlled in its execution by the CPU 4305. Again, the functional parts of such a system can be divided as shown in FIG. 8.

2.1.1 I/O Daemon

The I/O daemon 300 is a process component that converts datagrams received from the remote reader 1 into a TCP/IP stream that can be sent to the event manager 301 and, when using a two-way protocol, vice versa. Any suitable data format can used by the remote reader 1. The I/O daemon 300 is preferably independent of any changes to the remote reader 1 data format, and can work with multiple arrangements of the remote reader 1. In one implementation of the system 600, the I/O daemon 300 is integrated into the event manager 301.

In the system 600A, the I/O daemon 300 is started when a user starts the smart card system 600 by powering up the computer 100 and the event manager 301 has been started. In a further arrangement of the system 600, the I/O daemon 300 is started when a user starts the system 600 by turning on the set-top box 601.

The I/O daemon 300 will be explained in more detail below with reference to section 9.0.

2.1.2 Event Manager

The event manager 301 forms a central part of the architecture 200 in that all communications are routed through the event manager 301. The event manager 301 is configured to gather all events that are generated by the remote reader 1 and relayed by the I/O daemon 300. These events are then redistributed to the various process components 300 to 304 and 306 and running applications. The event manager 301 is also configured to check that an event has a valid header, correct data length, but is typically not configured to check that an event is in the correct format. An "event" in this regard represents a single data transaction from the I/O daemon 300 or the launcher 303 or applications 304.

Any changes in protocol between different systems can be dealt with by the event manager 301. Where possible, events can be rewritten to conform with the data format understood by any presently running application 304. If such is not possible, then the event manager 301 reports an error to the originating application 304. When different data formats are being used, for example with a system running multiple smart cards, the event manager 301 preferably ensures that the smallest disruption possible occurs.

The event manager 301 does not have any presence on the display screen or other output device 116. However, the event manager 301 can be configured to instruct the display manager 306 which application is presently required (i.e. the "front" application) and should currently be displayed on the display 101. The event manager 301 infers this information from messages passed to the applications 304 from the launcher 303 as will be explained in more detail below with reference to section 10.0.

The event manager 301 can be configured to always listen for incoming I/O daemon connections or alternatively, can start the system 600. The method used is dependent on the overall arrangement of the system 600. Depending on the configuration of the system 600, the event manager 301 can start the system 600 or the set top box 601 can use the incoming connection of the I/O daemon 300 to start the system 600. The event manager 301 will be described in more detail below with reference to section 7.0.

2.1.3 Master Launcher

In one arrangement, where a thin client computer is being utilized and multiple launchers 303 are running with each launcher 303 being responsible for one set top box, a master launcher (not shown) which communicates directly with the event manager 301 can be used. The master launcher is used to start the launcher 303 corresponding to each of the event managers 301 if more than one event manager is running on the system 600. Initially, when the I/O daemon 300 connects to the event manager 301, the event manager 301 requests that the master launcher start a first process for the event manager 301. The first process is generally a launcher 303 for any smart card application 304. The master launcher can also be configured to shut down the launcher 303 of an application 304 when the event manager 301 so requests, and for informing the event manager 301 that the launcher 330 has exited.

There is preferably one master launcher running for each physically separate server (e.g. 150, 152) that is running an associated smart card application 304. This one master launcher handles the requests for all event managers that request launchers on a particular server. When being executed on a computer 100, as seen in FIG. 7, the master launcher commences operation either before or no later than the system 600. In this instance, the master launcher is started first.

The master launcher can be integrated into the event manager 301, for example, when an associated launcher is running on the same computer as the event manager 301.

2.1.4 Launcher/First Application

In the arrangements of the systems 600A and 600B, the first process started by the insertion of a smart card 10 into the remote reader 1 is the launcher 303. In specific systems, specified applications may be commenced. For example, an automatic teller machine can start a banking application. Another example includes the use of restricted launchers that only start a specified sub-set of applications. The launcher 303 is an application that starts other applications for a specific event manager 301. The launcher 303 starts and ends applications and can also start and end sessions. The launcher 303 also informs the event manager 301 when applications are starting and ending, and tells the applications 304 when they are receiving or losing focus, or when they need to exit. In this regard, where a number of applications 304 are operating simultaneously, the application 304 that is currently on-screen is the application having focus, also known as the "front application". When another application is about to take precedence, the launcher 303 tells the front application that it is losing focus, thereby enabling the current application to complete its immediate tasks. The launcher 303 also tells the new application 304 that it is gaining focus, and that the new application 304 shall soon be changing state. The launcher 303 can also configured to force an application to exit.

The launcher 303 receives certain events such as "no-card", "low battery" and "bad card" events generated by the remote reader 1. The launcher 303 also receives events that are intended for applications that are not currently the front application, and the launcher 303 operates to correctly interpret these events.

In one arrangement of the system 600, the launcher 303 is started when a request is generated by the event manager 301 to start the launcher 303. The launcher 303 can also be told to exit and forced to exit by the event manager 301.

The launcher 303 is preferably the only process component that needs to communicate with the directory service 311. When the launcher 303 is required to start a new application 304, the launcher 303 queries the directory service 311 with service data, and the directory service 311 returns a location of the application 304 and service data associated with the new application 304. The service data is sent to the new application 304 as initialization data in an event, referred to herein as the EM_GAINING_FOCUS event. The application location specifies the location of the application 304 to be run, and may be local, for implementations with a local computer, or networked. If the application location is empty, then the launcher 303 has to decide which application to start based on the service data.

The launcher 303 is also configured to start any applications, for example a browser controller, that are typically always be running while the system 600 is operating. Such applications are referred to as persistent applications. The launcher 303 can also start applications either in response to a first user selection on a corresponding smart card 10, or at the request of another one of the applications 304.

The launcher 303 can be integrated into the event manager 301 in some arrangements of the system 600 and will be explained in more detail below with reference to section 10.0.

2.1.5 Display Manager

The display manager 306 selects which smart card application 304 is currently able to display output on the display screen 101. The display manager 306 is told which application 304 can be displayed by an EM_GAINING_FOCUS event originating from the launcher 303. This event can be sent to the display manager 306 directly, or the event manager 301 can send copies of the event to the display manager 306 and the intended recipient.

Generally, the only application 304 that is attempting to display output is the front application. The display manager 306 can provide consistent output during the transfer between applications having control of the display. The display manager 306 may need to use extrapolated data during change-oversee of applications as the front application.

In some arrangements of the architecture 200, the display manager 306 may not be needed or the role of the display manager 306 may be assumed by the other parts (e.g. 301 or 303) of the architecture 200.

2.1.6 Directory Service

The directory service 311 is configured to translate a service identifier that is stored on smart cards 10 into a resource locator (e.g. a URL) that indicates the location of the service or the location of an application associated with the service. The directory service 311 is also configured to translate optional service data. The directory service 311 allows the launcher 303 associated with a particular card 10 to decide what to do with a resource locator, for example, download and run the associated application 304 or load the resource locator into a browser application. The translation by the directory service can be performed using a distributed lookup system.

2.1.7 Applications

The applications 304 associated with a particular smart card 10 can be started by the launcher 303 associated with that smart card 10 as a response to a first button press on a corresponding card. Each application 304 can be a member of one or more service groups. An application 304 can be specified to not be part of any service group in which case the application will never be run with other applications. An application can become part of a service group once the application is running and can remove itself from a service group when the application is the currently front application.

Some applications can be started when the system 600 is started and these applications (e.g. a browser control application or a media playing application) can be always running. These persistent applications can be system specific or more generally applicable.

Figure 9:
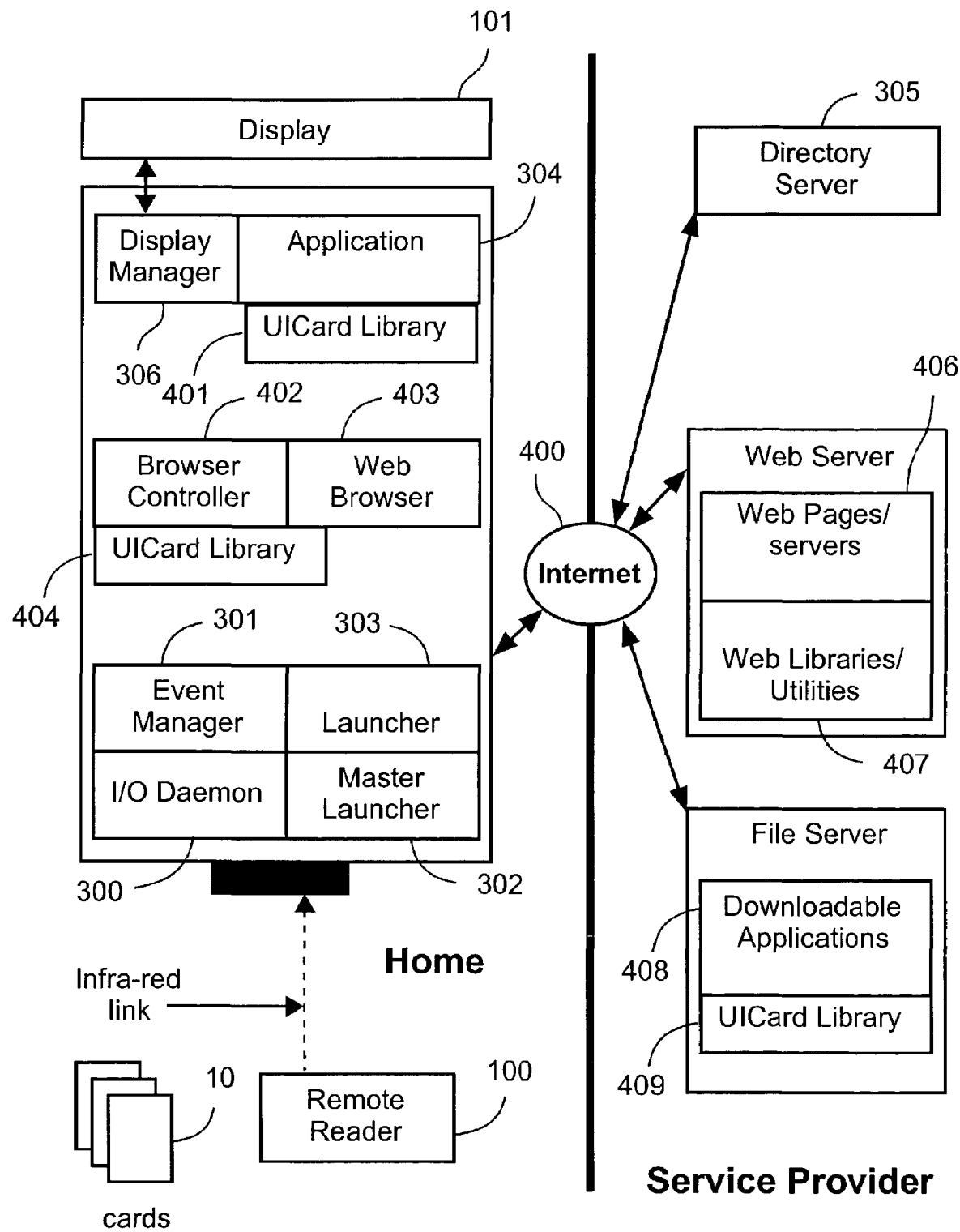
FIG. 9 is a schematic block diagram representation of a card interface system.

FIG. 9 is a schematic block diagram representation of a card interface system including the process components 301 to 306 described above. In the arrangement of FIG. 9, the remote reader 1 is communicating with a computer 900 via an IR link in conjunction with an I/O daemon 300 for controlling the IR link. Further, the computer 900 is configured for communicating to and from a communications network, in this case represented by the Internet 400, to a Web server 410. In this instance, some of the applications 304 accessible utilizing the smart card 10 and remote reader 1 can be Web pages 406 associated with different smart cards 10. The Web libraries 407 contain functions (e.g. JavaScript functions) and classes (e.g. Java classes) that can be included with Web pages for use with the smart card 10. The Web pages 406 can be accessed with a running application called the Web browser 403.

In the arrangement of FIG. 9, the event manager 301 is configured to receive an event from the remote reader 1. The event is then sent to the launcher 303, which can be configured to send a message to the browser controller 402 controlling the Web browser 403. The process for starting an application or browser session will be explained in more detail below. The launcher 303 can also be configured to download applications 408 as well running applications from a file server 411 which is also connected to the computer 900 via the Internet 400.

3.0 Reader

The remote reader 1 is preferably a hand-held, battery-powered unit that interfaces with a smart card 10 to provide a customizable user interface. As described above, the remote reader 1 is intended for use with a digital television, a set top box, computer, or cable television equipment to provide a simple, intuitive interface to on-line consumer services in the home environment.

Figure 44:
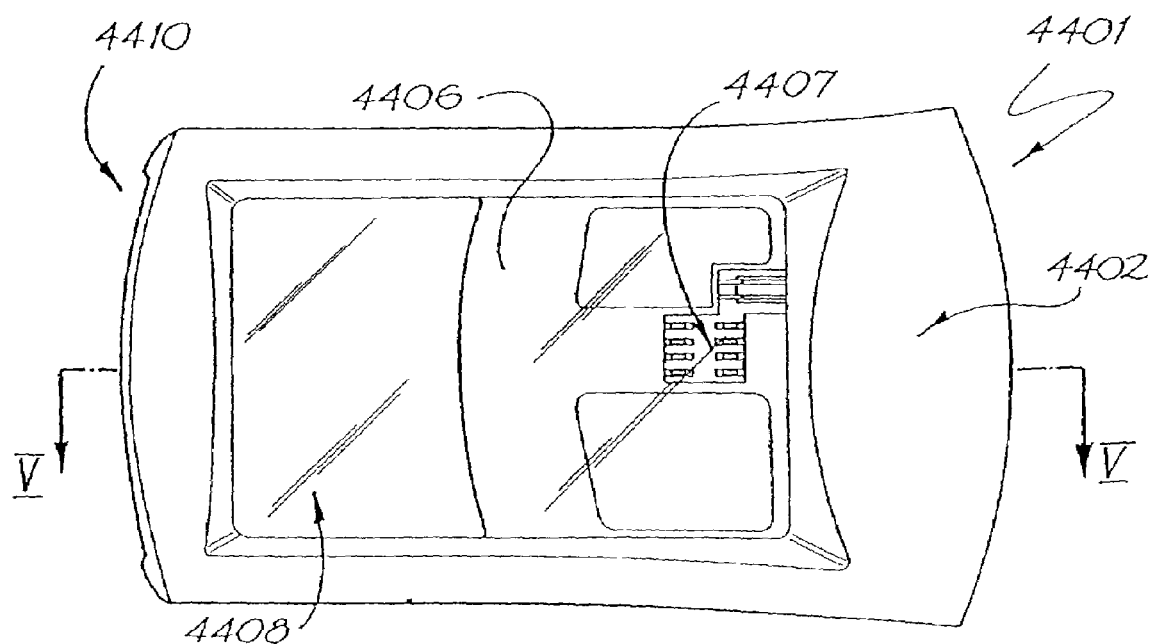
FIG. 44 is a plan view of the reader of FIG. 43.

FIGS. 43 and 44 show a reader 4401 similar to the reader 1 described above. The reader 4401 is configured for the reading of the card 10 according to one arrangement. The reader 4401 is formed of a housing 4402 incorporating a card receptacle 4404 and a viewing area 4406. The receptacle 4404 includes an access opening 4410 through which a smart card 10, seen in FIG. 1, is insertable.

An upper boundary of the viewing area 4406 is defined by sensor means in the form of a substantially transparent pressure sensitive membrane 4408 similar to the membrane 8 described above. Arranged beneath the membrane 4408 is a data reading means provided in the form of an arrangement of exposed electrical contacts 4407 configured to contact complementary contacts of the smart card 10.

Figure 45:
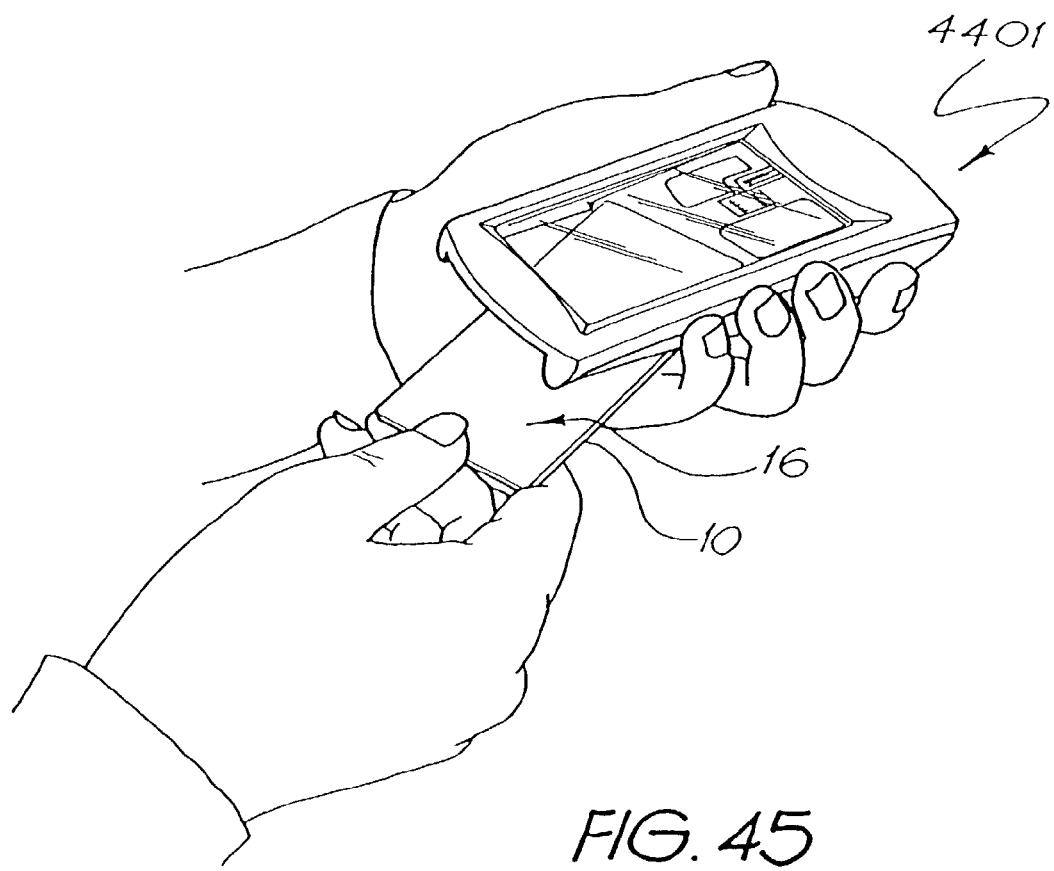
FIG. 45 shows a user inserting a card into the reader of FIG. 43.

The card 10 is inserted into the reader 4401 via the access opening 4410 as shown in FIG. 45. The configuration of the reader 4401 allows a user to hold the controller 101 in one hand and easily insert the smart card 10 into the controller 4401 with their other hand. When the smart card 10 is fully inserted into the controller 4401, the pressure sensitive membrane 4408 fully covers the upper face 16 of the smart card 10. The viewing area 4406 preferably has substantially the same dimensions as the upper face 16 of the card 10 such that the upper face 16 is, for all intents and purposes, fully visible within the viewing area 4406 through the transparent pressure sensitive membrane 4408.

Figure 46:
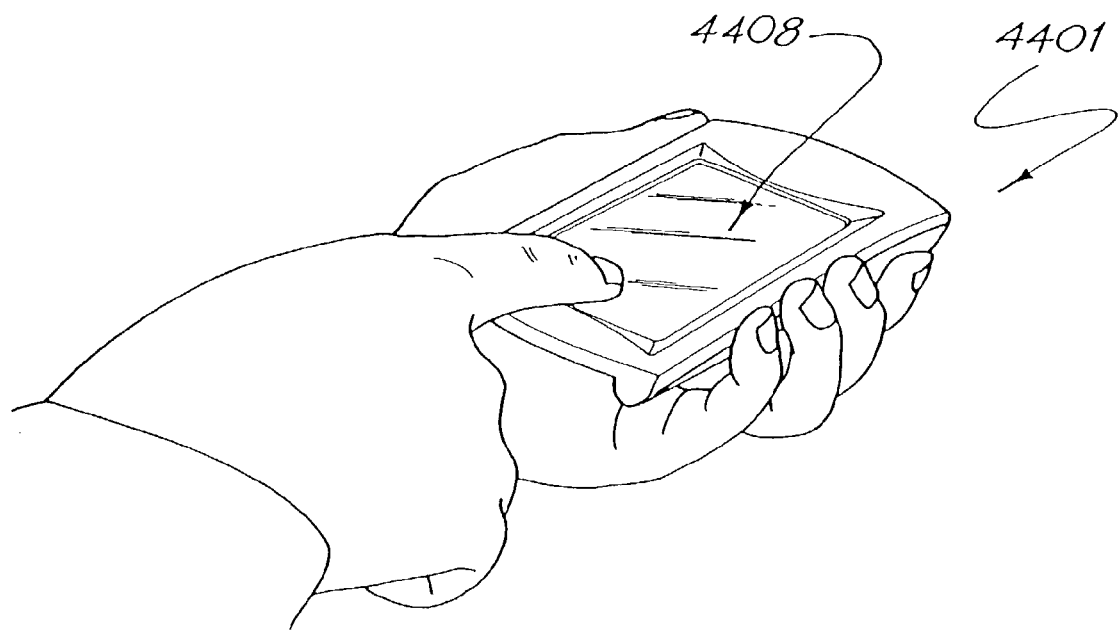
FIG. 46 shows a user operating the reader of FIG. 43 after a card has been fully inserted.

FIG. 46 shows a user operating the reader 4401 after a card has been fully inserted.

Referring to FIGS. 47(a) to 47(c), the housing 4402 is formed of a substantially two part outer shell defined by a top section 4827 that surrounds the membrane 4408 and a base section 4805 which extends from a connection 4829 with the top section 4827 to a location 4811 below and proximate the transverse centre of the membrane 4408. The base section 4805 incorporates a facing end 4815 formed from infrared (IR) transparent material thereby permitting IR communications being emitted by the reader 4401.

The location 4811 defines a point of connection between the base section 4805 a card support surface 4807 which extends through a plane in which the contacts 4407 lie to an interior join 4835 that sandwiches the membrane 4408 between the surface 4807 and the top section 4827. From this arrangement it will be appreciated that the access opening 4410 is defined by the space between the location 4811 and a periphery 4836 of the housing 4402, seen in FIG. 47(a).

The contacts 4407 extend from a connector block 4837 mounted upon a printed circuit board (PCB) 4801 positioned between the base section 4805 and support surface 4807 by way of the two mountings 4817 and 4819. Arranged on an opposite side of the PCB 4801 to the connector block 4837 is electronic circuitry (not shown), electrically connected to the connectors 4407 and the touch sensitive membrane 4408 and configured for reading data from the card 10 according to depression of the membrane 4408. Mounted from the PCB 4801 is an infrared light emitting diode (LED) 4800 positioned adjacent the end 4815 which acts as an IR window for communications with a device (e.g. the set top box 601) to be controlled.

FIG. 47(b) shows a similar view to FIG. 47(a), with the smart card 10 partially inserted through the access opening 4410 into the receptacle 4404. As can be seen in FIG. 47B, the support surface 4807 has an integrally formed curve contour 4840 that leads downward from the plane of the contacts 4407 towards the join 4811. This configuration allows the controller 4401 to receive the smart card 10 such that the smart card 10 may be initially angled to the plane of the receptacle 4404, as seen in FIG. 47(b). The curve contour 4840 configuration of the support surface 4807 guides the smart card 10 into a fully inserted position under the force of a user's hand. Specifically, as the card 10 is further inserted, the curvature of the support surfaces guides the card 10 into the plane of the contacts 4407 and receptacle 4404.

FIG. 47(c) shows a similar view to FIG. 47(a), with the smart card 10 fully inserted into the receptacle 4404. In this position, the card 10 lies in the plane of the receptacle 4404 and the contacts 4407 which touch an associated one of the data contacts 4408 of the smart card 10, and the smart card 10 is covered by the pressure sensitive membrane 4408. Further, the contacts 4407 are preferably spring contacts, the force of which against the card 10, provides for the card 10 to be held within the receptacle by a neat interference fit.

In the following description references to the reader 1 can be construed as references to a reader implemented as the reader of FIG. 1 or the reader 4401 of FIG. 43.

Figure 10:
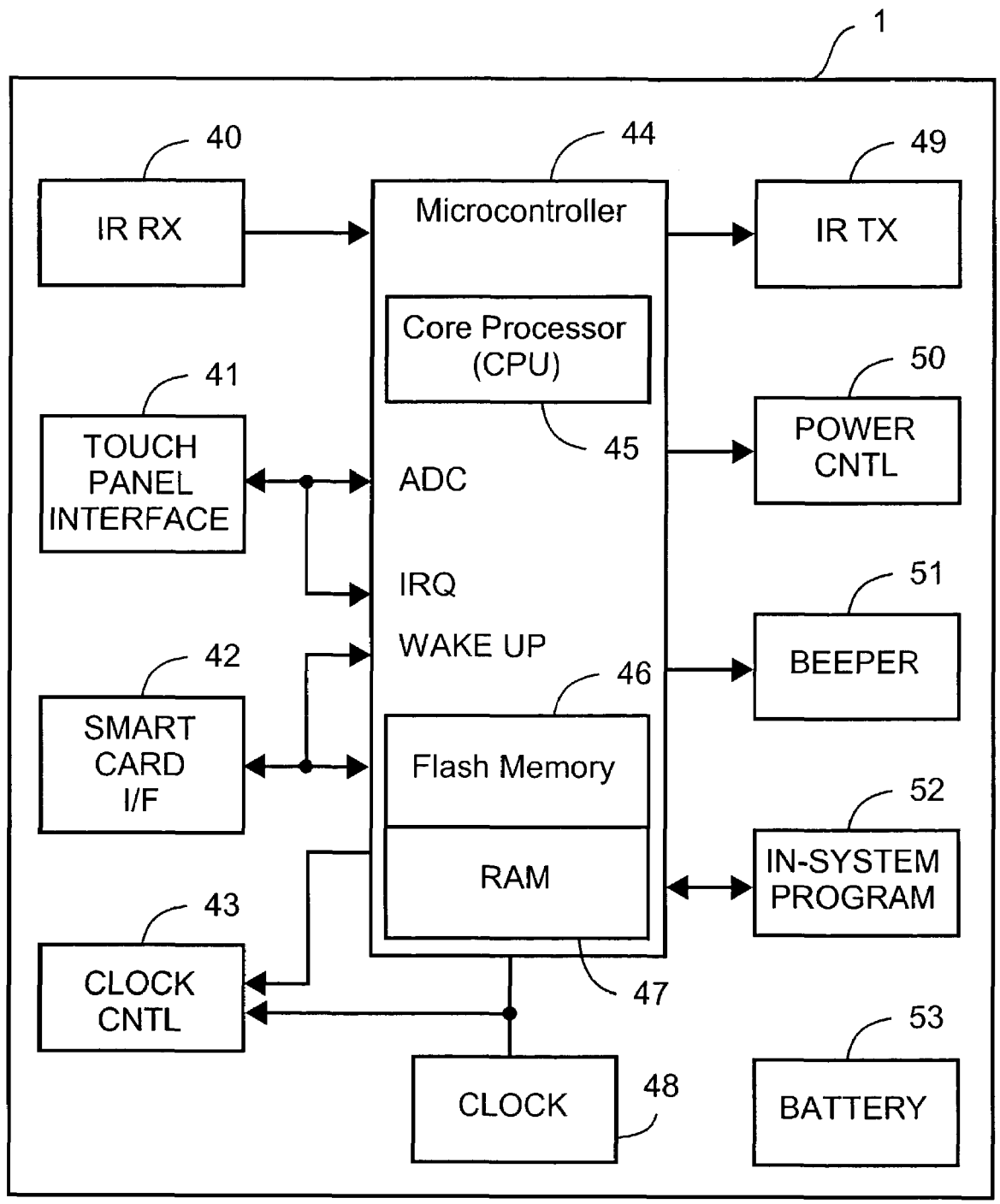
FIG. 10 is a schematic block diagram showing the internal configuration of the reader of FIG. 1.

FIG. 10 is a schematic block diagram showing the internal configuration of the remote reader 1 in more detail. The remote reader 1 includes a microcontroller 44 for controlling the remote reader 1, co-ordinating communications between the remote reader 1 and a set top box 601, for example, and for storing mapping information. The microcontroller 44 includes random access memory (RAM) 47 and flash (ROM) memory 46. The microcontroller 44 also includes a central processing unit (CPU) 45. The microcontroller 44 is connected to a clock source 48 and a clock controller 43 for coordinating the timing of events within the microcontroller 44. The CPU 45 is supplied with electrical 5 volts by a battery 53, the operation of the former being controlled by a power controller 50. The microcontroller 44 is also connected to a beeper 51 for giving audible feedback about card entry status and for "button" presses.

Infra-red (IR) communications are preferably implemented using two circuits connected to the microcontroller 44, an IR transmitter (transmitter) 49 for IR transmission and an IR receiver (receiver) 40 for IR reception.

The pressure sensitive touch panel 8 of the remote reader 1 communicates with the microcontroller 44 via a touch panel interface 41. A smart card interface 42 connects to the electrical contacts 7.

An in-system programming interface 52 is also connected to the microcontroller 44, to enable programming of the microcontroller 44 by way of the microcontroller FLASH memory 46 with firmware. The firmware will be explained in further detail later in this document with reference to section 6.0.

The internal configuration of the remote reader 1 will now be described in further detail.

3.1 Low Power Mode Lifetime

The power controller 50 is operable to provide two power modes, one being a low-power mode "sleep" mode, and another being an active mode. The low power mode lifetime is the lifetime of the battery 53 expressed in years. When the remote reader 1 is not functioning and is in the low power mode, the lifetime can be between greater than 2 years.

If the reader 1 is sleep mode and a user presses the touch panel 8 then the remote reader 1 comes out of sleep mode, and the CPU 45 calculates the touch co-ordinates and sends a serial message by infra-red transmission. The battery 53 should remain serviceable for the current supply requirements of more than 100,000 button presses.

3.2 Service Life

The service life is defined as the period of time that the remote reader 1 can be expected to remain serviceable, not including battery replacement. The service life is related to the Mean Time Between Failures (MTBF) figure and is usually derived statistically using accelerated life testing. The service life of the remote reader 1 can thus be greater than 5 years.

3.3 Microcontroller

The microcontroller 44 of the remote reader 1 has an 8 bit central CPU with 4096 bytes of FLASH memory and 128 bytes of random access memory. The device also operates on a supply voltage from 3 to 5 Volts and has flexible on-board timers, interrupt sources, 8 bit analog to digital converters (ADC), clock watchdog and low voltage reset circuits. The device also has high current output pins and can be programmed in circuit with only a few external connections.

3.4 Clock Source

The main clock source 48 for the remote reader 1 is preferably a 3 pin 4.91 MHz ceramic resonator with integral balance capacitors. The frequency tolerance is 0.3%. While such tolerance is not as good as a crystal, such is however adequate for serial communications and is much smaller and cheaper than a crystal.

3.5 Beeper

The beeper 51 is included with the remote reader 1 to give audible feedback about card entry status and for button presses. The beeper 51 is preferably a piezo-ceramic disk type.

3.6 Infra-Red Communications

As described above, infra-red (IR) communications are preferably implemented using two circuits, an IR transmitter 49 for IR transmission and an IR receiver 40 for IR reception. The two circuits 40 and 49 are preferably combined on a printed circuit board (e.g. the PCB 4801 of FIG. 47) within the remote reader 1. The printed circuit board can be connected to the microcontroller 44 by a 4 way flat printed cable. Large bulk decoupling capacitors (not shown) are required on the infra-red board to provide surge currents, which are required when transmitting.

3.7.1 Infra-Red Transmission

IR transmission is preferably by means of an infra-red Light Emitting Diode (LED) (e.g. the LED 4800 of FIG. 47(*a*)) forming part of the IR transmitter 49.

3.7.2 Infra-Red Reception

The IR receiver 40 is preferably integrated with an infra-red filter, a PIN diode, an amplifier and discriminator circuitry into a single device. Received serial information passes directly from this device to an input port of the microcontroller 44. This port can be programmed to generate an interrupt on receiving data allowing speedy storage and processing of incoming signals.

3.8 CPU/Memory Card Interface

The remote reader 1 can preferably support smart cards 10 as defined by International Standards Organization (ISO) standards 7816-3 and ISO 7810. Three and five volt CPU cards (i.e. cards with an embedded microprocessor) with T=0 and T=1 protocols can also be supported as are 3 and 5V memory cards.

The electrical contacts 7 used to make contact between the card 10 and the microcontroller 44 are preferably implemented as a surface mount connector with 8 sliding contacts and a "card in" switch. In accordance with the ISO requirements the following signals must be provided:

Pin 1—VCC—Supply voltage;
Pin 2—RST—Reset signal. Binary output to card;
Pin 3—CLK—Clock signal, Binary output to card;
Pin 4—RFU—Reserved, leave unconnected;
Pin 5—GND—Ground;
Pin 6—VPP—Programming voltage, not required, link to GND, VCC or open;
Pin 7—I/O—Data I/O, bi-directional signal; and
Pin 8—RFU—Reserved, leave unconnected.

The RST and I/O pins are preferably connected directly to the microcontroller 44. All pins except the power supplies are equipped with series termination and transient voltage suppressor diodes to prevent electrostatic discharge problems.

3.9 CPU Card Power Supply

As described above, the microcontroller 44 requires a 3–5 Volt power supply for operation. The 5 Volt supply can be generated from a 3V Lithium coin cell operating as the battery 53 by means of the power controller 50 in the form of a regulated 5V charge-pump DC—DC converter chip.

3.10 Touch Sensitive Interface

As described above, the pressure sensitive touch panel 8 of the remote reader 1 communicates with the microcontroller 44 via a touch panel interface 41. The touch panel interface 41 provides an analog signal according to the position of the touch on the touch panel 8. This analog signal is then communicated to the microcontroller 44.

The calculation of touch co-ordinates requires bottom and left touch panel 8 contacts (not shown) to be connected to the inputs of an analog to digital converter on the microcontroller 44.

A touch on the touch panel 8 can preferably be used to wake up the remote reader 1 from sleep mode. A resistive connection from the left screen contact to a sleep WAKE UP port as illustrated provides this feature. Note that during in-system programming, up to 8 volts may be applied to a pin on the microcontroller 44 referred to as the Interrupt Request Pin (IRQ) so a clamping diode needs to be fitted to this pin to prevent device damage. In this instance, it is the internal pull up on the IRQ pin that actually provides the bias required to detect touch panel 8 presses.

3.11 Battery

As described above, the remote reader 1 uses a battery 53. A 3 Volt lithium coin cell can be used as the battery 53 to power all the circuitry of the remote reader 1.

3.12 In System Programming

The microcontroller supports in-system programming (ISP) options. The in-system programming interface 52 is used in the remote reader 1 to perform programming of the microcontroller 44 such as programming of the microcontroller FLASH ROM memory 46 with firmware.

3.13 Printed Circuit Boards and Interconnection

The remote reader 1 can include two printed circuit boards (PCB), instead of the one PCB 4801 of the reader 4401, as follows:

(i) an infra-red (IR) PCB which holds the infra-red diode, drive FET and receiver; and
(ii) a main PCB (e.g. the PCB 4801 of FIG. 47(*a*)) which holds all the other components 40 to 53 mentioned above.

Both of the PCB boards described above are preferably double sided using standard grade FR4, 1.6 mm PCB material. The main PCB preferably utilizes surface mount components since the thickness of the finished PCB is critical and preferably components are restricted to a height of approximately 3 mm max.

The IR PCB can use through hole parts but again there are preferably stringent component height restrictions imposed. The interconnection of the two PCBs is via a custom designed 4-way flat printed cable (FCA). This cable interfaces to the two PCBs via a surface mount FCA connector. Another FCA is used to interface to the touch panel 8.

3.14 Low Power Mode

When the remote reader 1 has not been used for a short period of time, pre-programmed firmware preferably puts the unit into low-power mode to conserve battery life. In low-power mode, the supply voltage is switched off to all current consuming components, the ports of the microcontroller 44 are set into a safe sleep state and the clock 48 is stopped. In this state the current consumption of the remote reader 1 is less than 5 µA. A P-channel FET can be used to control the supply of power to the current consuming components.

There are three preferred methods to wake the remote reader 1 up from low power mode as follows:
touch the touch panel 8;
insert a card into the card receptacle 4; and
remove and re-insert the battery 53.

The card insert wake up enables the remote reader 1 to always beep when a card is inserted, regardless of whether the unit is in low power mode or not. The 'touch' and 'card insert' wake ups are handled by the IRQ pin of the microcontroller 44. It is important that the IRQ pin is set to "edge trigger" so that only a new touch or card insert wakes the microcontroller 44 up. If IRQ sensitivity is set to "level" trigger then inadvertently leaving the touch panel 8 pressed, for example when the remote reader 1 is packed in luggage, would prevent the remote reader 1 from entering low power mode.

3.15 Interrupts and Resets

The microcontroller 44 firmware for the remote reader 1 uses two external and one internal interrupt sources. External interrupts come from the IRQ pin for low power mode wake up. The internal interrupt is triggered by a timer overflow and is used to time various external interfaces. These interrupts are serviced by pre-programmed firmware procedures.

There are four possible reset sources for the microcontroller as follows:
low supply voltage reset at 2.4 Volts;
illegal firmware op-code reset;
Computer Operating Properly (COP) reset if firmware gets stuck in a loop; and
ISP reset forced onto a RESET pin when in-system programming (ISP) starts.

4.0 Card Data Format

The format of data for the card 10 described above will be described in the following paragraphs. For memory cards such as the control card 30 as described in relation to FIG. 4, data conforming to the format to be described can be copied directly onto the card. For the CPU card arrangement described above, data conforming to the format to be described can be loaded as a file into the file system of the CPU of the card.

The card 10 described above preferably stores a data structure that describes various card properties and any user-interface indicia printed on the card. The cards 10 can also include global properties that specify attributes such as information about the card, vendor and one or more services. User-interface objects, if present, specify data to associate with areas of the surface of the card 10.

The user-interface objects, in the arrangements described herein, represent mapping data, which relate predetermined areas, or iconic representations directly imprinted, on a surface of the card 10 to commands or addresses (e.g.: Uniform Resource Locators (URLs)). The mapping data includes the coordinates which typically define the size and location of User Interface Elements (UI) elements (e.g.: predetermined areas) on the card 10. In this connection, the term UI element typically refers to the indicia on the card 10, whilst the term UI interface object refers to the data relating to a particular indicia. However, these terms are used interchangeably throughout the following description.

The User-interface objects are preferably stored directly on the card 10. Alternatively, the User-Interface objects can be stored not on the card 10 itself, but in the system 600. For instance, the card 10 can store, via the on-card memory, barcode or magnetic strip, a unique identifier, which is unique to cards 10 having a substantially similar UI elements and layout. The unique identifier together with the coordinates determined from the touch panel 8, as a result of a press, can be transmitted by the reader 1 to the computer 100 or set top box 601 of the system 600. The system 600 having the user-interface objects stored on the computer 100, set top box 601 or a server 150, over a network 220, can perform the mapping from the determined coordinates to the corresponding command, address or data relevant to the service associated with the card 10 and the press for a desired function represented by the UI element on the card 10. Thus, in this instance, data related to the user selected indicia are the coordinates determined by the reader 1 as a result of a press by the user on a portion of the touch panel 8 which overlays the desired indicia.

In accordance with the card arrangements described above, data stored by the card 10 includes a card header followed by zero or more objects described in the following sections.

4.1 Card Header

Figure 11:
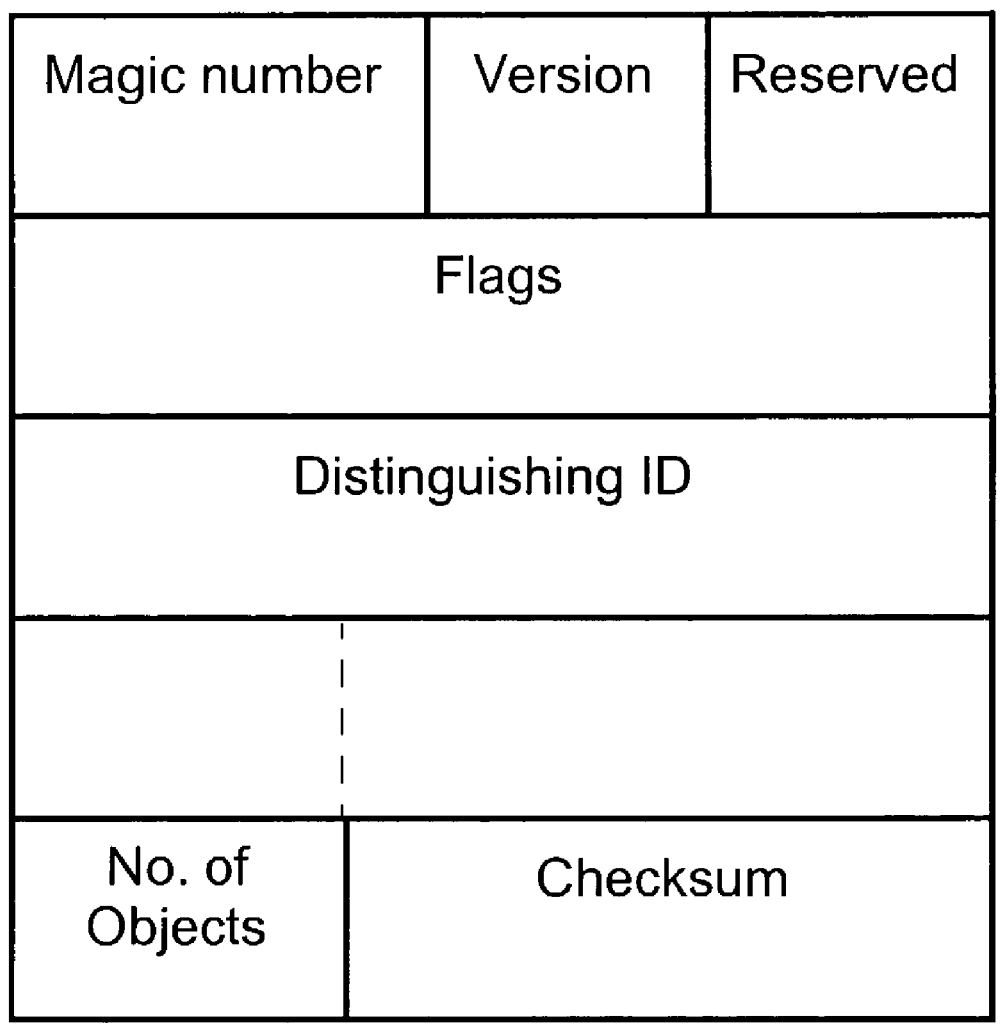
FIG. 11 shows the data structure of a card header as stored in the card of FIG. 1.

FIG. 11 shows the data structure of a card header 1100 as stored in the smart card 10. The header 1100 includes a number of rows 1101, each of which represents four bytes of data. The data is in big-endian format. The complete header is 20 bytes long and includes the following fields (described in FIG. 12):

(i) magic number field: includes a constant that specifies a card as being a valid memory card; for example, the magic number field can be used to check or verify that a propriety card belonging to a particular manufacture is being used;

(ii) versions field: includes each version increment that specifies a change in the card layout that can not be read by a reader that is compatible with lower versions of the layout;

(iii) reserved field: this field is reserved for future use;

(iv) flags field: includes flags for a card (see FIG. 13);

(v) distinguishing identifier field: includes two fields—a service and a service specific field; the service field identifies the service of the card and the service specific field optionally contains a service-specific value;

(vi) a number of objects field: includes a number value representing how many objects follow the header; this field can be set to zero; and (vii) a checksum field: includes a card checksum of all data on the card excluding the checksum itself.

The distinguishing identifier includes a service identifier that distinguishes one service from another or one vendor from another. That is, the service is identified by an application that provides the service to a card user. In the arrangements described herein, the distinguishing identifier also includes a service-specific identifier that can be optionally used by the vendor of a service to provide predetermined functions of a particular service. The use of this service-identifier is substantially dependent upon the application run on the system 600. For example, the service identifier together with the service-specific identifier can be used as a unique identifier of a card 10; to gain or deny access to a specific feature of a particular service; to reproduce a specific-service identifier value in a log file to confirm or verify that a particular card 10 having that value was used to access a service; and to provide a unique identifier that can be matched with a corresponding value in a database to retrieve information about the user of the service (e.g.: name, address, credit card number etc).

Other examples of uses of the service-specific identifier can include providing information about a mechanism or mode of distribution of the cards 10 (e.g. by mail, bus terminal kiosks, handed out on a train etc). The service-specific identifier, for instance, can identify what data should be loaded into the system 600 when a service is accessed.

The foregoing is not intended to be an exhaustive list of possible applications of the service-specific identifier but a small sample of possible applications and there are many other applications of the service-specific identifier.

4.1.1 Card Flags

The flags field of the header of FIG. 11 includes three flags as follows:
 (i) Don't beep;
 (ii) No move events; and
 (iii) No event co-ordinates.

FIG. 13 shows a description of each of the above flags. The above flags effect the functions that a smart card 10 can perform in a remote reader 1, as is defined by the description of each flag. An example, of a User Interface (UI) element as referred to in FIG. 13 is a "button" on the card 10. UI Elements will be explained in further detail later in this document.

4.2 Objects

Immediately following the card header 1100 of FIG. 11 can be zero or more object structures defining the objects of a particular card 10 and forming part of the card data. Each object structure has an object header. The object header includes four fields as follows:
 (i) a type field;
 (ii) an object flags field;
 (iii) a length field; and
 (iv) a data field.

The structure of the data field depends on the object type as will be described below.

FIG. 14 shows a description of each of the fields of the object header in accordance with the card arrangements described herein. The flags object field of the object header of FIG. 14, includes an inactive flag. FIG. 15 shows a description of the inactive flag in accordance with the card arrangements described herein.

There are five object types provided in accordance with the described card arrangements, as follows:
 (i) User Interface (UI) objects (i.e. data defining a button on the card 10);
 (ii) Card Data;
 (iii) Fixed Length Data;
 (iv) Reader Insert;
 (v) No operation; and
 (vi) No operation (single byte).

FIG. 16 shows a description of each of the above object types (i) to (vi).

4.2.1 User Interface (UI) Object

Each UI object defines a rectangular area on the card 10 and some quantity of associated data that is transmitted when the user touches an area of the panel 8 over the corresponding rectangular area of the card 10. The origin for the co-ordinate mapping system is the top left of the smart card 10 as if the card 10 was an ISO standard memory smart card held in a portrait view with the chip contacts 18 facing away from the viewer and towards the bottom of the card. For any reader that does not use this card orientation, the values of the corner points must be adjusted by the reader so as to report a correct "button" press.

The UI (element) object structure has six fields in accordance with the card arrangements described, as follows:
 (i) a flags field;
 (ii) an X1 field;
 (iii) an Y1 field;
 (iv) an X2 field;
 (v) a Y2 field; and
 (vi) a data field which typically includes data associated with the UI element; for example, a URL, a command, a character or name.

FIG. 17 shows a description of each of the above fields for the UI object structure of the described card arrangements. A press on the pressure sensitive touch panel 8 is defined to be inside a particular UI object if:
 (i) an X value corresponding to the press location is greater than or equal to the X1 value of the associated UI object and is strictly less than the X2 value for that particular UI object; and
 (ii) a Y value corresponding to the press location is greater than or equal to the Y1 value of the particular UI element and strictly less than the Y2 value.

Overlapping UI elements is allowed. If a press is within the bounds of more than one UI element then an object subsequently sent in response to the press is determined by a Z order. The order of the UI elements on the card defines the Z ordering for all of the UI elements on that particular card. The top UI element is the first UI element for a particular card. The bottom UI element is the last UI element for that particular card. Such an arrangement allows for non-rectangular areas to be defined. For example, to define an "L" shaped UI element, a first UI object would be defined with zero bytes in the data field, and a second UI object would be defined to the left and below the first UI object but overlapping the UI object.

The location of a press is to be reported in "fingels", which represent finger elements (analogous to "pixels" which represent picture elements). The height of a fingel is defined to be $\frac{1}{256}$th of the length of an ISO memory smart card and the width is defined to be $\frac{1}{128}$th of the width of an ISO memory smart card. The behaviour associated with each element may be modified with one or more flags.

Each UI element has four flags associated with it as follows:
 (i) Invert Beep Enable;
 (ii) Auto repeats;
 (iii) Do Not Send Data on Press; and
 (iv) Do Not Send Data on Release.

FIG. 18 shows a description for each of the UI element flags.

4.2.2 Card Data

The card data object is used to store data specific to a particular card. The data layout for this object is undefined.

4.2.3 Fixed Length Data

The fixed length data object is used to define a fixed length block on the card that can be written to by the computer 100.

4.2.4 Reader Insert

The reader insert object can be used to store instructions for the remote reader 1 when a particular card is inserted. The reader insert object can be used, for example, to instruct the reader 1 to use a specific configuration of IR commands to allow communication with a specific set top box or TV.

4.2.5 No Operation

The No Operation object is used to fill in unused sections between other objects on a particular card. Any data stored in the no operation object is ignored by the remote reader 1. Any unused space at the end of the card 10 does not need to be filled with a no operation object.

4.2.6 No Operation (One Byte)

The No Operation (One Byte) object is used to fill gaps between objects that are too small for a full object header. These objects are only one byte long in total.

5.0 Reader Protocol

The remote reader 1 uses a datagram protocol that supports both uni-directional and bi-directional communication between the remote reader 1 and the set top box 601 or computer 100, for example. The format used for messages from the remote reader 1 as a result of user interactions with the remote reader 1 are of a different format than those that are sent to the remote reader 1.

5.1 Message Types

There are at least seven message event types that can be sent by the remote reader 1. These event types are as follows:

INSERT: When a card 10 is inserted into the remote reader 1, and the card 10 is validated, an INSERT event is generated by the remote reader 1 and an associated message is transmitted. This message announces the card 10 to a receiver (e.g. the set top box 601). The INSERT message preferably includes the particular distinguishing identifier and allows applications to be started or fetched immediately upon the card 10 insertion rather than waiting until the first interaction takes place.

REMOVE: When a card 10 is removed from the remote reader 1, a corresponding REMOVE event is generated and a REMOVE message is sent to the particular receiver associated with the remote reader 1. Like the INSERT message, the associated distinguishing identifier is transmitted along with the message. As the distinguishing identifier cannot be read from the now removed card 10, the identifier is stored in the memory 47 of the remote reader 1. Storing the distinguishing identifier in the memory 47 is a useful optimization as the distinguishing identifier is required for all other messages and reading the identifier from the card 10 each time the identifier is required can be too slow. INSERT and REMOVE messages are not relied upon by the system 600 to control processing. The system 600 is configured to infer missing messages if a message is received and is not immediately expected. For example, if an application sees two INSERT messages in a row, then the application can assume that it has missed the REMOVE message associated with the card of the first INSERT message as it is not possible to have two cards inserted at one time in the arrangements described herein. The application can then take whatever action is required prior to processing the second INSERT message.

Another example of where a missing message can occur is where a hand-held, infra-red connected reader 1, as compared with a wired reader, is being used. Often a user does not point the reader 1 directly at a receiver when inserting or removing cards. This problem can be corrected by the system 600 inferring the INSERT or REMOVE operations based on differing distinguishing identifiers in consecutive PRESS and RELEASE pairs.

BAD CARD: If an invalid card is inserted, then the remote reader 1 is preferably configured to generate a BAD CARD event and to send a BAD CARD message. Such a message allows an associated receiver to take some action to alert the user to the invalid card.

PRESS: When a touch is detected by the remote reader 1 and the position of the touch maps to a user-interface object, a PRESS event is generated and a PRESS message is sent to an associated receiver. The PRESS message contains details of the associated card, the position of the press and the data associated with the user-interface element at that particular position. If there is no user interface element defined for that position (e.g. if there are no user interface elements defined on the card 10 at all) a PRESS message is sent containing details of the associated card and the position of the press. If there is no card present in the remote reader 1 when a PRESS event is generated then a PRESS message is sent containing the special "NO_CARD" identifier (i.e. eight bytes of zero—0×00) and the position of the press.

RELEASE: A RELEASE event complements the PRESS event and a RELEASE message can be sent in order to inform the application program of the system 600 that a PRESS has been lifted. Every PRESS event preferably has a corresponding RELEASE event. Readers can allow multiple presses to be registered or provide other events that may occur between PRESS and RELEASE messages.

MOVE: If, after processing a PRESS event, the touch position changes by a certain amount then the finger (or whatever is being used to touch the card) is assumed to be moving. MOVE EVENTS are generated and MOVE messages are sent until the touch is lifted. MOVE events auto-repeat by re-sending the last MOVE messages when the touch position remains stationary. Auto-repeat finishes when the touch is lifted and a corresponding RELEASE message is sent. Unlike PRESS and RELEASE events there is no user-interface object involved with MOVE events.

LOW BATT: A LOW BATT event is generated and a LOW BATT message is sent when the battery 53 in the remote reader 1 is getting low. This message is sent after user interactions to increase the chance that the message will be received by the rest of the system 600. The sending of the LOW BATT message does not prevent the remote reader 1 from entering a low power state.

5.2 Data Formats

The preferred data format for the system 600 is a fixed size header followed by a variable length data field which can be zero bytes or more in length, followed by an eight bit check-sum and complement.

5.2.1 Message Header

The message header is preferably of a fixed length and is prepended to all messages sent from the remote reader 1. The message header is preferably as small as possible due to any bandwidth restrictions that may be imposed. FIG. 19 shows the format of the message header that is sent from a remote reader 1.

Service and service-specific identifiers can be assigned, by a smart card identification authority, to a vendor when the vendor registers a particular service. The service and service-specific identifier are the same for every message from a given card. A service specific identifier is preferably set by a vendor for use with their application.

FIG. 20 shows a table listing the message event types that have been described above.

5.2.2 Simple Messages

A number of message types are considered simple in that they consist solely of the message header described above followed by the message checksum byte and its complement. For example, a BADCARD message is a simple message.

FIG. 21 shows the format of a simple message in accordance with the arrangements described herein.

5.2.3 MOVE Messages

MOVE messages are formed of the message header described above followed by two fields defining the co-ordinates of the touch position on the touch panel 8 of the remote reader 1. FIG. 22 shows the format of a MOVE message in accordance with the arrangements described herein.

5.2.4 PRESS and RELEASE Messages

FIG. 23 shows the format of PRESS and RELEASE messages. PRESS and RELEASE messages, like MOVE messages contain the message header and touch co-ordinates. In addition, PRESS and RELEASE messages send data associated with the user-interface element if the touch position matches a user-interface element defined on the card. This data is of variable length, the actual size being defined by a corresponding card 10. If the touched position does not match a user-interface element defined on the card (including if no user-interface elements are defined on the card), zero bytes of data associated with user interface elements are sent. If there is no card 10 in the reader 1 then the service identifiers are all set to zero (i.e. 0x00) and zero bytes of data associated with the user-interface elements are sent. The data associated with the UI element normally corresponds to the data associated with the user interface element defined on the card but may be modified or generated by processing on the card 10 or reader 1.

Figure 24:
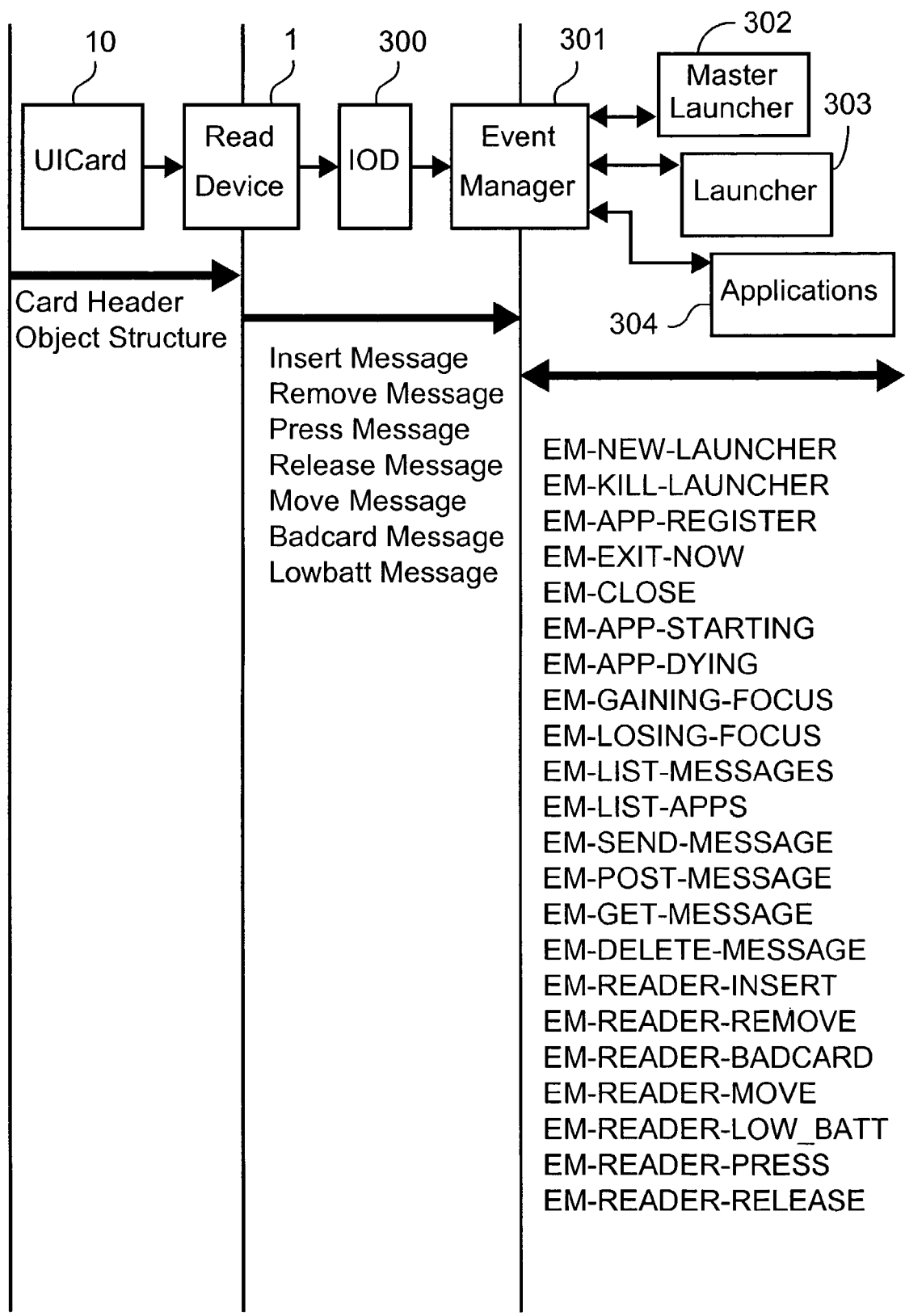
FIG. 24 is a data flow diagram showing the flow of messages within the system of FIG. 6.

FIG. 24 is a data flow diagram showing the flow of the above described messages within the system 600. As seen in FIG. 24, the card header and object header are read by the CPU 45 of the remote reader 1 which sends a corresponding INSERT, REMOVE, PRESS, RELEASE, MOVE, BAD-CARD or LOW BAT message to the event manager 301 via the I/O daemon 300. As will be described in more detail below, the event manager 301 has twenty-one core messages, which are sent to and received from the ML 302, launcher 303 and applications 304.

6.0 Reader Firmware

6.1 Overview

The microcontroller 44 has non-volatile memory 46 embedded within which can be programmed with the firmware to be described in detail below. The firmware working in concert with the microcontroller 44 and peripheral hardware (e.g. the computer 100) can thus dictate the functional requirements of the remote reader 1.

6.2 Code Type

In an attempt to minimize the cost of the remote reader 1 to a user, memory on the remote reader 1 is preferably minimized. As a result the application program written for the remote reader 1 (i.e. the firmware) must be as compact and fast as is possible.

6.3 Resource Constraints

The microcontroller 44 has the following characteristics:

6.3.1 Non-Volatile Memory

The flash memory 46 is configured with 4096 bytes of FLASH ROM and can be utilized for firmware storage. The FLASH ROM is re-programmable but in the case of mass production a MASK ROM part can be utilized.

6.3.2 Random Access Memory (RAM)

The RAM 47 is configured as 128 bytes of RAM for use by the firmware.

6.4 Interrupts

The remote reader 1 uses two of the numerous interrupt sources supported by the microcontroller 44. These interrupts can be described as follows:

6.4.1 Received Data Interrupt

An infra-red (IR) serial data receiver generally generates a falling edge when incoming data is received. This data has to be sampled and buffered as quickly as possible. One port of the microcontroller 44 doubles as an input timing capture pin which can initiate an interrupt on the falling edge.

6.4.2 Timer Overflow Interrupt

The microcontroller 44 has a free-running 16 bit timer, which can be programmed to generate an interrupt when it overflows. In conjunction with the 4.91 MHz clock source and pre-scale factor of 64, this equates to an interrupt every 3.41 seconds. An interrupt service routine increments a counter which triggers the suspension to low power mode preferably after about one minute of inactivity.

6.5 Resets

The microcontroller 44 supports five reset sources and the remote reader 1 is preferably configured to use all of reset sources. These reset sources can be described as follows:

6.5.1 Power on Reset (POR)

The POR reset is initiated when a new battery is fitted to the remote reader 1. The microcontroller 44 includes a circuit that detects the power on condition and generates a reset.

6.5.2 Low Voltage Inhibit (LVI) Reset

The LVI reset is initiated when a circuit (not shown) within the microcontroller 44 detects that the supply voltage has fallen below 2.4 Volts. When this kind of reset occurs a flag is set in a Reset Status Register (RSR) and an initialization routine can deduce that the battery 53 is becoming depleted. For example, when infra-red data is being transmitted, the infra-red LED consumes high current as it is being pulsed. If the battery 53 is depleted, the supply voltage can dip under the 2.4 Volt threshold during transmission causing an LVI reset. After reset, the battery 53 voltage recovers and the LVI reset does not occur until the next high current drain. As such, the remote reader 1 is given a chance to flag the failing of the battery 53 to an associated set-top box or remote equipment so that the user can be prompted to replace the battery 53.

6.5.3 Computer Operating Properly (COP) Reset

The COP reset is configured to reset the microcontroller 44 if the microcontroller 44 gets stuck doing a particular operation for an inordinate amount of time. The COP circuit takes the form of a counter that generates a reset if the counter is allowed to over-flow. The COP register must be written at predetermined time intervals to avoid a COP reset.

6.5.4 Illegal Address/Opcode Reset

An Illegal Address/Opcode Reset is generated by the microcontroller 44 if it encounters either an address out of a predetermined range or an opcode that does not conform to predefined conditions. This reset cannot be turned off but should only be in evidence during code debugging.

6.5.5 Hardware Reset

A hardware reset is generated by driving a 'Reset' pin on the microcontroller 44 low during normal operation. Additionally, if the microcontroller 44 is in low power mode, a falling edge on the Interrupt Request (IRQ) pin also generates a hardware reset. This reset is the mechanism used to wake the microcontroller 44 out of low power mode in the firmware. The IRQ pin is preferable for this function since it can be configured to be edge sensitive only, not level sensitive as the reset pin is.

6.6 Memory Card/CPU Card Interface

The firmware preferably supports only memory card peripherals using an Integrated Circuit Protocol (e.g. the $I^2C$ protocol). Alternatively, the firmware can support CPU card formats.

6.7 Power Consumption

The firmware plays a critical role in conserving the life of the battery 53. All operations performed by the microcontroller 44 are optimized so as to be performed as quickly as possible while wasting as little power as possible. As soon as the remote reader 1 has been inactive for a time (e.g. 1 minute) the microcontroller 44 suspends to low power mode to conserve battery life still further. Low power mode consumes about 1000 times less current than normal operating mode so efficient suspension to this mode is very desirable. The firmware controls the state of the microcontroller 44 ports during low power mode. It is very important that the low power state be carefully tested, one bit of one port incorrectly set during low power mode can easily halve the battery life.

6.8 Device Programming

The microcontroller 44 is able to be programmed using an In-System program (ISP) function supported by an embedded monitor within the microcontroller 44. Monitor code is typically factory set by a manufacturer and cannot be altered.

Programming of the microcontroller 44 for specific hardware can be performed using an In-Circuit Simulator (ICS) kit and a monitor-mode download cable. This cable uses the VCC, GND, RST, IRQ and PTB0 pins on the microcontroller 44. Source code to be programmed can be delivered from a Windows™ 95 development environment via a computer serial port to the ICS hardware and from there via the download cable to the microcontroller 44 pins. This programming method is ideal for firmware development and testing, but may be altered for mass production.

A monitor-mode programming model is preferred in the microcontroller and an embedded programming jig for production can be used. Test points for programming signals can be provided to allow for production ISP. If the firmware is mask programmed into the microcontroller 44 then device programming will not be required.

6.9 Firmware Programming Sequence

The programming of the firmware will be described with reference to the reader 1 being operative coupled to a local computer 100.

6.9.1 The Main Loop

Figure 25:
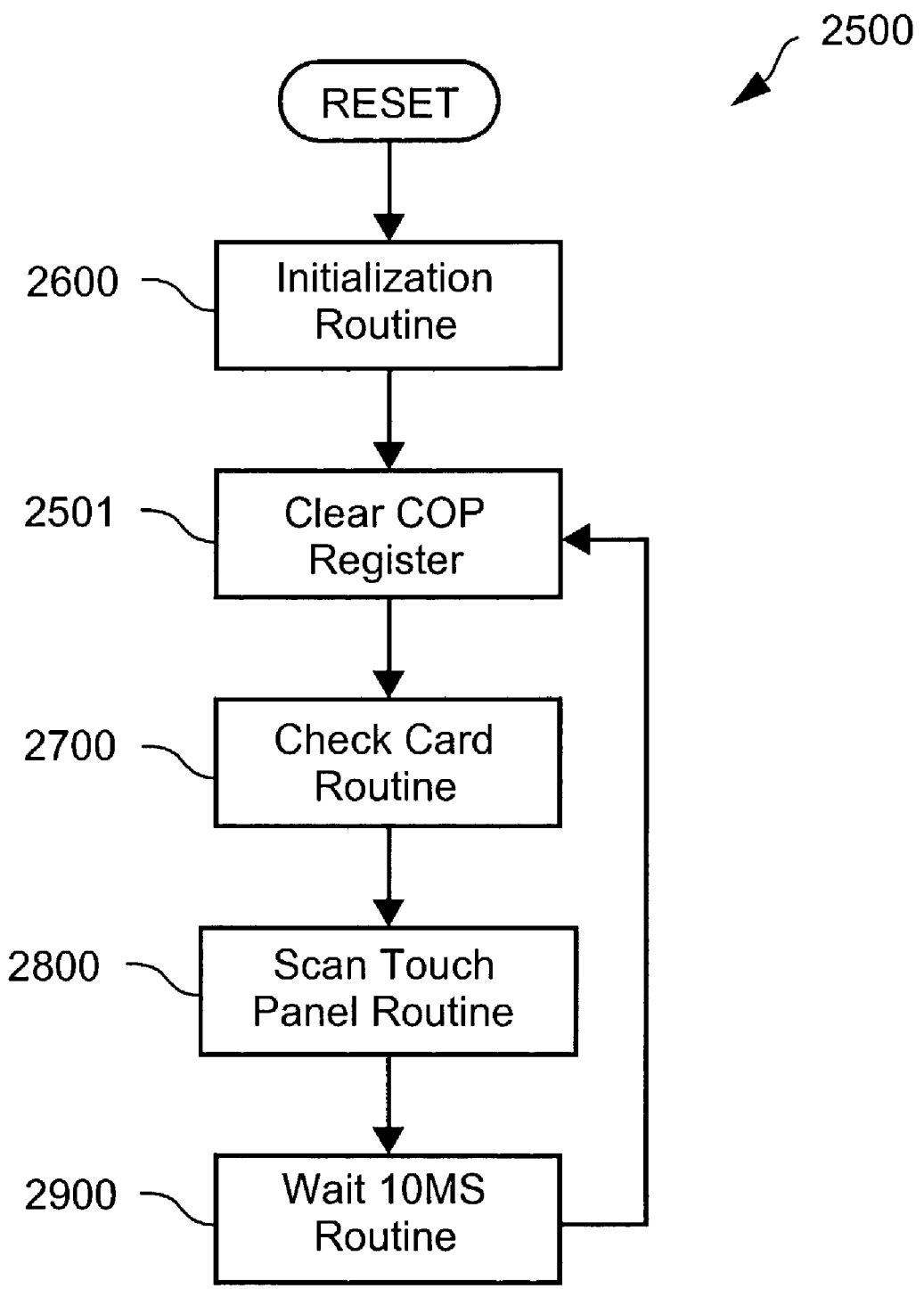
FIG. 25 is a flow diagram showing a read process performed by the reader of FIG. 1.

FIG. 25 is a flow diagram showing the read process 2500 performed by the remote reader 1 in accordance with the arrangements described herein. The process 2500 is preferably implemented as software being resident on the reader 1, and being read and controlled in its execution by the CPU 45. The process of FIG. 25 is configured in a "paced loop" manner. That is, the process is paced by a routine, which generates a 10 ms delay. This delay gives adequate service to the necessary routines while providing good latency for the handling of interrupts.

The process 2500 begins after a reset event, as described above, has been generated. At the first step 2600, an initialization routine is performed by the CPU 45. The initialization routine is performed in order to initialize configuration registers and will be explained below with reference to flow diagram 2600. At the next step 2501, the computer operating properly (COP) register is cleared indicating that the firmware is not stuck in any recurring loops. The process 2500 continues at the next step 2700 where a check card process is performed, by the CPU 45, to check for any changes in the presence and validity of a particular smart card 10. The check card process 2700 will be explained in more detail below with reference to FIG. 27. At the next step 2800, a scan touch panel process is performed by the CPU 45 to check for any touches on the touch panel 8 by the user. At the next step 2900, a wait 10 ms process is performed by the CPU 45, and the process 2500 then returns to step 2501.

6.9.1 The Initialization Process

Figure 26:
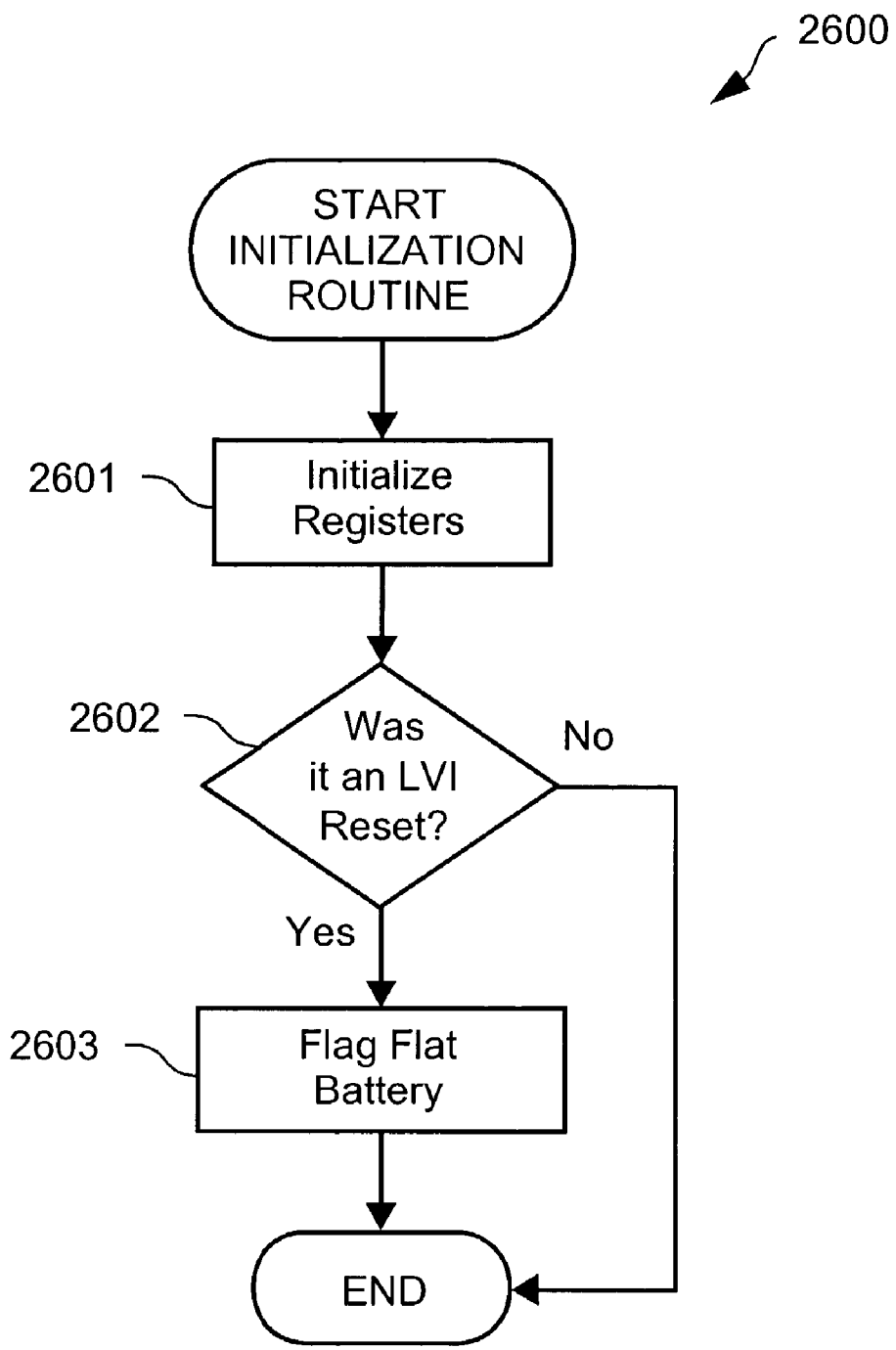
FIG. 26 is a flow diagram showing a process for initializing the system of FIG. 6, performed during the process of FIG. 25.

After a reset from any one of the five sources described above all configuration registers require correct initialization. If an LVI reset was received then a "possibly depleted battery" flag is set. FIG. 26 is a 2600 showing a process 2600 for initializing the systems 600A and 600B in accordance with the arrangements described. The process 2600 is preferably implemented as software being resident on the reader 1, and being read and controlled in its execution by the CPU 45. The process 2600 begins at step 2601 where all registers are initialized to a predetermined default state. At the next step 2602, a check is performed by the CPU 45 to determine if the reset was an LVI reset. If the reset was not an LVI reset at step 2602, then the process 2600 concludes. Otherwise the process 2600 proceeds to step 2603 where the possibly depleted battery flag is set and then the process 2600 concludes.

6.9.2 The Check Card Process

Figure 27:
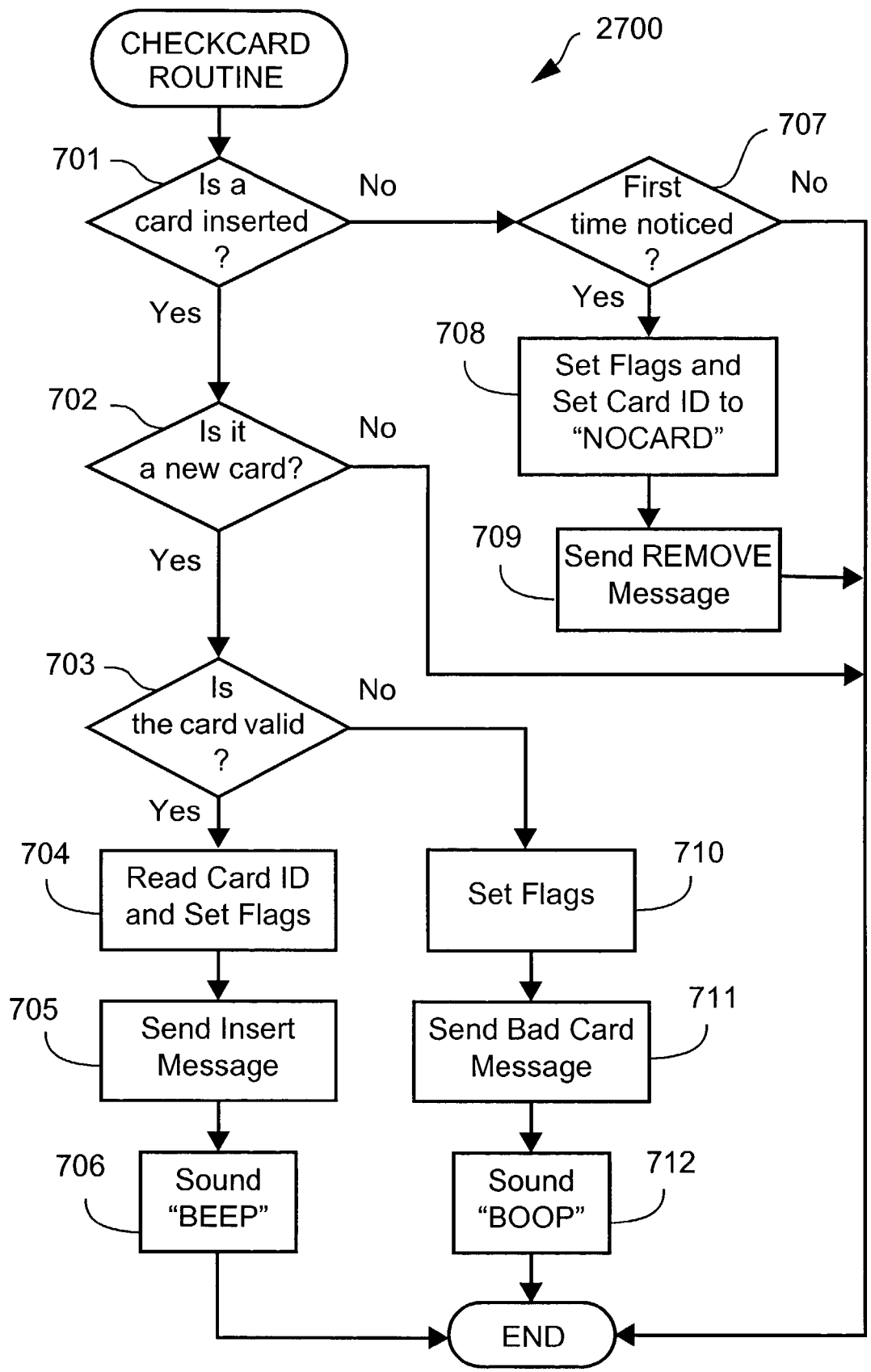
FIG. 27 is a flow diagram showing a process for checking the card of FIG. 1, performed during the process of FIG. 25.

FIG. 27 is a flow diagram showing the process 2700 for checking the card 10. As described above, the process 2700 checks for changes in the presence and validity of a smart card 10 in the remote reader 1 and responds accordingly. The process 2700 is preferably implemented as software being resident on the reader 1, and being read and controlled in its execution by the CPU 45. The process 2700 begins at step 701 where if a smart card 10 is inserted in the remote reader 1, then the process 2700 proceeds to step 702. At step 702, if the card 10 is a new card (i.e., the previous state such that there was no card in the reader 1), then the process 2700 proceeds to step 703. Otherwise, the process of 2700 concludes. At step 703, the "magic number" and "checksum" are read from the card header stored in the memory 19 of the card 10 and are checked for correctness. If the "magic number" and "checksum" are correct, then the process 2700 proceeds to step 704. At step 704, the distinguishing identifier is read from the card header and the "No MOVE events" and "No Event Co-ordinates" flags are set. The process 2700 continues at the next step 705, where an INSERT message is sent to computer 100, and the INSERT message is processed by the CPU 205. At the next step 706, a "BEEP" is sounded and the process 2700 concludes.

If the "magic number" and "checksum" are not correct (i.e.: card is not valid) at step 703, then the process 2700 proceeds to step 710 where the don't beep, no move events and event co-ordinate flags are set. At the next step 711, a BAD CARD message is sent to the computer 100, and the BAD CARD message is processed by the CPU 205. At the next step 712, a "BOOP" is sounded and the process 2700 concludes.

If a smart card 10 is not inserted in the remote reader 1 at step 701, then the process 2700 proceeds to step 707. At step 707, if this is the first operation of the reader 1 after the reset then the process 2700 concludes. Otherwise, the process 2700 proceeds to step 708 where the "Don't beep", "No MOVE Events" and "No Event Co-ordinates" flags are set and the distinguishing identifier is set to "NO_CARD". At the next step 709, a REMOVE message is sent to the computer 100, and the REMOVE message is processed by the CPU 205. The process 2700 concludes after step 709.

6.9.3 The Scan Touch Panel Routine

Figure 28:
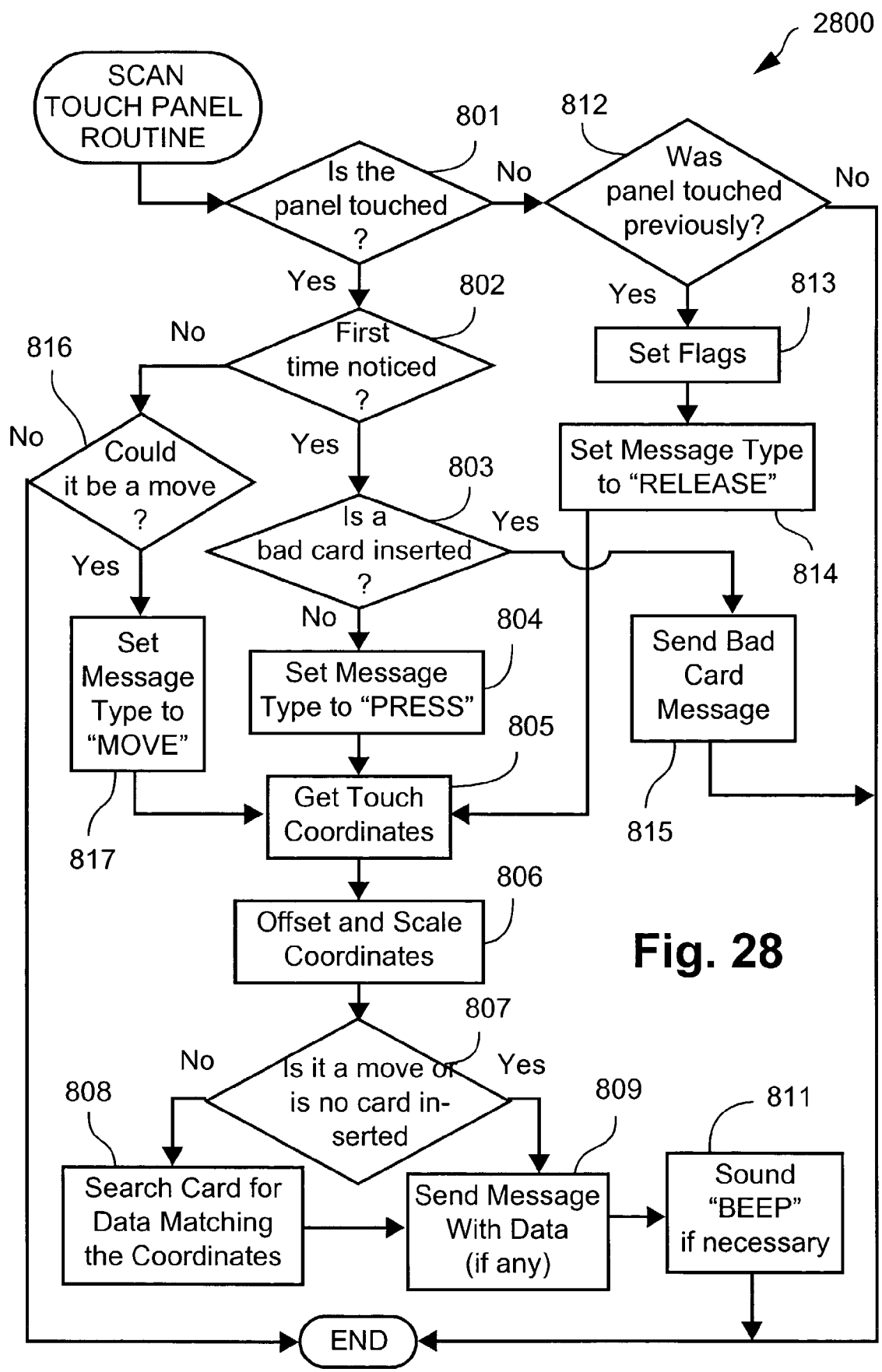
FIG. 28 is a flow diagram showing a process for scanning the touch panel of the reader of FIG. 1, performed during the process of FIG. 25.

FIG. 28 is a flow diagram showing the process 2800 for scanning the touch panel 8 of the reader 1. As described above, the scan touch panel process 2800 checks for touch panel touches that equate with card button presses and responds accordingly. The process 2800 is preferably implemented as software being resident on the reader 1 and being read and controlled in its execution by the CPU 45. The process 2800 begins at step 801 where if the panel 8 is being touched, then the process 2800 proceeds to step 802. Otherwise, the process 2800 proceeds to step 812, where if the panel 8 has been touched previously then the process 2800 proceeds to step 813. Otherwise, the process 2800 concludes.

At step 813, the "don't beep", "no move events" and "event co-ordinate" flags are set. At the next step 814, the message type is set to RELEASE and the process 2800 proceeds to step 805. The process 2800 continues at the next step 802, where if this is the first time that the touch has been detected by the CPU 45 since there was no touch, then the process 2800 proceeds to step 803.

At step 803, the CPU 45 determines if a bad card has been inserted by checking the result of step 703. In the case that a bad card has been inserted into the reader 1, the process 2800 proceeds to step 815. Then at step 815, a BAD CARD message is sent to the computer 100, the BAD CARD message is stored in memory 206, and the process 2800 concludes. If the CPU 45 determines that the card 10 was valid, at step 803, by checking the result of step 703 or that no card was inserted into the reader 1 by the checking of step 701, then the process 2800 proceeds to step 804. At step 804, the type of message is set to PRESS in a message header as seen in FIG. 19.

The process 2800 continues at the next step 805, where the CPU 45 determines the touch coordinates (i.e. X, Y coordinates of user press location) via the touch panel interface 41. At the next step 807, the offset and scale coordinates are determined. The offset and scale coordinates, map the coordinate space of the touch panel 8 to the coordinate space of the card 10.

The process 2800 continues at the next step 807, where if the CPU 45 determines that the set message was a MOVE and/or no card was inserted, by checking step 701, then the process 2800 proceeds directly to step 809. Otherwise, the process 2800 proceeds to step 808 and the memory 19 of the card 10 is searched in order to match the touch coordinates determined at step 805 with the X,Y value of each UI object (see in FIG. 17). Data associated with the matched UI object is read from the card 10 by the CPU 45. At the next step 809, the message is sent along with any data to the associated computer 100, and the CPU 205 in the computer 100 processes the message. The process 2800 continues at the next step 811, where a BEEP sound is sounded and the process 2800 concludes.

If the CPU 45 determines that this is not the first time that the touch has been noticed since there was no touch, at step 802, then the process 2800 proceeds to step 816. At step 816, if the touch detected at step 801 was a move, then the process 2800 proceeds to step 817. Otherwise, the process 2800 concludes. At step 817, the message type is set to MOVE and the process 2800 proceeds to step 805. For example, a MOVE message as defined by FIGS. 19 and 22 is sent along with the X, Y coordinates of a touch position, a PRESS and RELEASE message as defined by FIGS. 19 and 23 is sent along with X, Y coordinates of touch position and data associated with the UI object (e.g. one of the indicia 14). If the CPU 45 determines that the message was MOVE, at step 807, then the CPU 45 sends MOVE message to the computer 100 at the next step 809. Then the CPU 205 processes the X, Y coordinates as cursor information and moves a cursor that is displayed on the Video Display 101.

Further, if NO Event Coordinates (see FIG. 13) have been set in the card 10, the reader 1 can send the data associated with the UI object to the event manager 301 in the computer 100 or STB 601 without sending X, Y coordinates of the touch position.

Still further, if the application 304 has a UI Object structure (see FIG. 17) and can perform a matching function as executed at step 808 of the process 2800, then the reader 1 may send X, Y coordinates corresponding to a touch position to the application 304. The can then CPU 205 execute the same matching function to read data associated with the UI object from the event manager 301 and provides a service (e.g. game) to a card user as identified by a service identifier corresponding to the data. For example, at step 4205 of the process 4200, as seen in FIG. 41, the CPU 205 reads any data in the data field of the message and then processes the data in accordance with the process 2800 described above, at the next steps of FIG. 41. If there is no data in the data field, the CPU 205 reads X,Y coordinates from the message and executes the matching function for the coordinates to determine data associated with user pressed indicia. Alternatively, the event manager 301, using the UI object structure available to the event manager 301 can perform such a matching function.

Accordingly, if a card user can use the reader 1, without inserting the card 10, as a mouse by moving his or her finger on the touch panel 8. In this manner, the user can select a STB service on a STB menu displayed on a TV 116 display. Also, if the card user uses the reader 1 with a card 10 inserted and selects some indicia 14, the user can receive a service (e.g. game) from computer 100 or STB 601. For example, if the user selects START indicia, a desired game is executed in the computer 100 or STB 601 and an object in the game kicks a ball according to a selection of KICK indicia 24.

Further, by pre-defining per-card flag values in the card 10, various types of cards (e.g. card 10) can be provided to a user. For example, if a flag, "NO Move Events", has been pre-set in the card 10, a mouse function is not given to reader 1 and the reader 1 can not perform as a mouse based on the flag setting. On the other hand, if the flag, "NO Move Events" has not been pre-set in card 10, such a mouse function is given to reader 1 and the reader 1 can perform as a mouse based on the flag.

As seen in FIG. 13, although the default is that the reader 1 provides audio feedback, acts as a mouse and sends coordinates for press, release and move events, the default may alternatively be that the reader 1 does not provide audio feedback, act as a mouse and send coordinates for them. Per-Code Flag Values defines that some function (Beep Function, Mouse Function and Matching Function).

Therefore, if the beep function is given to the reader 1 by the per-card flag values, the reader 1 sounds a "beep" and the CPU 45 can execute the processes 2700 and 2800 as seen FIGS. 27 and 28. Further, if the Mouse Function is given to reader 1 by the per-card flag values, the reader 1 can act as a mouse and the CPU 45 can execute the processes 2700 and 2800 as seen in FIGS. 27 and 28. Still further, if the Matching Function is given to the reader 1 by the per-card flag values, the reader 1 can send coordinates corresponding to a press, release and move event executing the processed 2700 and 2800 and can further perform the matching function (i.e., step 808) in event manager 301. For example, the card 10 may be a card having only a mouse function and/or a basic function (e.g., sending to the EM 301 data associated with indicia selected by a user). By combining each of the per-card flag values randomly, various types of cards can be provided to a user.

By sending at least a service identifier in the distinguishing identifier to the event manager 301, a service can be provided to a card user, since the service identifier is an indispensable identifier for the system 600. A service specific identifier can be preferably set by a vendor for use with an application associated with the vendor. Therefore, if the vendor defines a unique service specific identifier for each card, the card would be unique. If the service specific identifier is being used to provide information about the means by which cards were distributed (e.g. by mail, hand out on train, etc.), the service specific identifier can be added to a file which gives a record of which cards have been used to access the service for later use in determining how effective different distribution means have been.

6.9.4 The Wait 10 ms Process

Figure 29:
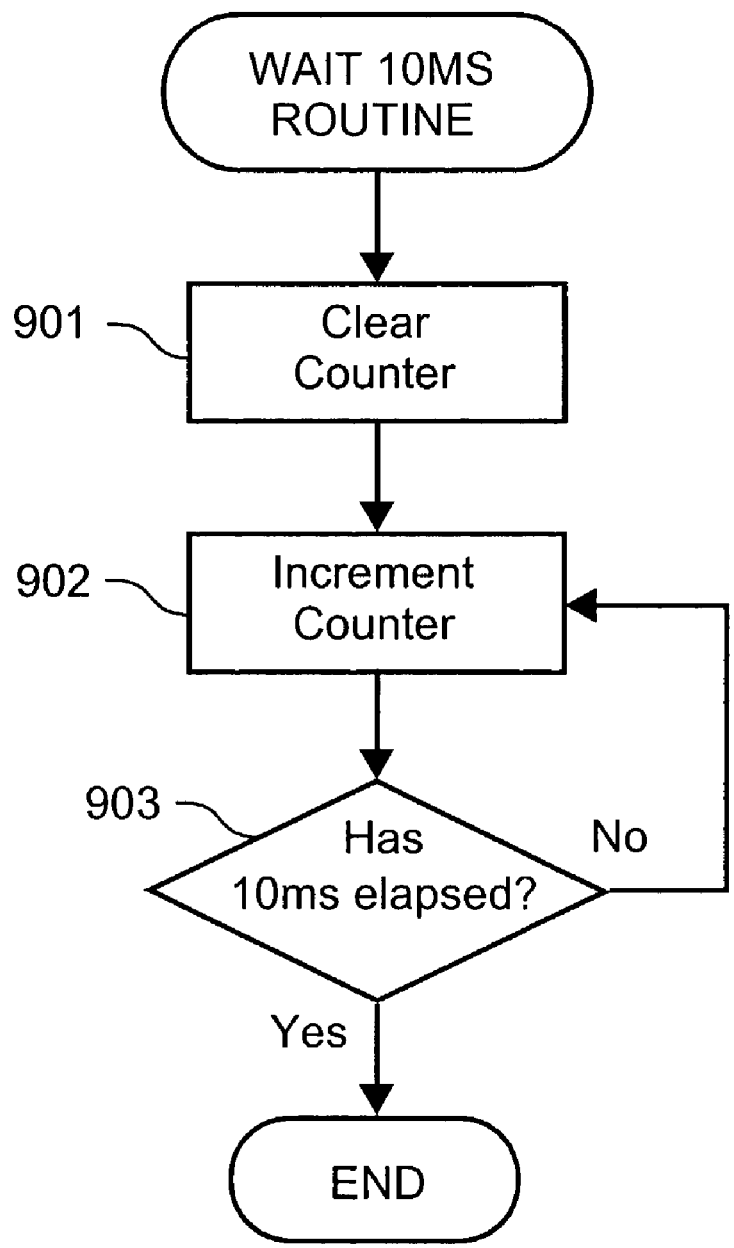
FIG. 29 is a flow diagram showing a wait 10 ms process, performed during the process of FIG. 25.

FIG. 29 is a flow diagram 2900 showing a wait 10 ms process 2900. The wait 10 ms process 2900 loops so as to consume CPU cycles until 10 ms has elapsed. The process 2900 is preferably implemented as software being resident on the reader 1 and being read and controlled in its execution by the CPU 45. The process 2900 begins at step 901 where a predefined process counter is cleared. At the next step 902, the counter is incremented. At the next step 903, if 10 ms has not elapsed, then the process 2900 returns to step 902. Otherwise the process 2900 concludes.

7.0 Event Manager

The event manager 301 is one of the most important of the process components of the software architecture 200. The event manager 301 enforces the rules of the architecture 200 and ensures consistent behavior between the other process components.

7.1 Role in the System

Most communications pass through the event manager 301 and the event manager 301 is the only part of the architecture 200 that all process components except the directory service 311 components need to be able to directly communicate with. The event manager 301 acts as the enforcer of the rules of the architecture 200, and the event manager 301 does not necessarily have to be configured as one distinct software program. The event manager 301 can also be formed of trusted relays or other separate process components that perform part of the event manager role. This can be done for efficiency or security reasons for example.

The event manager 301 may incorporate various other parts of the software architecture 200 such as the I/O daemon 300 and the launcher 303. The event manager 310 may even incorporate an application such as a browser controller.

The event manager 301 can communicate with every process component of the system 600 except the directory service 311 either directly or through a trusted relay. These components include the I/O daemon 300, launcher 303 and any of the applications 304. The event manager 301 can use any suitable communications method to communicate with the other process components. The preferred communication method is Transmission Control Protocol/Internet Protocol (TCP/IP) due to it's nearly universal implementation but other OS specific methods, such as Unix™ sockets, etc can also be used. When the process components are integrated together the method used to communicate could be internal data passing between separate threads.

The event manager 301 is preferably configured to be immune to interference from other process components. This includes other processes being able to kill the event manager 301 or being able to starve the event manager 301 of CPU time or network bandwidth. This is to ensure that the event manager 301 can remain in ultimate control of the system 600.

7.2 Internal Requirements

The event manager 301 must do non-blocking I/O to all the other process components 300, 303, 304 and 306 of the architecture 200 by methods such as polling (NB: polling is not recommended due to the CPU load), interrupt driven I/O, having a separate thread reading and writing from each component or any other suitable method that achieves the same goal. This is to ensure that one component is not starved out by another component, which also generally reduces user wait time.

The event manager 301 must also check all incoming data for validity and repair the data if possible before output. This includes data from trusted components. The event manager 301 should also be fail safe. If the event manager 301 receives unexpected data from one of the components 300, 303, 304, or 306, then the event manager 301 should deal with the data and not exit unless it is absolutely unavoidable.

The event manager 301 can be required to be running for a considerable length of time and it is configured so as to ensure that performance does not degrade over time. The event manager 301 is preferably configured to assume that the transmission mechanism is reliable for communication with any component that is using a predetermined em-protocol but must assume that the transmission mechanism used to communicate with the remote reader 1, via the I/O daemon 300, is unreliable and parts of the incoming data may be incorrect or missing.

7.3 Procedures

The event manager 301 is a direct participant in some of the operations of the system 600 but also transparently takes part in many of the other operations of the architecture 200. The event manager 301 is transparent in that it uses data packets as they pass through it without modifying them. The procedures will be explained in more detail below particularly with reference to section 8.0.

Figure 30:
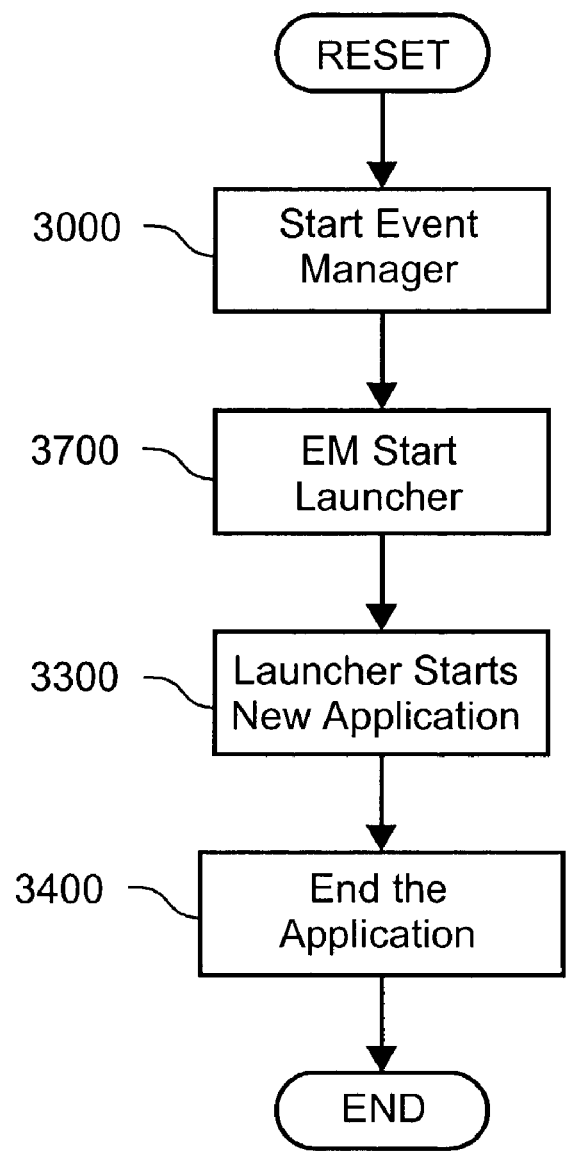
FIG. 30 is a flow diagram showing an overview of events performed by the system of FIG. 6.

FIG. 30 is a flow diagram showing an overview process 3010 performed by the system 600 in accordance with the arrangements described. The process 3010 is executed by the CPU 205 depending on the configuration of the system 600. The process 3010 begins at step 3000 where a system initialization routine is performed, which includes starting the event manager 301. At step 3000 the I/O daemon is typically also started with the event manager 301.

At the next step 3700 the event manager 301 starts the launcher 303. At the next step 3300, the event manager 301 passes a message to the launcher 303, which enables the launcher 303 to determine which application 304 to execute, and the launcher 303 then starts the corresponding application 304. At the next step 3400, once the currently running application 304 is no longer needed, for instance, when a new card 10 is inserted into the reader 1, the launcher 303 provides an exit message to the running application to end the execution of the running application. All applications are terminated when the system 600 is powered down (or switched off).

Figure 31:
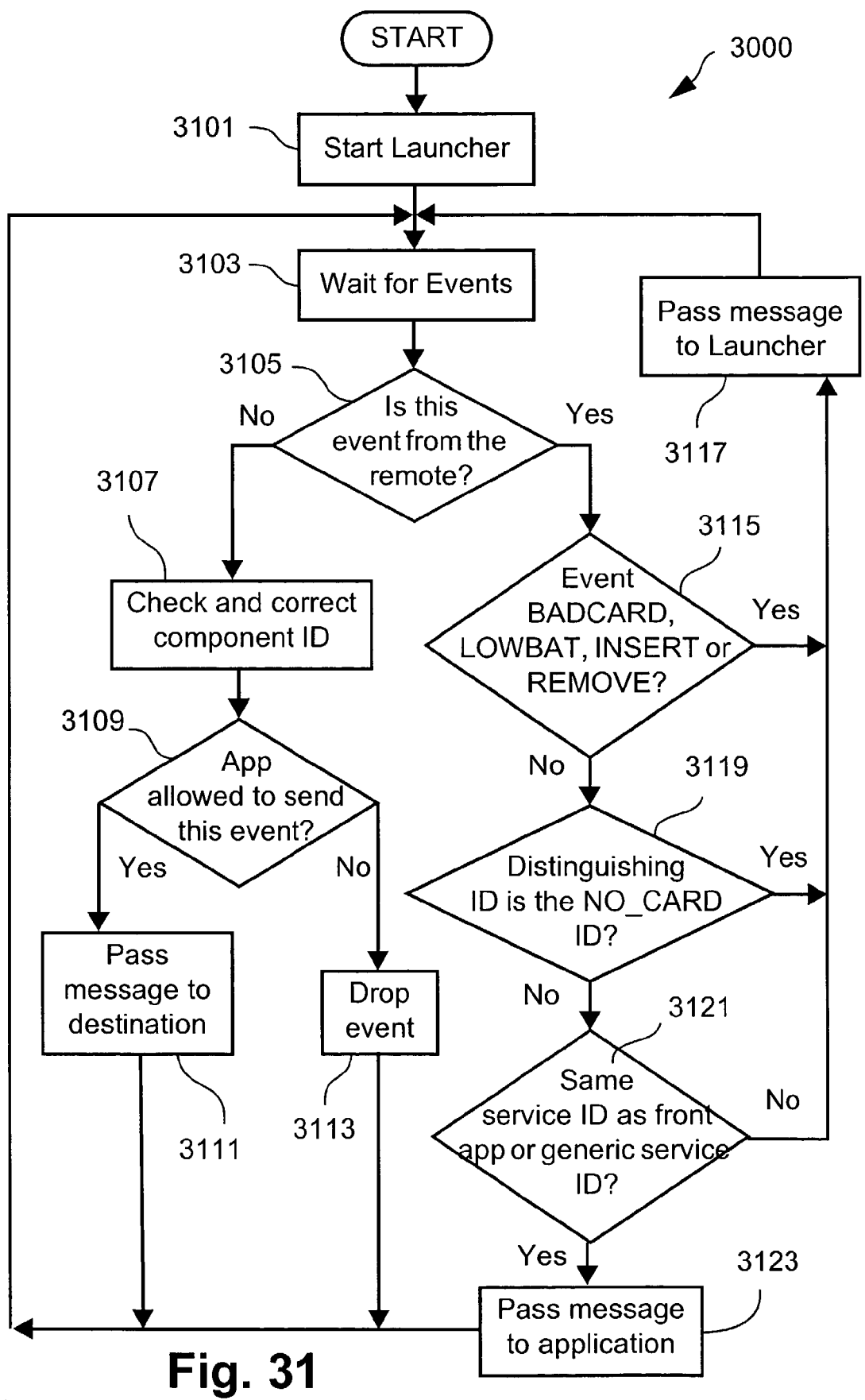
FIG. 31 is a flow diagram showing processes performed by the event manager during the process of FIG. 30.

FIG. 31 is a flow diagram showing a process 3000 performed by the event manager 301. The process 3000 can be executed by the CPU 205 for computer implementations. Alternatively, the process 3000 can be executed by the CPU 4305 in set top box implementations. The process 3000 begins at step 3101, where the launcher 303 is started. At the next step 3103, the event manager 301 receives an event. If the event received at step 3103 is not from the remote reader 1 at the next step 3105, then the process 3000 proceeds to step 3107 where the component identifier is checked and corrected if necessary. At the next step 3109, if the new application sending an event is allowed to send the event, then the process 3000 proceeds to step 3111. At step 3111, the event is sent to a destination process component and the process 3000 returns to step 3103. If the sending application is not allowed to send the event at step 3109, then the process 3000 proceeds to step 3113, where the event is dropped and the process 3000 returns to step 3103.

If the event is not from the remote reader 1 at step 3105, then the process 3000 proceeds to step 3115. If the event is a BADCARD, LOWBAT, INSERT or REMOVE event at step 3115 then the process 3000 proceeds to step 3117. Otherwise the process 3000 proceeds to step 3119. At step 3117, the event is passed to the launcher 303 and the process 3000 returns to step 3103. If the distinguishing identifier is the NO_CARD identifier at step 3119, then the process 3000 proceeds to step 3117. Otherwise the process 3000 proceeds to step 3121, where if the service identifier is not the same as that which has been used to determine the front application, then the process 3000 proceeds to step 3117. Otherwise, the process 3000 proceeds to step 3123, where the event is sent to the front application and the process 3000 returns to step 3103.

7.4 Focus Change

The event manager 301 can safely ignore any EM_LOSING_FOCUS events that are not for the currently front application. The event manager 301 needs to watch for EM_GAINING_FOCUS messages for which applications becoming the front application as well as the service identifiers that are associated with that application. The event manager 301 can safely ignore multiple EM_GAINING_FOCUS events that are to the same application with the same service identifier as well as any EM_LOSING_FOCUS events to applications that are not the currently front application. Messages that are ignored are passed on as normal.

7.5 Reader Messages

The event manager 301 is also responsible for distributing the messages to the correct component. The event manager 301 is configured to follow the certain predetermined protocol rules, which will be described in detail below.

7.6 Restrictions on Sending Messages

A further role of the event manager 301 is to enforce predetermined restrictions on the transmitting of messages.

8.0 Event Manager Protocol

The event manager protocol (EM-protocol) is the protocol used to communicate between all components of the architecture 200 except for the directory service 311. Generally all messages are configured to go through the event manager 301 before being passed onto an intended recipient. The EM-protocol is a datagram based protocol that is implemented on top of a reliable communications protocol, for example, Transport Control Protocol/Internet Protocol (TCP/IP). The event manager 301 is configured to assume that all data being sent will arrive unchanged and in the correct order. The event manager 301 does not assume that there is a reliable method of synchronization between the process components of the architecture 200.

All multi-byte values are sent in Internet byte order (i.e. big-endian). The exception to this is the 'distinguishing identifier' values representing services, which are sent as blocks of several single bytes and are always treated as such (i.e. the distinguishing identifier values are never stored as a number due to byte ordering issues).

8.1 Communication Methods

The event manager protocol is preferably configured to assume a TCP/IP like method of communication between the components of the architecture 200 and the system 600 hardware components. Alternatively, any known method of communication that ensures reliable transport can be used. For example, an operating specific method such as 'Unix sockets' can be used. The data can be passed between the process components 301, 303, 304 and 306 directly via internal data structures in a multi-threaded application, for example.

In the case of architectures where an alternative method of communication between the components is being used, the problem of byte-ordering must be taken into account. If it is possible that applications can run on a machine that has different byte orderings or is required to communicate with components that expect the data in network byte order, which all components assume by default, then all affected communications can be done in network byte order.

8.2 Data Format

8.2.1 Basic Data Types

Some abbreviations that are used in the following paragraphs to refer to data types are as follows:

| | |
|---|---|
| int8: | An eight bit signed value; |
| uint8: | An eight bit unsigned value; |
| int16: | A 16 bit signed value; |
| uint16: | A 16 bit unsigned value; |
| int32: | A 32 bit signed value; |
| uint32: | A 32 bit unsigned value; and |
| xid_t: | A 32 bit unsigned value. |

8.2.2 Component Addressing

Every addressable process component in the architecture 200 is assigned a 32 bit unsigned value referred to as an 'xid'

(or component identifier). This number is unique within the boundaries of each individual system 600 instance. Some xids of the process components are always the same. These are:

| | |
|---|---|
| Event Manager 301: | EM_EVENT_MANGER_XID |
| Master Launcher: | EM_MASTER_LAUNCHER_XID |
| Launcher 303: | EM_FIRST_APP_XID |
| Display Manager 306: | EM_DISPLAY_MANAGER_XID |

The xid value is divided up into a one byte type field and a three byte identifier. The different types are shown in Table 1 below.

TABLE 1

| Value | Type |
|---|---|
| Internal xid's | These xid values are not routable and can be used internally by all components. They are dropped if seen by the EM |
| Core System xid's | These identify the core system components of a UICard system. These components include the EM, Launcher and Master Launcher. |
| Standard UICard Application | These identify standard applications that are started and ended by the Launcher as needed. |
| Special UICard application | These identify special applications that aren't controlled by the standard rules for starting and ending applications. They are applications that are written to provide the UICard system with functionality that can be controlled by other applications such as a video on demand player or a browser controller. |
| Readers | Readers are assigned xids by the EM. These xids are unique to each reader that is used to access the system for the duration of the EM. If the event manager and therefore the system is restarted then the reader xids will change. |

8.3 Message Types

There are twenty-two core messages in the EM-protocol, which in the arrangements described herein have the following labels:
EM_NEW_LAUNCHER
EM_KILL_LAUNCHER
EM_APP_REGISTER
EM_EXIT_NOW
EM_CLOSE
EM_APP_STARTING
EM_APP_DYING
EM_GAINING_FOCUS
EM_LOSING_FOCUS
EM_LIST_MESSAGES
EM_LIST_APPS
EM_SEND_MESSAGE
EM_POST_MESSAGE
EM_GET_MESSAGE
EM_DELETE_MESSAGE
EM_READER_INSERT
EM_READER_REMOVE
EM_READER_BADCARD
EM_READER_MOVE
EM_READER_PRESS
EM_READER_RELEASE
EM_READER_LOW_BATT These messages will be explained in more detail in the following paragraphs.

8.3.1 Message Header

The messages sent within the system 600 have a header portion preferably including the following information:

version: This represents the version number of the protocol being used by the component. Version should always be set to EM_PROTOCOL_VERSION which is defined in library headers to be the version used by the library.

type: This represents the type of message that this header proceeds and is set to one of the message types listed above and described below. The length of the messages is assigned the label dataLength.

reserved: This represents that the value in these two bytes is reserved and should be set to zero.

timestamp: This represents the timestamp of a data packet.

to_xid: This represents the destination xid of the particular packet. This is the final destination of the packet and should only be set to the event manager if that is the intended final recipient.

from_xid: This represents the source xid of the packet.

dataLength: This represents the length of the data that follows the header. This value can be zero. Different types of messages impose different requirements on the data following the message header. Components should not assume the length of a message from the type. The number of bytes in the dataLength field is always read even if this is different to the correct size of the message to insure that the stream can only be corrupted by an incorrect dataLength.

8.3.2 EM_NEW_LAUNCHER

The EM_NEW_LAUNCHER message is sent when the event manager 301 requires a new launcher 303. This message is only sent between the event manager 301 and a master launcher if the arrangement includes such a master launcher. The packet containing this message also contains information that a new launcher needs to connect to the event manager 301. The EM_NEW_LAUNCHER message preferably includes the following information:

port: This represents the port number that the event manager 301 is listening for new connection on.

host: This represents the host name of the machine running the event manager 301.

8.3.3 EM_KILL_LAUNCHER

The EM_KILL_LAUNCHER message is sent when the event manager 301 wants the master launcher (if the arrangement includes a master launcher) to kill the current launcher 303. The EM_KILL_LAUNCHER message has no data associated with it.

8.3.4 EM_APP_REGISTER

The EM_APP_REGISTER message is sent, when an application is starting up, to the launcher 303 and informs the rest of the components of the architecture 200 that it is now ready to receive messages. Any messages that an application 304 sends before it has registered will be discarded by the event manager 301.

The EM_APP_REGISTER message preferably includes the following information:

xid: This represents the component identifier that was assigned to the application by the associated launcher 303.

The remainder of the information sent can not be represented by the structure as the remaining fields are of variable length. The data following the xid is a series of null terminated strings with a maximum length of 256 characters not including the terminating null, consisting of the lower and upper case characters a–z, the numbers 0–9 and the characters (.,-_). If the strings are longer than 256 characters the strings will be truncated at 256 characters.

Application Name: This represents a name that is used to identify the present application to other applications.

Service Group: This represents one or more names of service groups that the application wishes to be a part of.

An application that is persistent, such as a browser controller, only needs to register once. It does not need to register everytime it gets an EM_GAINING_FOCUS event.

8.3.5 EM_EXIT_NOW

The EM_EXIT_NOW message is sent by the launcher 303 to an application when the application is about to be forced to exit. The EM_EXIT_NOW message has no data associated with it.

8.3.6 EM_CLOSE

The EM_CLOSE message is sent to persistent applications to indicate that the current session is closed and to return the application to its startup state. Once this message is received by an application the application is required to treat the next EM_GAINING_FOCUS event as the start of a new session rather than as a change in input/output focus. The EM_CLOSE message has no associated data.

8.3.7 EM_APP_STARTING

The EM_APP_STARTING message is sent by the launcher 303 to the event manager 301 when an application is about to start. The EM_APP_STARTING message preferably includes the following information:

xid: This represents the component identifier of the application that is about to start.

8.3.8 EM_APP_DYING

The EM_APP_DYING message is sent by the launcher 303 to the event manager 301 when an application has exited. The EM_APP_DYING message is sent only after the launcher 303 is certain that the application has finished. The EM_APP_DYING message preferably includes the following information:

xid: This represents the component identifier of the application that has exited.

8.3.9 EM_GAINING_FOCUS

The EM_GAINING_FOCUS message is sent to an application by the launcher 303 when the application 304 is about to start receiving input from the remote reader 1. The EM_GAINING_FOCUS message preferably includes the following information:

id: This represents the distinguishing identifier of the remote reader 1 messages that will be sent to an application.

Data: This represents extra data that is to be sent to the application when it is about to receive focus. The extra is specific to each service and it is up to the application to interpret the data. The extra data is not checked for byte ordering issues and this should be dealt with by the application. Any multi-byte data is sent by applications in network byte order and is assumed to be in this order by the receiving application. An example of this data when the receiving application is a browser controller is a URL which the browser controller is a URL which the browser controller is being instructed to load.

8.3.10 EM_LOSING_FOCUS

The EM_LOSING_FOCUS message is sent when an application 304 is about to lose input/output focus from the remote reader 1 and the display 101. The EM_LOSING_FOCUS message has no extra data.

8.3.11 EM_LIST_APPS

The EM_LIST_APPS message is sent when an application wishes to know what other applications are also running at a point in time. The EM_LIST_APPS message is returned to the application with the data field containing the application list. This message does not need to be addressed to any of the process components 301 to 306. The event manager 301 ensures that the EM_LIST_APPS message is sent to the correct component, which is usually the launcher 303, regardless of the to_xid field of the header. It is the role of the receiving component to decide which applications to list.

The EM_LIST_APPS message has two formats. The first is the format used when the EM_LIST_APPS is sent as a request and the second is the format when it is sent as a reply. The request has no extra data associated with it.

The EM_LIST_APPS message preferably includes the following information:

app_xid: This represents the xid of the application being described.

app_desc: This represents the name string given to the launcher 303 when the application first registers.

8.3.12 EM_SEND_MESSAGE

The EM_SEND_MESSAGE message can be sent between any two concurrently running applications in the system 600. There is no structure imposed on this message by the architecture 200 but communicating applications need to agree on a common data structure.

8.3.13 EM_LIST_MESSAGES

The EM_LIST_MESSAGES message is used to get a list of all messages currently on a message board used in accordance with the arrangements described. The message board will be described in more detail below with reference to section 8.4.7. 1. The EM_LIST_MESSAGES message should be sent to the launcher 303. The EM_LIST_MESSAGES message has a request and reply format. The request format has no data associated with it. The reply preferably includes the following information:

message_count: This represents the number of messages currently on the message board and can be equal to zero.

messages: This represents a variable number (i.e. equal to message_count) of variable sized structures that have the following structure:

Each message preferably includes the following information:

message_id: This represents the message identifier of this message.

poster_id: This represent the xid (component identifier) of the component that posted this message.

mime_type: This represents the Multipurpose Internet Mail Extension-type (MIME-type) of the data associated with this message and is a null terminated string which can be of zero length in which case the terminating zero is still present.

message_desc: This represents the description of this message that was assigned when the message was posted by the posting application and is a null terminated string that is at most 255 characters long not including the terminating zero. The length of this string can be zero in which case the terminating zero is still present.

8.3.14 EM_POST_MESSAGE

The EM_POST_MESSAGE message is used to post some data to the message board of the architecture 200. These messages last until there is a service group change and can be accessed by any application that is running. The EM_POST_MESSAGE messages can also be deleted by any currently running application and are not assumed to be totally reliable. Once the message has been posted it is returned to the application that posted it to inform said application of the message identifier of the message. These messages are sent to the launcher 303 by the application. The message from the application (i.e. the application that posted the message) includes the following information:

message_desc: This represents a description of the message and is a null terminated string that can be at most 255 characters long not including the terminating zero. The description can be zero bytes in length but must still have a terminating zero.

mime_type: This represents the MIME type of the message data that is being posted. The MIME type is not required but there must still be a terminating zero.

message_data: This represents the data to be posted to the message board.

The message returned to the application preferably includes the following information:

message_id: This represents the message identifier by which this message can be retrieved or deleted.

8.3.15 EM_GET_MESSAGE

The EM_GET_MESSAGE message is used to retrieve a message from the message board. The EM_GET_MESSAGE message is sent containing the message identifier of the message that the component wishes to retrieve and it is returned to the component either containing the message or an error that there is no message with that identifier. These messages are sent to the launcher 303 by an application.

The information included when requesting the message is as follows:

message_id: This represents the message identifier of the message the application wishes to retrieve.

flags: This is a flags word. All unused bits should be set to zero. The flag shown in Table 2 is defined:

TABLE 2

| Flag | Description | Value |
|---|---|---|
| EM_GM_DELETE | Delete the message from the message board after it has been sent | 0 × 01 |

The reply has the following information:

error: If an error occurred then this will be set to one of the values in Table 3 below.

TABLE 3

| Value | Description |
|---|---|
| EM_GM_NO_ERROR | No error occurred. The message is in the message field. |
| EM_GM_NO_SUCH_MESSAGE | No message exists with that message identifier on the message board. | message_id: This represents the message identifier of the message that was retrieved.

mime_type: This represents the MIME type of the message that was retrieved. This is a null terminated string. If this message has no MIME type associated with it then the string is zero length but the terminating zero is still present.

message: If no error occurred then this field will contain the data posted on the message board. The length is determined by the dataLength value in the header minus the size of the error field. Note that, zero length data is also present if an error occurred.

8.3.16 EM_DELETE_MESSAGE

The EM_DELETE_MESSAGE message is used to delete messages from the message board. It is not an error to delete a message that does not exist. These messages are sent to the launcher 303 by the front application. The EM_DELETE_MESSAGE preferably includes the following information:

message_id: This represents the message identifier of the message that is to be deleted.

8.3.17 User Interface (UI) Card Reader Messages

The UICard reader messages are generated by the remote reader 1 and are encapsulated by the event manager 301 so that they conform to the event manager protocol. There are three types of messages that are generated by the remote reader 1. These messages are "simple" messages, "move" messages and "press/release" messages. Move messages are simple messages with co-ordinates added, and press/release messages are simple messages with data and coordinates added.

8.3.17.1 Simple Messages

The following messages are simple messages:
EM_READER_INSERT
EM_READER_REMOVE
EM_READER_BADCARD
EM_READER_LOW_BATT These simple messages preferably include the following information:

id: This represents the distinguishing identifier that was sent by the remote reader 1 and the value of id has no meaning for BADCARD messages.

8.3.17.2 Move Messages

The EM_READER_MOVE messages preferably includes the following information:

id: This represents the distinguishing identifier that was sent by the remote reader 1, and is set to all zeros for no card messages.

X: This represents the x value.
Y: This represents the y value.

8.3.17.3 Press/Release Messages

EM_READER_PRESS and EM_READER_RELEASE messages preferably includes the following information:

id: This represents the distinguishing identifier that was sent by the remote reader 1.

x: This represents the x value.
y: This represents the y value.
data: This represents any data that was associated with the press or release (associated with the UI-element data).

8.4 Procedures

The following paragraphs describe the main procedures that each process component follows in accordance with the described arrangements.

8.4.1 Starting a New Application

Figure 32:
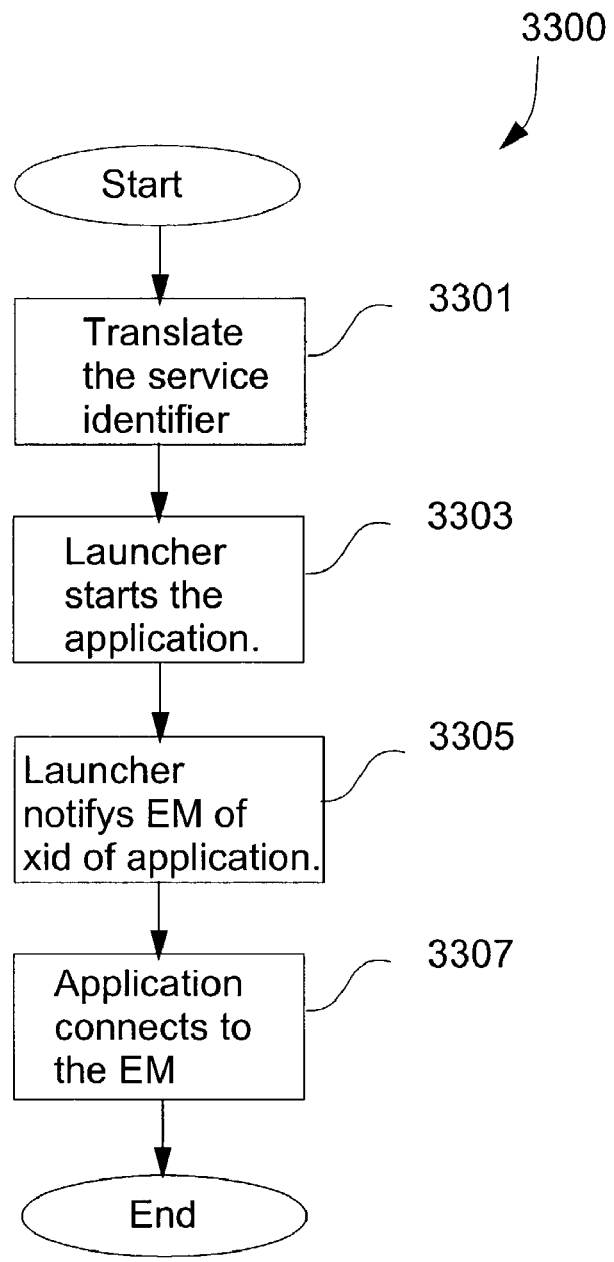
FIG. 32 is a flow diagram showing a process for starting a new application, performed during the process of FIG. 30.

FIG. 32 is a flow diagram showing detail of the process 3300 for starting a new application used whenever the launcher 303 starts a new application. The process 3300 can be executed by the CPU 205 for computer implementations.

Alternatively, the process 3300 can be executed by the CPU 4305 in set top box implementations. The process 3300 begins at the first step 3301 where the launcher 303 performs a mapping to translate the service identifier into a URL if necessary. At the next step 3303, the launcher 303 fetches and starts the application informing it of an event manager host-name and port number. The process 3300 continues at the next step 3305, where the launcher 303 sends the event manager 301 an EM_APP_STARTING message informing the event manager 301 of the xid of the starting application. At the next step 3307, the new application connects to the event manager 301 and sends the launcher 303 an EM_APP_REGISTER message. Further, there is normally a focus change to the new application.

8.4.2 Ending an Application

Figure 33:
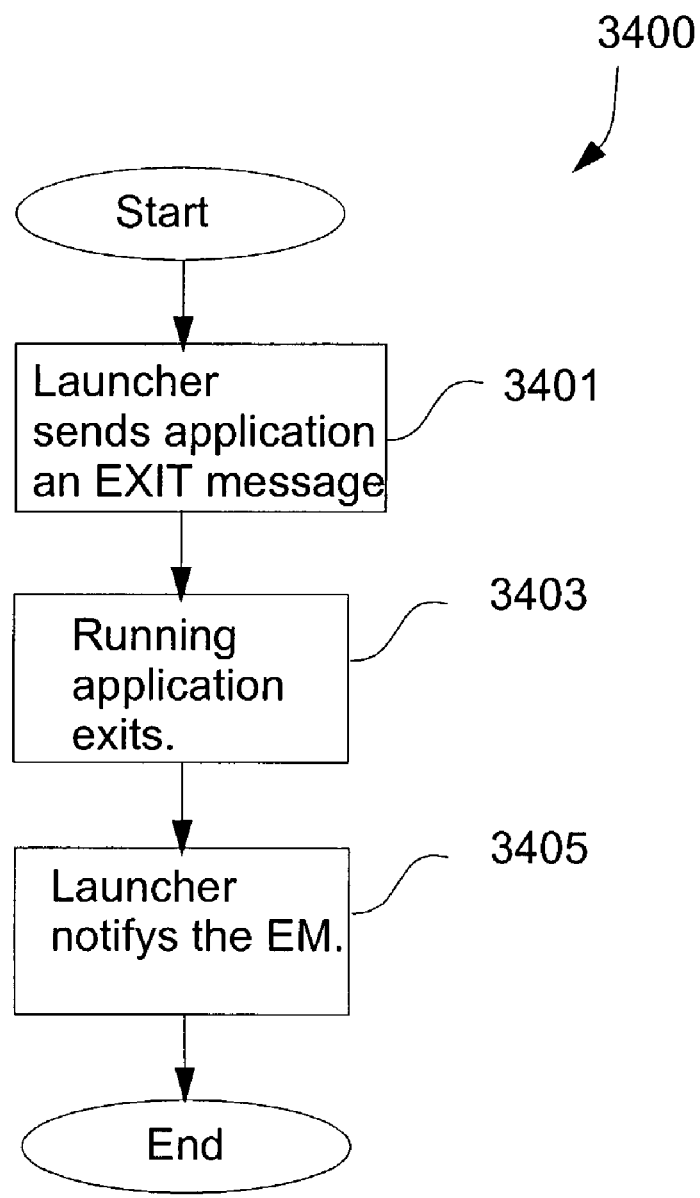
FIG. 33 is a flow diagram showing a process for ending an application performed during the process of FIG. 30.

FIG. 33 is a flow diagram showing a process 3400 for ending an application. The process 3400 can be executed by the CPU 205 for computer implementations. Alternatively, the process 3400 can be executed by the CPU 4305 in set top box implementations. The process 3400 is used whenever the launcher 303 terminates a running application. The process 3400 begins at step 3401, where the launcher 303 sends the running application an EM_EXIT_NOW message. The launcher 303 sets a time out at this point to give the application a chance to exit cleanly. At the next step 3403, the running application cleans up and exits. Alternatively, the application ignores the EM_EXIT_NOW message and the launcher 303 times out and forces the application to quit. At the next step 3405, the launcher 303 sends the event manager 301 an EM_APP_DYING to tell it that the application has exited and it should discard any waiting data and close the connection to the application if the connection is still open, and the process 3400 concludes.

8.4.3 Closing a Persistent Application's Session

Figure 34:
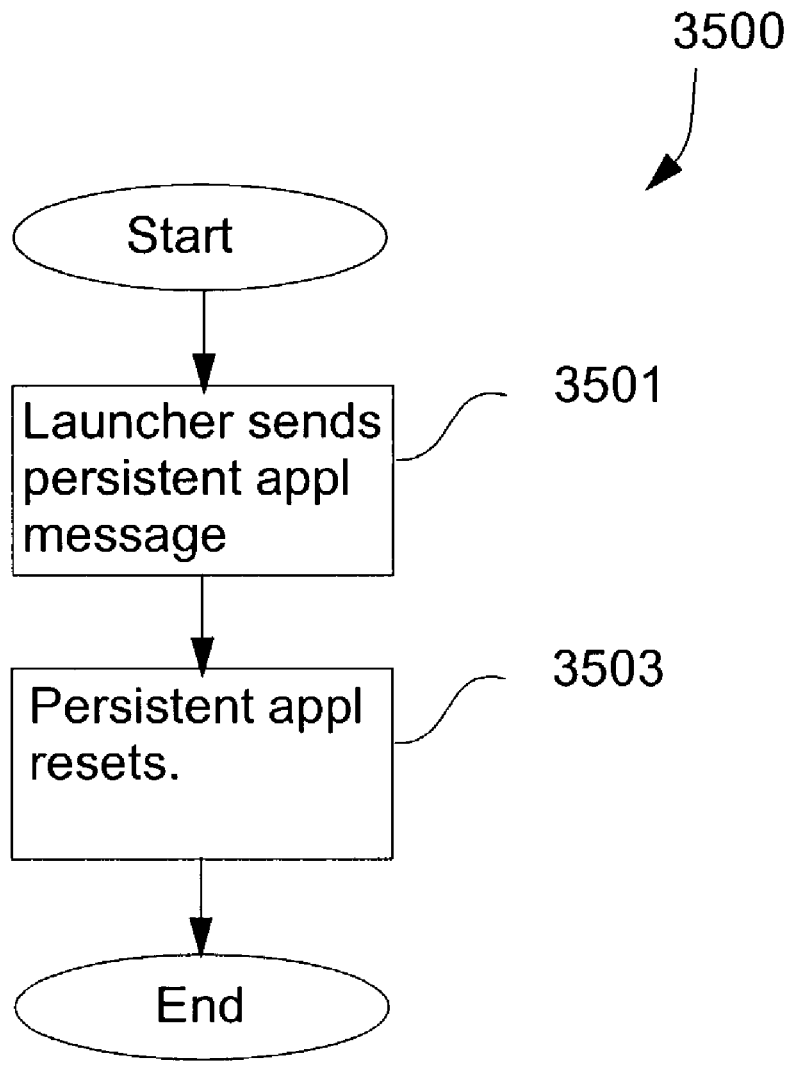
FIG. 34 is a flow diagram showing a process for closing a current session for a persistent application.

FIG. 34 is a flow diagram showing a process 3500 for closing the current session of a persistent application. The process 3500 can be executed by the CPU 205 for computer implementations. Alternatively, the process 3500 can be executed by the CPU 4305 in set top box implementations. The process 3500 is analogous to the application ending but the application does not actually close. The process 3500 begins at step 3501, where the launcher 303 sends the persistent application an EM_CLOSE message. At the next step 3503, the persistent application resets to its initial state, and the process 3500 concludes. This may involve closing connections to outside servers, loading a default web page etc. The next EM_GAINING_FOCUS event that the persistent application receives is assumed to be the start of a new session.

8.4.4 Focus Change

Figure 35:
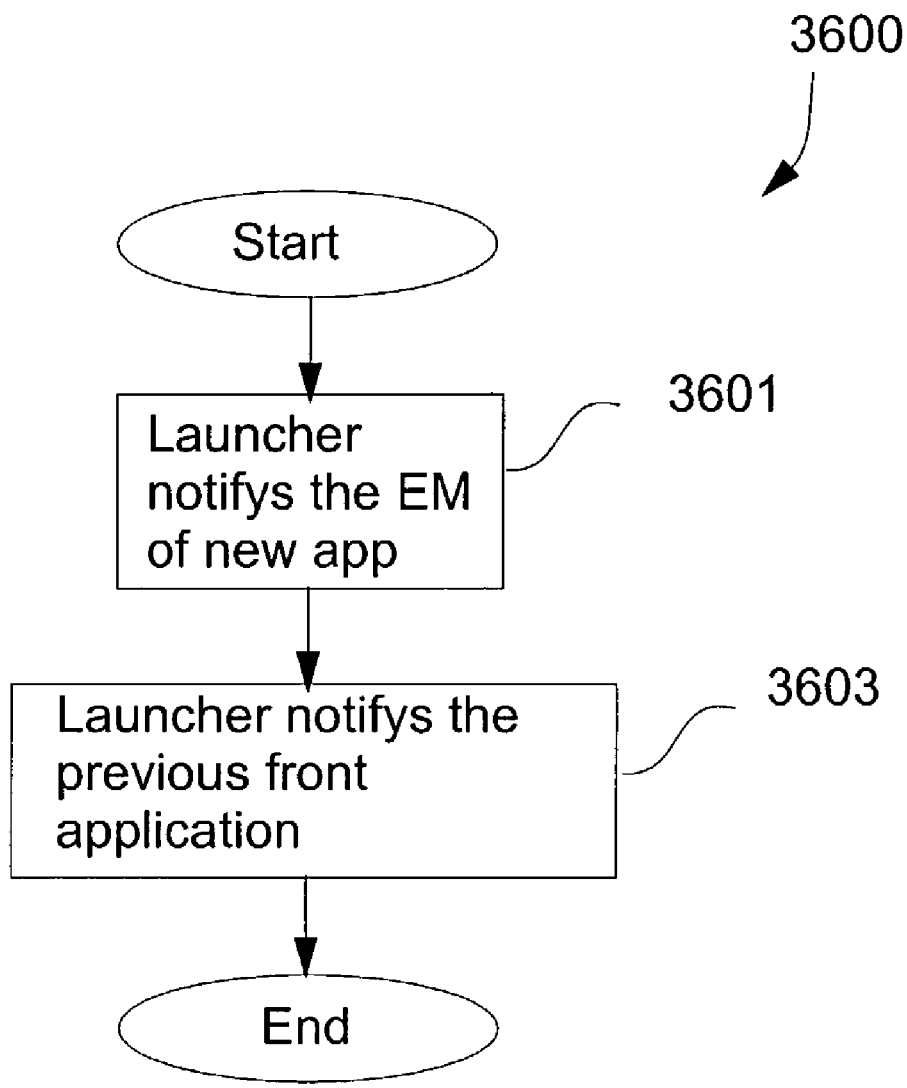
FIG. 35 is a flow diagram showing a process for performing a focus change.

FIG. 35 is a flow diagram showing a process 3600 for performing a focus change. The process 3600 can be executed by the CPU 205 for computer implementations. Alternatively, the process 3600 can be executed by the CPU 4305 in set top box implementations. The process 3600 is used to tell an application that it is about to gain/lose input/output focus, which is not a signal for the application to exit. At the first step 3601, the launcher 303 makes the decision to change the application that currently has input/output focus and sends the application that is to receive input focus an EM_GAINING_FOCUS event typically based on a card change. The sending of this event is used by the event manager 301 to decide which application should receive input/output focus based on predetermined conditions. At the next step 3603, the launcher 303 sends the previous front application an EM_LOSING_FOCUS event, and the process 3600 concludes. This message is less critical and is not sent when the currently front application remains the same, but still needs the EM_GAINING_FOCUS (i.e. in the case of a browser controller where the EM_GAINING_FOCUS events are used to tell the browser controller 402 the base URL).

8.4.5 Message Passing

There are two distinct types of message passing between applications supported by the architecture 200. The message board that is as persistent as the current service group and a direct message method where two components communicate with each other directly.

8.4.5.1 Message Board

One component of the architecture 200 typically the launcher 303, maintains a message board and the event manager 301 knows which component does this. The message board is formed of a list of messages that are assigned a 32 bit unsigned number as an identifier by the process component managing the message board. The messages are formed of a text description, an optional MIME type for the message data and the message itself. An application can request a list of all messages currently on the message board by sending an EM_LIST_MESSAGES message. This will return with the text descriptions of all messages currently on the message board with their associated message identifiers. The application can then request a specific message by sending a EM_GET_MESSAGE with the message identifier of the message that it requires.

A message can be deleted between getting a listing of the message board and actually requesting a message and such will be indicated by an error field of the EM_GET_MESSAGE message.

8.4.5.2 Direct Communication

Two applications can send each other arbitrary data directly by using direct communication. This is performed by one application sending the other application the data by using an EM_SEND_MESSAGE message. The two applications need to agree on a data format for these messages and byte ordering issues need to be taken into account. To get the component identifier of the other application, an application can request to be sent a list of all running applications by sending an EM_LIST_APPS message which returns a list of all publicly visible applications that are currently running.

8.5 Reader Messages

This section outlines the rules used by the event manager 301 to route the EM_READER_* messages. The following messages are always sent to the launcher 303 regardless of which application currently has focus.
EM_READER_INSERT
EM_READER_REMOVE
EM_READER_BADCARD
EM_READER_LOW-BATT The following messages are sent to the currently front application if the messages are from cards (e.g. the card 10) that have the same service identifier as the currently front application. A service-specific identifier is not taken into account in this comparison. If the service identifier is different to the currently front application or the distinguishing identifier is the NO_CARD present value (i.e. all zeroes) then the message is sent to the launcher 303.
EM_READER_PRESS
EM_READER_RELEASE
EM_READER_MOVE

8.6 Restrictions on Sending Messages

To improve the security and stability of the system 600 there are preferably restrictions placed on the sending of messages. Any messages that breach these rules will be discarded by the event manager 301.

8.6.1 Restrictions for All Components

No component except the remote reader 1 will be allowed to send EM_READER_* messages.

8.6.2 Restrictions on the Event Manager

The event manager 301 is the enforcer of the rules and as such can send any messages necessary. The event manager 301 is configured to generate EM_KILL_LAUNCHER and EM_NEW_LAUNCHER messages but it can copy messages and send the copies to process components that are not the target component. The event manager 301 also handles all transmissions between components.

8.6.3 Restrictions on the Launcher

The launcher 303 sends messages to all components 301 to 306 of the architecture 200. The messages that the launcher 303 can not send are as follows:
EM_KILL_LAUNCHER
EM_NEW_LAUNCHER

8.6.4 Restrictions on Applications

Applications only send the following messages to other applications (which includes the launcher 303):
EM_APP_REGISTER
EM_SEND_MESSAGE
EM_LIST_APPS
EM_POST_MESSAGE
EM_GET_MESSAGE
EM_DELETE_MESSAGE
EM_LIST_MESSAGES

8.7 Component Procedure Lists

This section lists the functions which each major component of system 600 is involved in.

8.7.1 Event Manager

The event manager 301 is a direct participant in the following procedures:
System Initialization
System Startup
Starting a new Application
Ending an Application
Focus Change
Message Passing
Reader Messages

8.7.2 Launcher

The Launcher 303 is a participant in the following procedures:
System Initialization
System Startup
Starting a new Application
Ending an Application
Focus Change
Message Passing (in some instances)
Reader Messages (in some instances)

8.7.3 Applications

The Applications 304 are participants in the following procedures:
Starting a new Application
Ending an Application
Closing a session if the application is persistent.
Focus Change
Message Passing
Reader Messages (in some instances)

9.0 I/O Daemon

The I/O daemon 300 is responsible for transporting the data being sent from the remote reader 1 to the event manager 301, and vice versa for a two-way protocol. In this connection, the I/O daemon 300 is configured to be able to read from the hardware of the system 600 either directly or through operating system drivers that interface with the remote reader 1, for example, an IR link or standard serial hardware connection. The I/O daemon 300 is also required to listen on a TCP/IP port to wait for the event manager 301 to connect, at which point the I/O daemon 300 sends data from the remote reader 1 to the event manager 301 encapsulated in a TCP/IP stream.

The I/O daemon 300 does not communicate with the rest of the system 600 except to send the remote reader 1 data to the event manager 301.

While the functionality of the I/O daemon 300 must be present in the system 600, the I/O daemon 300 does not have to be a separate component. For example, the I/O daemon 300 can be integrated into the event manager 301 if the event manager 301 is running on the same machine as the hardware used to interface with the remote reader 1.

The I/O daemon 300 is configured to run on minimum hardware for the instance where the rest of the system 600 is running remotely.

9.1 Requirements

9.1.1 General Requirements

The platform upon which the I/O daemon 300 is implemented must be able to receive signals from (and optionally transmit signals to) a remote reader 1. The platform also preferably has a TCP/IP stack or other reliable communications method implemented on it to communicate with the other parts of the system (i.e. the event manager (EM) 301). The I/O daemon 300 can be required to do multiplexed I/O, and the I/O system of the architecture 200 is preferably configured to support such a function. The architecture 200 is preferably configured to assign a port that the I/O daemon 300 will be listening on, for example, as a command line argument.

9.1.2 Internal Requirements

The I/O daemon 300 is not required to understand the protocol used by the remote reader 1. The I/O daemon 300 is only required to forward all data that it receives to any listening event manager 301. The I/O daemon 300 is not required to correct any errors of transmission from the remote reader 1 unless it is supported by the transport protocol of the communications link (i.e. through error correcting codes or similar). If the transport protocol being used supports error detection but not correction then any data that does not pass the error check can be passed onto the event manager 301.

9.1.3 External Interface Requirements

The I/O daemon 300 is preferably able to accept one or more TCP/IP connections. The data stream that is sent to the event manager 301 is the content of the data sent by the remote reader 1. All header and footer information that is transmitted as part of the communications protocol used is preferably stripped off and the byte ordering is big endian. If the communication method of the architecture 200 ever becomes unusable (e.g. due to an error arising) then the I/O daemon 300 closes all connections as soon as error condition arises.

9.2 External Interface

The external interface (not shown) of the I/O daemon 300 is intentionally simplistic to allow it to be run on minimum hardware. The I/O daemon 300 is preferably configured in the following manner.

9.2.1 Start-Up Procedure

The I/O daemon 300 listens on a TCP/IP port that is specified to it in some manner, for example, by command line arguments. The exact method of informing the I/O daemon 300 of the TCP/IP port is implementation specific. The communications hardware used to communicate with the remote reader 1 is initialized if required and the method to read data that is sent from the remote reader 1 is configured to be ready to receive data. While the I/O daemon 300 is waiting for a connection, the I/O daemon 300 consumes the data that is being sent by the remote reader 1 so that when a connection is made only new data is being sent. This new data is not required to start on a message boundary.

9.2.2 Connection from an Event Manager

If a connection arrives on the TCP/IP port then the I/O daemon 300 is configured to accept the connection and begin transmitting any data received from the remote reader 1 down the connection. If the I/O daemon 300 is already connected to an event manager 301 then the I/O daemon 300 has two options. Firstly, the I/O daemon can accept the connection and send all data down all currently connected event managers. This option is provided for system debugging purposes. The second method is to reject the second connection and continue to send the data to the already connected em. Any encryption of the stream can be handled externally by some other method, such as port tunneling.

9.2.3 Connection from an Event Manager Closing

If at any time the connection to the event manager 301 is closed, then the I/O daemon 300 is configured to discard any data from the remote reader 1 that is waiting to be sent to that event manager 301. If this is the only event manager connected then the I/O daemon 300 is configured to return to an initial startup state whereby the I/O daemon 300 consumes data being sent by the remote reader 1 and waits for a connection.

9.2.4 Unrecoverable Error is Encountered

If the I/O daemon 300 detects an error that cannot be dealt with and will cause the I/O daemon 300 to exit then the I/O daemon 300 is configured to close all connections to any event managers to inform the event managers that the I/O daemon 300 has detected an error. Examples of these errors include if the hardware that is being used to communicate with the remote reader 1 becomes unavailable or if the I/O daemon 300 receives a signal that would cause it to exit. The I/O daemon 300 is configured to close all connections as soon as an error is experienced.

10.0 Launcher

The launcher 303 is the process component that enforces site specific rules such as allowed applications and basic application configuration rules. The launcher 303 allows the other component processes 300, 301, 304, 305 and 306 of the system architecture 200 to be used in a wide range of applications from a general home set top box 601 to a very specific application (e.g. an automatic teller machine (ATM)). The launcher 303 can be specifically written for each network or installation.

The launcher 303 is configured with special privileges. For example, the launcher 303 can be configured to be the first component to connect to the event manager 301 as the system 600 starts up. Further, the launcher 303 receives all "LOW_BATT", "BADCARD", "INSERT", and "REMOVE" messages sent by the remote reader 1 and also receives all "PRESS", "RELEASE" and "MOVE" messages that originate from a card other than the smart card 10 that the front application is associated with at any one point in time. The launcher 303 also receives PRESS, RELEASE and MOVE messages with a special "NO_CARD" distinguishing identifier. The launcher 303 also has control over which application is the front application via the EM_GAINING_FOCUS and EM_LOSING_FOCUS events.

The launcher 303 is configured to decide when applications need to be started and made to exit. The launcher 303 is also configured to start and stop applications although this is not always the case. This role can be undertaken by another application at the instruction of the launcher 303 for instance in the case where the applications 304 are run on separate machines to the rest of the components of the architecture 200.

The events that are sent to the launcher 303 instead of being sent to the currently front application allow the launcher 303 to make decisions on which application(s) are to be running at the any moment in time and being configured to force applications to exit means that the launcher 303 can enforce which applications are to be currently running. The launcher 303 is also required to inform the event manager 301 when it is starting and stopping applications.

Figure 36:
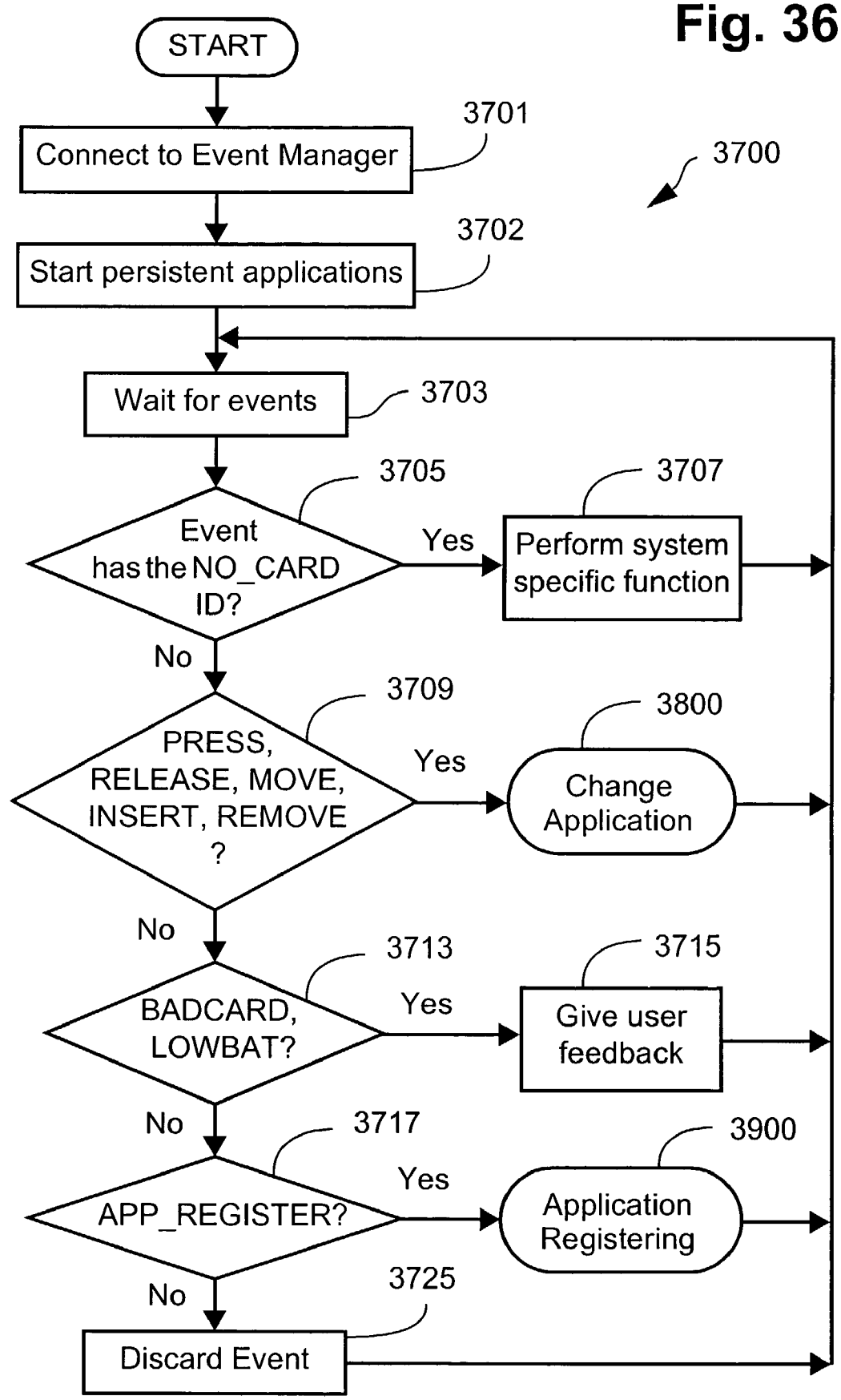
FIG. 36 is a flow diagram showing an overview of the process performed by the launcher.

FIG. 36 is a flow diagram showing an overview of the process 3700 performed by the launcher 303 in accordance with the arrangements described herein. The process 3700 can be executed by the CPU 205 for computer implementations. Alternatively, the process 3700 can be executed by the CPU 4305 in set top box implementations or by the CPU of a remote server. The process 3700 begins at the first step 3701, where the launcher 303 connects to the event manager 301, and then continues to a next step 3702 where persistent applications are started. At the next step 3703, the launcher 303 waits for an event and when an event is received the launcher 303 proceeds to step 3705. If the event is the NO_CARD identifier at step 3705, then the process 3700 proceeds to step 3707. Otherwise the process 3700 proceeds to step 3709. At step 3707, the launcher 303 performs a predetermined system specific function (e.g. displays a message on the display 101) in response to the NO_CARD identifier and the process returns to step 3703.

If the event is a PRESS, RELEASE, REMOVE or MOVE event at step 3709, then the process 3700 proceeds to step 3800. Otherwise the process 3700 proceeds to step 3713. At step 3800, the launcher 303 changes the application and the process 3700 returns to step 3703. The process 3800 of changing an application performed by the launcher 303 will be described below with reference to the flow diagram of FIG. 37

If the event is a BADCARD or LOW_BATT event at step 3713, then the process 3800 proceeds to step 3715. Otherwise the process 3800 proceeds to step 3717. At step 3715, the launcher 303 gives the user some feedback (e.g. displaying a "Low Battery" message on the display 101) and the process 3800 returns to step 3703.

If the event is an APP_REGISTER event at step 3717, then the process proceeds to step 3719. Otherwise the process 3800 proceeds to step 3725. At step 3900, the application is registered (i.e. the application informs the other components 301, 302 and 306 that it is now ready to receive messages, as described above with reference to section 8.3.4) and the process 3800 returns to step 3703. A process 3900 of registering an application in accordance with step 3900, will be described in more detail below with reference to the flow diagram of FIG. 38. At step 3725, the event is discarded and the process 3700 returns to step 3703.

Figure 37:
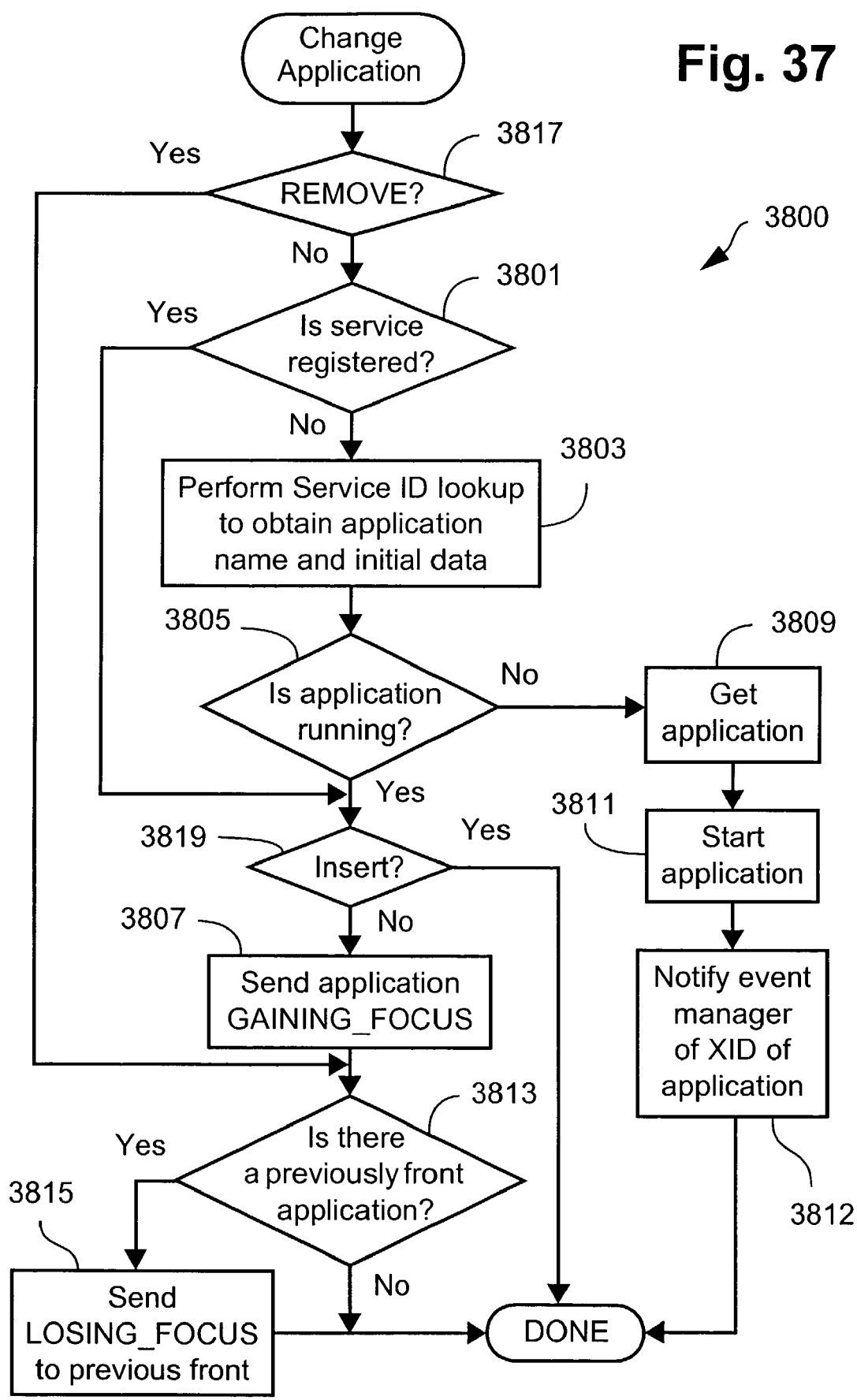
FIG. 37 is a flow diagram showing a process for changing an application, performed during the process of FIG. 36.

FIG. 37 is a flow diagram showing the process 3800 for changing an application, which is performed by the launcher 303. The process 3800 can be executed by the CPU 205 for computer implementations. Alternatively, the process 3800 can be executed by the CPU 4305 in set top box implementations or by the CPU of a remote server. The process 3800 begins at step 3817, where if a REMOVE message has been received by the launcher 303 then the process 3800 proceeds directly to step 3813. Otherwise, the process 3800 proceeds to step 3801. At step 3801, if the service represented by the event is registered, then the process 3800 proceeds directly to step 3819. Otherwise, the process 3800 proceeds to step 3803, where a service identifier lookup is performed to determine the name of the new application and any initial data associated with the new application. At the next step 3805, if the application is new the process 3800 proceeds to step 3819. Otherwise, the process 3800 proceeds to step 3809, where the application is retrieved from the applications 304. At the next step 3811, the new application is started as the front application, and at step 3812 the event manager 301 is notified of the component identifier of the front application.

At step 3819, if an INSERT message has been received by the launcher 303 then the process 3800 concludes. Otherwise, the process 3800 proceeds to step 3807, where the new application is sent a GAINING_FOCUS event indicating that the new application will soon be changing state. At the next step 3813, if there is no previously front application, then the process 3800 concludes. Otherwise, a LOSING_FOCUS event is sent to the previous front application enabling the previous front application to complete immediate tasks, and the process 3800 concludes.

Figure 38:
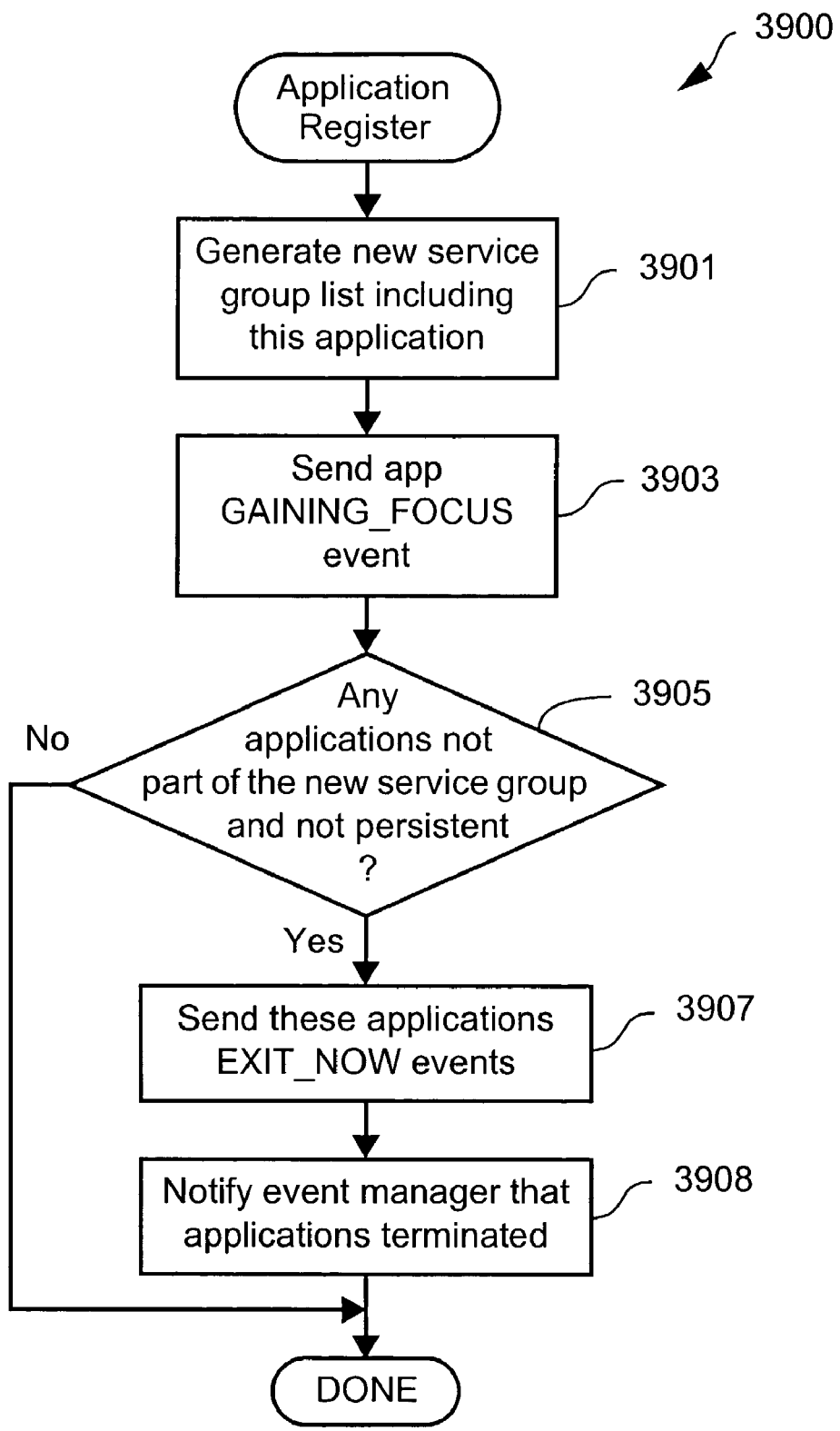
FIG. 38 is a flow diagram showing a process for registering a new application, performed during the process of FIG. 36.

FIG. 38 is a flow diagram showing the process 3900 of registering a new application, which is performed by the launcher 303. The process 3900 can be executed by the CPU 205 for computer implementations. Alternatively, the process 3900 can be executed by the CPU 4305 in set top box implementations or by the CPU of a remote server. The process 3900 begins at step 3901, where a new service group list, including the new application is generated. At the next step 3903, a GAINING_FOCUS event is sent to the new application. At the next step 3905, if any applications are not part of the new service group and are not persistent, then the process 3900 proceeds to step 3907. Otherwise the process 3900 concludes. At step 3907, any applications which are not part of the service group are sent an EXIT_NOW event, and the process 3900 proceeds to a next step 3908 where the event manager 301 is notified that the applications have terminated. The process 3900 then concludes.

Figure 39:
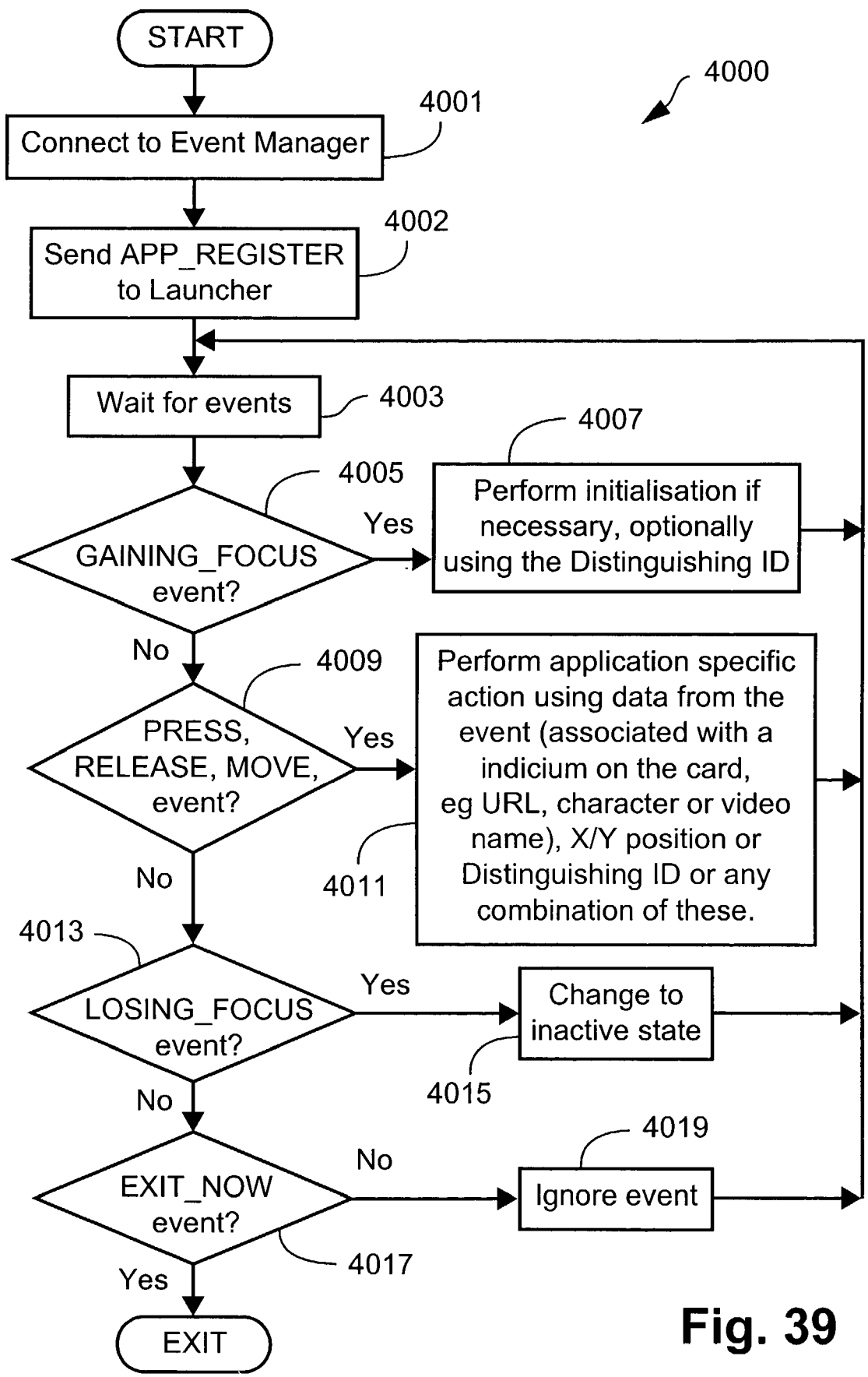
FIG. 39 is a flow diagram showing a process performed by an application when receiving events from the launcher.

FIG. 39 is a flow diagram showing the process 4000 performed by an application when receiving events from the launcher 303. The process 4000 can be executed by the CPU 205 for computer implementations. Alternatively, the process 4000 can be executed by the CPU 4305 in set top box implementations or by the CPU of a remote server (e.g. the servers 150, 152. The process 4000 begins at step 4001, where the launcher 303 connects to the event manager 301 and then proceeds to step 4002. At step 4002, the application is registered by sending an APP_REGISTER message to the launcher 303. At the next step 4003, the application waits for events and when an event is received the process proceeds to step 4005. If the event is a GAINING_FOCUS event at step 4005, then the process proceeds to step 4007. Otherwise the process 4000 proceeds to step 4009. At step 4007, the application is initialized if necessary, optionally using the distinguishing identifier and the process 4000 returns to step 4003.

If the event is a PRESS, RELEASE or MOVE event at step 4009, then the process 4000 proceeds to step 4011. Otherwise the process 4000 proceeds to step 4013. At step 4011, an application specific action is performed in response to the event. The application specific action is performed using data from the event (i.e. data associated with an indicia on the card 10, (e.g. URL, character or video name)), the X/Y position or distinguishing identifier or any combination of these.

The application specific action is typically associated with indicia on the card 10. For example, an indicia can be associated with a particular URL and when the indicia is pressed the URL may be accessed. Therefore, the computer 100 or STB 601, for example, can download desired programs from a Web Page that was designated by the URL and a card user can receive the service (i.e. program download) from the system 600. Further, an indicia can be associated with a particular memory address and when the indicia is pressed the address can be accessed. Therefore, for example, the computer 100 or STB 601 can download desired image data from memory or from a file server on a network, which was designated by the memory address and a card 10 user can receive the service (e.g. image data download) from the system 600. After step 4011, the process 4000 returns to step 3703.

If the event is a LOSING_FOCUS event at step 4013, then the process 4000 proceeds to step 4015. Otherwise the process 4000 proceeds to step 4017. At step 4015, the application reverts to an inactive state and the process 4000 returns to step 4003. The application may also see the data field of the GAINING_FOCUS event for initialization. This may include a URL to load, a filename to load etc.

If the event is an EXIT_NOW event at step 4017, then the process 4000 concludes. Otherwise the process 4000 proceeds to step 4019, where the event is ignored and the process returns to step 4003.

Figure 40:
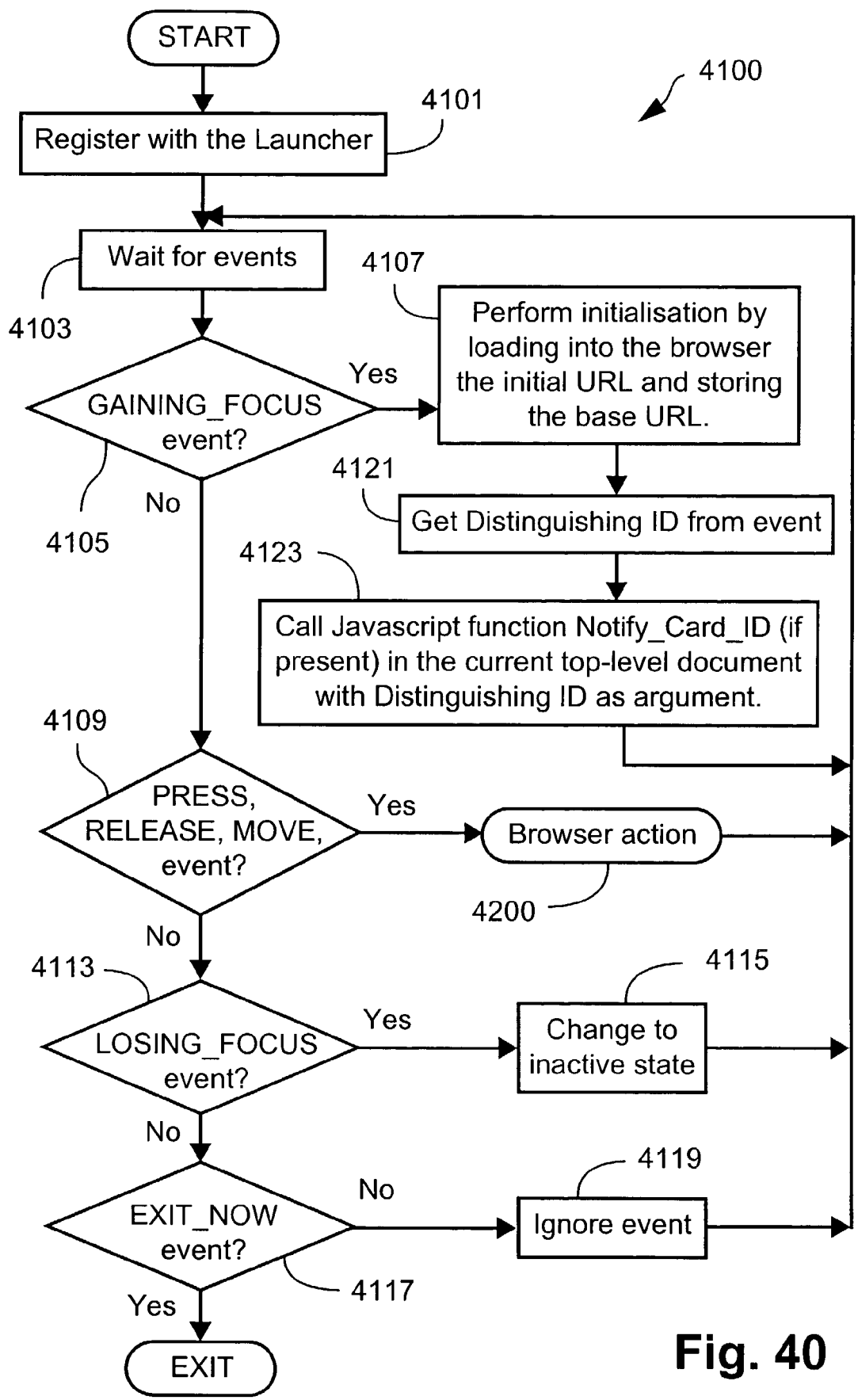
FIG. 40 is a flow diagram showing a process performed by a browser controller application when receiving events from the launcher.

FIG. 40 is a flow diagram showing the process 4100 performed by the browser controller 403 application when receiving events from the launcher 303. The process 4100 can be executed by the CPU 205 for computer implementations. Alternatively, the process 4100 can be executed by the CPU 4305 in set top box implementations or by the CPU of a remote server. The process 4100 begins at step 4101, where the browser application sends an APP_REGISTER message to the launcher 303. At the next step 4103, the browser application waits for events and when an event is received the process 4100 proceeds to step 4105. If the event is a GAINING_FOCUS event at step 4105, then the process 4100 proceeds to step 4107. Otherwise the process 4100 proceeds to step 4109. At step 4107, the application is initialized if necessary. For example, the application reads the data field of the GAINING_FOCUS message and, if the data field represents a URL, the application loads that URL. The process 4100 continues at the next step 4121, where the distinguishing identifier is determined from the event. At the next step 4123, where a Javascript call back function (preferably known as the Notify_Card_ID) is called in the current top-level document with the distinguishing identifier as the argument, and then the process 4100 returns to step 4103. Initialization is performed on the browser controller 403, by loading an initial URL into the browser application 402 and storing the base of the URL.

If the event is a PRESS, RELEASE or MOVE event at step 4109, then the process 4100 proceeds to step 4100. Otherwise the process proceeds to step 4113. At step 4200, a browser application specific action is performed in response to the event. The browser application specific action will be described in more detail below with reference to the flow diagram of FIG. 41. After step 4200, the process 4200 returns to step 4103.

If the event is a LOSING_FOCUS event at step 4113, then the process 4100 proceeds to step 4115. Otherwise the process 4200 proceeds to step 4117. At step 4115, the browser application reverts to an inactive state and the process returns to step 4103.

If the event is an EXIT_NOW event at step 4117, then the process 4100 concludes. Otherwise the process 4100 proceeds to step 4119. At step 4119, the event is ignored and the process 4100 returns to step 4103.

Figure 41:
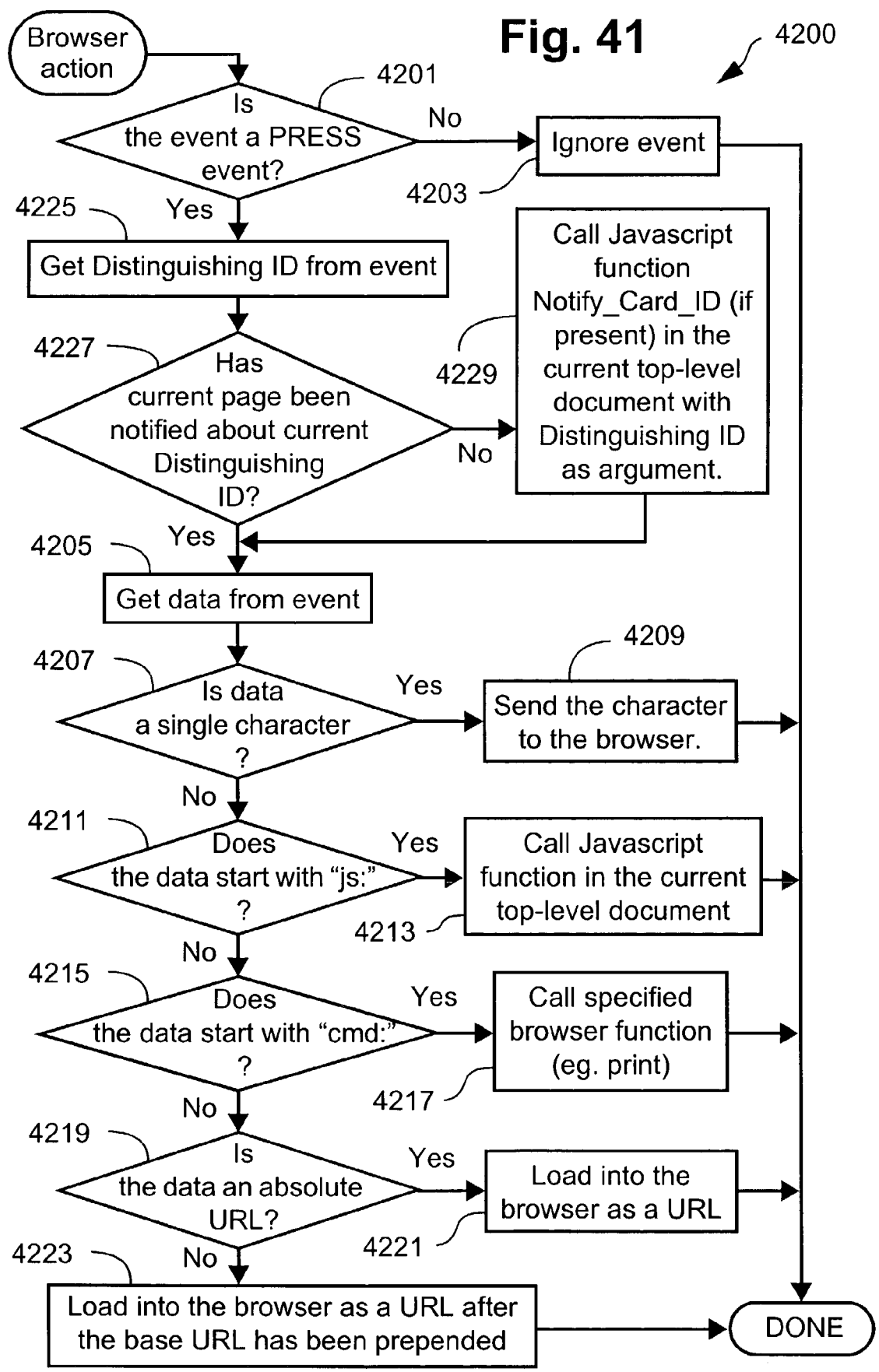
FIG. 41 is a flow diagram showing a browser application process.
Figure 42:
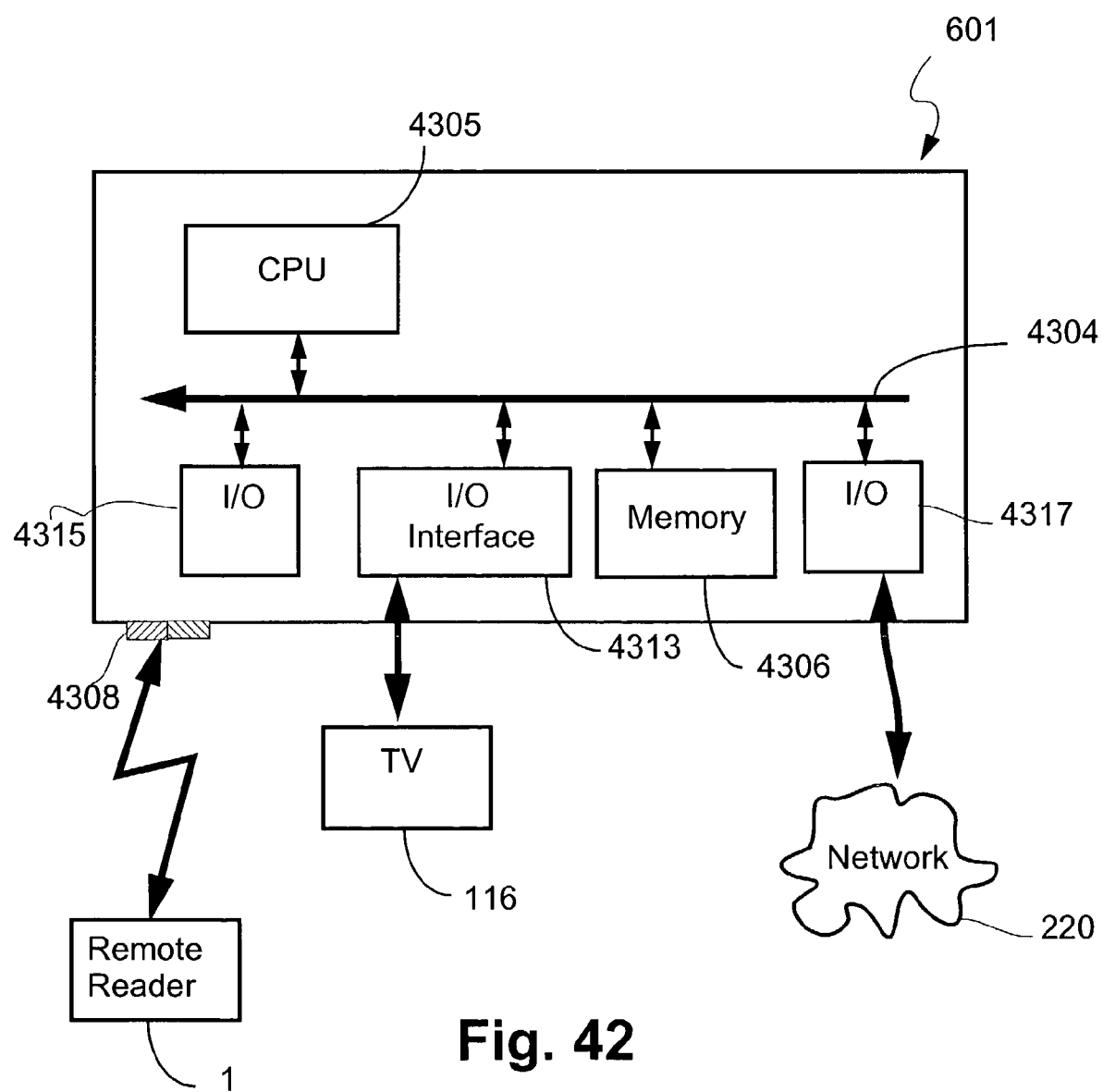
FIG. 42 shows the set top box of the system.

FIG. 41 is a flow diagram 4200 showing a browser application process (i.e. step 4111) in accordance with the arrangements described herein. The process 4200 can be executed by the CPU 205 for computer implementations. Alternatively, the process 4200 can be executed by the CPU 4305 in set top box implementations or by the CPU of a remote server. The process 4200 begins at step 4201, where if the event is a PRESS event then the process 4200 proceeds to step 4225. Otherwise the process 4200 proceeds to step 4203, where the event is ignored and the process 4200 concludes. At step 4225, the distinguishing identifier is determined from the event. At the next step 4227, if the current page has been notified about the current distinguishing identifier then the process 4200 proceeds to step 4205. Otherwise, the process 4200 proceeds to step 4229, where the JavaScript call back function known as the Notify_Card_ID is called in the current top-level document with the distinguishing identifier as the argument, and then the process 4200 proceeds to step 4205.

At step 4205, data is retrieved from the event. At the next step 4207, if the data is a single character then the process 4200 proceeds to step 4209. Otherwise the process 4200 proceeds to step 4211. At step 4209, the character is sent to the browser application 402, and the process 4200 concludes. This may be used to provide the same effect as a user pressing a key on a keyboard or a button on a conventional remote control. The current page may provide an action which is performed on receipt of a given keypress using existing methods such as those provided by Hyper Text Mark-up Language (HTML).

If the data starts with "js:" at step 4211, then the process 4200 proceeds to step 4213. Otherwise the process 4200 proceeds to step 4215. At step 4213, a JavaScript function in the current top-level document is called and the process 4200 concludes. The specified data may optionally include an argument for the JavaScript function. For example, the data "js:hello" would indicate that the browser controller is to call the JavaScript function "hello", and the data "js: hello" would indicate that the browser controller is to call the JavaScript function "hello" with the argument "world".

If the data starts with "cmd:" at step 4215, then the process 4200 proceeds to step 4217. Otherwise the process 4200 proceeds to step 4219. At step 4217, a specified browser function is called and the process 4200 concludes. For example, the data "print" would result in the browser controller instructing the data "back" would result in the browser controller instructing the browser to return to the previously displayed page.

If the data is an absolute URL at step 4219, then the process 4200 proceeds to step 4221. Otherwise the process 4200 proceeds to step 4223. At step 4221, the data is loaded into the browser application 402 as a URL and the process 4200 concludes.

At step 4223, the data is loaded into the browser application 402 as a URL after the base URL has been appended, and the process 4200 concludes.

The description with reference to FIG. 40 provides an example of an application in the form of a browser controller application. A variation on this example is a program controller, which provides control of a software program. The software program can include any program, which is normally controlled with one or more keypress events (e.g., like a keyboard keypress event or the equivalent on a game controller). The program controller is used to provide card-based control of an existing software program such as an interactive game. The program controller process behaves substantially as described with reference to FIG. 40 with the following exceptions:

If the event at step 4105 is a GAINING_FOCUS event, then the process 4100 proceeds to a step of getting a Resource Locator, for the software program to be controlled, from the GAINING_FOCUS message. The process 4100 then proceeds to a step of getting and starting the software program specified by the resource locator. The process 4100 then proceeds to step 4103. Further, at step 4109, instead of testing for a PRESS, RELEASE or MOVE event, this particular variation in the process 4100 would substantially check for a PRESS event. If the event is a PRESS event, the process 4100 proceeds to the steps of getting the data from the event, taking the first character from that data, and effecting a keypress of that character resulting in the same effect as if a user had typed that character on a keyboard.

10.1 Special Routing Rules for the Launcher

The launcher 303 has a special set of routing rules and the launcher 303 always receives the following events:
EM_REMOTE_INSERT
EM_REMOTE_REMOVE
EM_REMOTE_BADCARD The launcher also receives EM_REMOTE_PRESS, EM_REMOTE_RELEASE and EM_REMOTE_MOVE messages if a service identifier does not match a currently front application or if the distinguishing identifier represents the NO_CARD present identifier (i.e. all zeroes). For the purposes of determining whether or not messages match, the service-specific identifier is ignored.

The launcher 303 can be configured to explicitly make itself the front application by sending itself an EM_GAINING_FOCUS event. In this instance, all messages will be sent to the launcher 303 regardless of the service identifier of the message. The launcher 303 is not required by the protocol to respond to any of these messages.

10.2 Sample Implementations

This section outlines several examples of launcher configuration.

10.2.1 Generic Launcher

A generic launcher can be used in an open Set-Top-Box or computer environment with broad-band Internet connectivity. In accordance with such a configuration, the launcher 303 assumes that there are applications that can be downloaded to a local machine or designated remote machine and run. A generic launcher can also be configured to accommodate the use of applications that use the browser 402 via the browser controller 403.

The generic launcher can be configured to download applications as well as always running applications. The computer 100 running the system 600 preferably has a reasonably fast Internet connection available. In this instance, some of the applications 304 can be web pages with JavaScript that is handled by a persistent application called the browser controller 402, as described above. Further some of the applications 304 can be designed to work together. The generic launcher preferably also assumes that the communications link used by the remote reader 1 is unreliable (i.e. an IR link) so messages can be lost.

10.2.2 Rules for the Generic Launcher

The following rules are the rules that are preferably used by the launcher 303 to define the system 600.

EM_REMOTE_PRESS and EM_REMOTE_RELEASE events that have the no card present identifier (i.e. all zeroes) are used as a cue that the user wishes to exit from the front application. This could result in the system 600 either generating a "Please insert a card" message on the display 101 or returning to an earlier application depending on the configuration of the system 600.

EM_REMOTE_BADCARD events cause the launcher 303 to provide the users with feedback indicating that the card is faulty.

EM_REMOTE_INSERT, EM_REMOTE_REMOVE are not relied upon to provide the bounds of the session due to the unreliable communications method from the remote reader 1 to the event manager 301.

If the Launcher receives an EM_REMOTE_PRESS, EM_REMOTE_RELEASE or an EM_REMOTE_MOVE message the launcher does a service mapping and if the service identifier points at a downloadable application then that application is downloaded and run. The mapping is done by querying the Directory Server 305 with the service information from cards. The values returned from the Directory Server 305 are an application location and associated service data. The application location specifies the location of the application or a value the launcher recognises as a local application. The service data is the initialization data that is sent to the application in the EM_GAINING_FOCUS message. If the application location is empty the launcher 303 is configured to decide which application to use based upon the service data which will be a URL.

When a new application registers with an EM_APP_REGISTER message the specified service groups are compared with the currently running set of applications and if there is no overlap then all other currently running applications are told to exit. The new application is made the currently front application (using an EM_GAINING_FOCUS event) and the previously front application is sent an EM_LOSING_FOCUS event. If this occurs and the service identifier points at a web page then the focus is changed, using an EM_GAINING_FOCUS message, to the browser controller 403 with the location of the web page in the data field. The data field is returned in the query that told the launcher 303 that the service identifier pointed at a web page. An EM_LOSING_FOCUS event is also required to be sent to the currently front application in this situation. All other applications are told to exit.

10.3 An Example Single Use System

The system 600 can be configured for use with a single specialized application. In this instance, the launcher 303 can be used where it is advantageous to have a physical token (e.g. a bank card) where part or all of the user interface can be printed onto the token. The example given here is in an automatic teller machine.

Such a system can be configured to be able to use a single or at least very limited number of cards. In this system no other applications are started regardless of the card that is entered. The launcher 303 takes the role of a single application as well as that of a system controller. No modifications are made to the event manager 301.

A single use system can be used in an automatic teller machine for example. A bank can produce personalized bankcards with commonly used options on the cards that are used as the sole or supplementary interface for an automatic teller machine. In this instance, the automatic teller machine preferably contains an event manager such as the event manager 301 and other core process components of the system 600. The communications link between the remote reader 1 and the event manager 301 must also be reliable in accordance with such system.

10.3.1 Rules

The following rules can be used by a launcher to define a single use system:

Any events that do not come from cards associated with a participating bank could cause the launcher to display an incompatible card screen on the terminal.

EM_REMOTE_BADCARD events are ignored.

EM_REMOTE_INSERT events are used to start the transaction.

EM_REMOTE_REMOVE events are used to end the transaction.

EM_REMOTE_PRESS, EM_REMOTE_RELEASE and EM_REMOTE_MOVE events are treated as a user interaction. These are preferably handled directly by a launcher as that is the one application that is running.

Service mappings to an external Directory Server are never done. If the card is not one that a particular ATM knows about then the card should be rejected.

11.0 General

Typically, the applications 304 are resident on the hard disk drive 210 and read and controlled in their execution by the CPU 205. Intermediate storage of the programs and any data fetched from the network 220 can be accomplished using the semiconductor memory 206, possibly in concert with the hard disk drive 210. In some instances, the applications 304 can be supplied to the user encoded on a CD-ROM or floppy disk and read via the corresponding drive 212 or 211, or alternatively may be read by the user from the network 220 via the modem device 216. Still further, the software can also be loaded into the computer system 102 from other compute readable medium including magnetic tape, a ROM or integrated circuit, a magneto-optical disk, a radio or infra-red transmission channel between the computer module 210 and another device, a computer readable card such as a smart card, a computer PCMCIA card, and the Internet and Intranets including email transmissions and information recorded on websites and the like. The foregoing is merely exemplary of relevant computer readable media. Other computer readable media can be practiced without departing from the scope and spirit of the invention.

Alternatively, the process components 301 to 306 described above can be implemented in dedicated hardware as one or more integrated circuits performing the described functions or sub-functions. Such dedicated hardware is able to include graphic CPUs, digital signal CPUs, or one or more micro-CPUs and associated memories. Examples of such dedicated hardware include the set top box 601 for a television.

12.0 Other Variations

12.1 A Session Identifier

In the arrangements described above, the distinguishing identifier is included in every INSERT, REMOVE, PRESS, RELEASE and MOVE message sent from the reader 1 to the computer 100 or set-top box 601. In a variation of the above-described arrangements, the distinguishing identifier is only sent in connection with an INSERT message. Upon insertion of a new card 10, the reader 1 generates a session identifier. The session identifier identifies a current session of a card insertion. The session identifier, for example, can be a pseudo-random number (which can be represented with 2 bytes of data). Alternatively, the session identifier can be a number that is incremented each time a card is inserted (and reset to zero when a predetermined value is reached). In accordance such an arrangement, the reader 1 sends an INSERT message to the computer 100 or the set-top box 601, which includes a distinguishing identifier as described above and a session identifier. All subsequent PRESS, RELEASE and MOVE messages need not include the distinguishing identifier but include the session identifier and UI object data or press coordinates previously described.

When using a session identifier, the system is as described with reference to the system 600, except that the event manager 301, when it receives an INSERT message from a reader 1, stores the session identifier as the current session identifier and a distinguishing identifier as the current distinguishing identifier. When the event manager 301 receives a PRESS, RELEASE or MOVE message, the event manager 301 checks that the session identifier is equal to the current session identifier. If so, the event manager 301 sets a distinguishing identifier used in all messages to the current distinguishing identifier. Otherwise, if the session identifier is not equal to the current session identifier, the event manager 301 informs the user, via the display manager 306 and the display device 101 that a message has been received without a corresponding INSERT message. The user is then requested to remove and reinsert the card 10.

12.2 Other Characteristics of a Press

The above described arrangements refer to the sending of information relating to the pressing, moving and releasing of an object (typically a finger or stylus) on the touch panel 8 of the reader 1. However, the reader 1 can send additional information pertaining to an interaction touch panel 8 to the computer 100 or set-top box 601 for use by the system 600. For example, the additional information can represent a length of time or an amount of pressure exerted upon the touch panel 8 as a result of a press. This additional information can be incorporated in the PRESS messages sent from the reader 1 to the system 600 and with the EM_READER_PRESS messages sent within the system 600. This information is passed to an application 304 corresponding to the card inserted in the reader 1. An application can make use of the additional information to provide, for example, an added effect on a particular action. For instance, the application can use pressure information, when associated with a press on indicia (e.g. indicia 14) indicating an increase in (audio) volume, to determine an amount of increase in volume. That is, the harder the press on the indicia the higher the rate of increase in the volume and the softer the press on the selected indicia the lower the rate of increase.

Another example of the use of additional information in relation to a length of time (or duration) of an interaction with a touch panel 8 is described below. If a press of very short duration can to be considered as a "tap". On the other hand, a very long duration can be considered as a persistent "holding down" of a keypress. In this instance, additional information can add an extra dimension to a mode of interacting with an instant software application. For instance, a "tap" on the touch panel 8 can be an instruction to the software application to select an item displayed at a current (on-screen) cursor position.

12.3 No Coordinates

In yet another variation of the above described arrangements, a PRESS and RELEASE message would not include coordinate data of a user's interaction with the touch panel 8. In this instance, coordinate data can only be sent from the reader 1 to the system 600 in conjunction with a MOVE message. The advantage of this arrangement is a size reduction of messages sent by a reader 1 to the system 600, where an applications 304 does not require coordinate information for mapping from coordinates to UI element data.

12.4 Two-Way Protocol

The above-described arrangements can be used with a one-way or a two-way protocol for communication between a reader 1 and a computer 100 or set-top box 601. The description of the reader 1 hardware with reference to FIG. 10, and the I/O Daemon described with reference to FIG. 8 and FIG. 9 include a sending of information from a reader 1 to the computer 100 or set-top box 601 and vice versa. The sending of information back to a reader 1 from a computer 100 or set top box 601 can be used to change the stored data on a card 10. For example, this may include changing UI object data stored on the memory chip of a smart card 10. A two-way protocol can also be used to enable hand-shaking in the protocol. For example, a two-way protocol between a reader 1 and a set-top box 601 or computer 100 can be used so that the system 600 can acknowledge the receipt of an INSERT message sent when a card is inserted in the reader 1. An arrangement which supports a two-way protocol should also provide an additional message in the event manager protocol, in order to allow an application to send a request to modify a portion of the stored data on a card 10 to the I/O Daemon 300 via the event manager 301. The I/O daemon 300 can then send a message to the reader to bring about a requested action.

For instance, an arrangement of the system 600 having a two-way protocol can provide a security mechanism to ensure that applications could not modify cards without the permission of a user or without a system-defined privilege. In one example of such an arrangement, the event manager 301 presents a displayed message to a user asking if it is OK for the application to modify a currently inserted card. The user can assent to the proposal by pressing a first region of the touch panel 8 and dissent from the proposal by pressing a second region of the touch panel 8. If the user assents to the modification of the card 10 the event manager 301 can allow the request from the application 304 to be passed onto the I/O daemon 300 and then on to the reader 1. On the other hand, if the user dissents from the modification, the event manager 301 drops the message and the information is not sent to the reader 1.

The foregoing describes only some arrangements and variations on those arrangements of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including" and not "consisting only of". Variations of the word comprising, such as "comprise" and "comprises" have corresponding meanings.

The claims defining the invention are as follows:

1. A read device for reading an interface card said read device comprising:
    a transparent touch sensitive membrane for use in selecting one or more indicia formed on said card upon insertion of said card into said read device; and
    a central processing unit for transmitting a service identifier field stored in an on-board memory of said card, a service-specific identifier field stored in said memory and a specific portion of data stored in said memory to an external computing device remote from said read device upon selection of one of said indicia, wherein a service identified by said service identifier field is provided by a software application program executing in said external computing device upon said external computing device receiving said service identifier field, said service-specific identifier field and said specific portion of data, and wherein said service-specific identifier field together with said service identifier field are configured for matching with a corresponding value in a database to retrieve information about a user of said service.

2. A read device according to claim 1, wherein said service-specific identifier field is set by a vendor of said service for use by said software application program.

3. A read device according to claim 1, wherein said service identifier field is assigned to said vendor by a central authority.

4. A read device according to claim 1, wherein the central processing unit sends a read device identifier, read from said read device, to said external computing device.

5. A read device according to claim 1, wherein the central processing unit sends an insert message to said external computing device when said card is inserted into said read device.

6. A read device according to claim 1, wherein the central processing unit sends a remove message to said external computing device when said card is removed from said read device.

7. A read device according to claim 1, wherein the central processing unit sends a press message to said external computing device when at least one of said indicia is pressed via said touch sensitive membrane.

8. A read device according to claim 7, wherein the central processing unit sends a release message to said external computing device upon release of said at least one of said pressed indicia.

9. A read device according to claim 1, wherein the central processing unit sends a move message to said external computing device upon a press position being moved without being released.

10. A read device according to claim 1, wherein the central processing unit sends a bad card message to said external computing device when an invalid card is inserted into said read device.

11. A read device according to claim 1, wherein the central processing unit sends a low battery message to said external computing device when a charge level of a battery powering said read device reaches a predetermined threshold.

12. A read device according to according to claim 1, wherein coordinates of a users press position on said touch sensitive membrane are sent to said external computing device.

13. A read device according to claim 12, wherein coordinates are calculated by an application executable by said central processing unit, said application having been provided by a vendor of said service.

14. A read device according to claim 1, wherein said card stores said identifier fields and said specific portion of data in a memory chip.

15. A read device according to claim 1, wherein said external computing device is a set-top-box.

16. A read device according to claim 1, wherein said external computing device is a personal computer.

17. A program configured for execution in a read device, said read device comprising a transparent touch sensitive membrane arranged to overlay a removable interface card received therein, said program comprising:
    code for reading a service identifier field stored in an on-board memory of said card, a service-specific identifier field stored in said memory and a specific portion of data stored in said memory, upon selection of an indicia formed on said card using said membrane; and
    code for transmitting said service identifier field, said service-specific identifier field and said specific portion of data to an external computing device remote from said read device, wherein a service identified by said service identifier field is provided by a software application program executing in said external computing device upon said external device receiving said service identifier field, said service-specific identifier field and said specific portion of data, and wherein said service-specific identifier field together with said service identifier field are configured for matching with a corresponding value in a database to retrieve information about a user of said service.

18. A program according to claim 17, wherein said software application program is stored on a computer-readable medium in said read device.

19. A method of processing data on a read device, said read device comprising a transparent touch sensitive membrane arranged to overlay a removable interface card received therein, said method comprising the steps of:
    reading a service identifier field stored in an on-board memory of said card, a service-specific identifier field stored in said memory and a specific portion of data stored in said memory, upon selection of an indicia formed on said card using said membrane; and
    transmitting said service identifier field, said service-specific identifier field and said specific portion of data to an external computing device remote from said read device, wherein a service identified by said service identifier field is provided by a software application program executing in said external computing device upon said external computing device receiving said service identifier field, said service-specific identifier field and said specific portion of data, and wherein said service-specific identifier field together with said service identifier field are configured for matching with a corresponding value in a database to retrieve information about a user of said service.

20. A read device for reading an interface card, said read device comprising:
  transparent touch sensitive means for use in selecting one or more indicia formed on said card upon insertion of said card into said read device;
  read means for reading a service identifier field stored in an on-board memory of said card, a service-specific identifier field stored in said memory and a specific portion of data stored in said memory, upon selection of an indicia formed on said card using said membrane; and
  transmitting means for transmitting said service identifier field, said service-specific identifier field and said specific portion of data to an external computing device remote from said read device, wherein a service identified by said service identifier field is provided by a software application program executing in said external computing device upon said external computing device receiving said service identifier field, said service-specific identifier field and said specific portion of data, and wherein said service-specific identifier field together with said service identifier field are configured for matching with a corresponding value in a database to retrieve information about a user of said service.

21. A card interface system comprising an interface card and a read device, said card being configured for insertion into said read device, said read device comprising a transparent touch sensitive membrane arranged to overlay said card, said system comprising:
  a memory on-board said card with a service identifier field stored in said memory, a service-specific identifier field stored in said memory and a specific portion of data related to a user selected indicia stored in said memory; and
  a central processing unit integrally formed within said read device for transmitting said service identifier field stored in said memory, said service-specific field stored in said memory and said specific portion of data to an external computing device remote from said read device upon selection of an indicia formed on said card, wherein a service identified by the service identifier field is provided by a software application program executing in said external computing device receiving said service identifier field, said service-specific identifier field and said specific portion of data, and wherein said service-specific identifier field together with said service identifier field are configured for matching with a corresponding value in a database to retrieve information about a user of said service.

22. An electronic card reader for reading an electronic card, said electronic reader comprising:
  a touch sensitive transparent membrane having an upper surface configured to be depressible by a user of said reader;
  a receptacle shaped to receive said electronic card, wherein said electronic card received therein and one or more indicia formed on said electronic card can be viewed through said touch sensitive membrane; and
  an electronic circuit coupled to said membrane to read a specific portion of said data from an on-board memory of said electronic card according to depression of said membrane associated with a specific one of said indicia, and for transmitting said specific portion of data, a service identifier field stored in said memory and a service-specific identifier field stored in said memory to data controlled equipment remote from said electronic card reader, wherein a function identified by the service identifier field is provided by a software application executing in said data controlled equipment receiving said specific portion of data, said service identifier field, and said service-specific identifier field, and wherein said service-specific identifier field together with said service identifier field are configured for matching with a corresponding value in a database to retrieve information about a user of said function.

23. A read device for an interface card, said read device comprising:
  a receptacle shaped to receive said interface card;
  a transparent touch sensitive membrane arranged to overlay said interface card upon receipt of said interface card in said receptacle such that one or more indicia formed on said card can be viewed through said touch sensitive membrane; and
  an electronic circuit for coupling a memory component on-board said interface card and for reading a specific portion of data related to one of said indicia selected by a user of said read device via said membrane, and for transmitting said specific portion of data, a service identifier field stored in said memory and a service-specific identifier field stored in said memory upon selection of said one indicia to an external computing device remote from said read device, wherein a service identified by said service identifier field is provided by a software application executing on said external computing device upon said external computing device receiving said service identifier field, said service-specific identifier field and said read specific portion of data, and wherein said service-specific identifier field together with said service identifier field are configured for matching with a corresponding value in a database to retrieve information about a user of said service.

24. A program executable in an electronic card reader for reading an electronic card, said reader having a touch sensitive transparent membrane configured to be depressible by a user of said reader, wherein said electronic card and indicia formed thereon can be viewed through said touch sensitive membrane upon insertion of said card into said reader, said program comprising:
  code for detecting a selection of one of said indicia upon depression of said touch sensitive membrane;
  code for reading selected data stored in a memory on-board said card according to said depression of said membrane associated with one indicia, said selected data comprising at least a service identifier field stored in said memory, a service-specific identifier field stored in said memory, and a specific portion of data stored in said memory and associated with said one indicia;
  code for transmitting said selected data including said service identifier field, said service-specific identifier field and said specific portion of data to said data controlled equipment remote from said reader, wherein a function identified by said service identifier field is provided by a software application executing in said data controlled equipment upon said data controlled equipment receiving said selected data, and wherein said service-specific identifier field together with said service identifier field are configured for matching with a corresponding value in a database to retrieve information about a user of said function.

25. A program according to claim 24, wherein said function is implemented according to said selected data.

26. A service providing apparatus for providing a service, said apparatus comprising:

a central processing unit adapted for receiving, from a card read device remote from said service providing apparatus, a service identifier field, a service-specific identifier field and a specific portion of data upon selection of an indicia formed on a detachable interface card inserted into said card read device, said indicia being selected using said read device, and said service identifier data field, said service-specific identifier field and said specific portion of data being read from an on-board memory of said interface card upon said indicia being selected, said central processing unit being further adapted to execute a software application program upon said service providing apparatus receiving said service identifier data field, said service-specific identifier field and specific portion of data to provide a service represented by said service identifier field, and wherein said service-specific identifier field together with said service field are configured for matching with a corresponding value in a database to retrieve information about a user of said service.

* * * * *

UNITED STATES PATENT AND TRADEMARK OFFICE
CERTIFICATE OF CORRECTION

PATENT NO.         : 7,156,302 B2
APPLICATION NO.    : 10/165726
DATED              : January 2, 2007
INVENTOR(S)        : Yap et al.

It is certified that error appears in the above-identified patent and that said Letters Patent is hereby corrected as shown below:

COLUMN 32:
Line 36, "can then CPU 205" should read -- CPU 205 can then --.

COLUMN 58:

Line 3, "according to according" should read -- according --.

Signed and Sealed this

Sixteenth Day of October, 2007

JON W. DUDAS
*Director of the United States Patent and Trademark Office*